(12) United States Patent
Bilsky

(10) Patent No.: US 11,780,081 B2
(45) Date of Patent: Oct. 10, 2023

(54) SNAKE-LIKE ROBOT

(71) Applicant: FLX Solutions Inc, Bethlehem, PA (US)

(72) Inventor: Matthew Bilsky, Bethlehem, PA (US)

(73) Assignee: FLX Solutions, Inc., Bethlehem, PA (US)

(*) Notice: Subject to any disclaimer, the term of this patent is extended or adjusted under 35 U.S.C. 154(b) by 4 days.

(21) Appl. No.: 17/542,547

(22) Filed: Dec. 6, 2021

(65) Prior Publication Data

US 2022/0088771 A1 Mar. 24, 2022

Related U.S. Application Data

(63) Continuation of application No. 17/091,391, filed on Nov. 6, 2020, now Pat. No. 11,213,944, which is a
(Continued)

(51) Int. Cl.
*B25J 9/06* (2006.01)
*B25J 11/00* (2006.01)
(Continued)

(52) U.S. Cl.
CPC .............. *B25J 9/065* (2013.01); *B23B 39/14* (2013.01); *B25J 11/005* (2013.01); *B25J 18/04* (2013.01)

(58) Field of Classification Search
CPC ... B25J 9/065; B25J 9/06; B25J 11/005; B25J 11/006; B25J 11/0055; B25J 18/04;
(Continued)

(56) References Cited

U.S. PATENT DOCUMENTS 4,474,513 A * 10/1984 Salyers ................. B25B 13/481
    408/110
5,720,542 A *  2/1998 Birge, Jr. ............ F21V 33/0084
    362/120
(Continued)

FOREIGN PATENT DOCUMENTS

JP     2000246675 A  *  9/2000
JP     2004-284105        10/2004
(Continued)

OTHER PUBLICATIONS

USPTO Machine Translation (retrieved from FIT database) of the Description of JP 2000246675 A, Nakamura et al., Sep. 12, 2000. (Year: 2023).*

(Continued)

*Primary Examiner* — Daniel D Yabut
(74) *Attorney, Agent, or Firm* — Joseph E. Maenner; Maenner & Associates, LLC

(57) ABSTRACT

A method of operating a robot includes providing a robot having a plurality of independently operable links that rotate and translate the robot. The links comprise a first link having a first distal end, a first proximal end, and a first longitudinal axis extending between the first distal end and the first proximal end and a second link having a second proximal end, a second distal end operatively coupled to the first proximal end, and a second longitudinal axis extending between the second proximal end and the second distal end. The method further comprises inserting the robot through a first opening into the space and advancing the robot through the space by performing at least one of the following operations: axially elongating the robot; pivoting the first longitudinal axis relative to the second longitudinal axis; and rotating the first longitudinal axis relative to the second longitudinal axis.

15 Claims, 52 Drawing Sheets

Related U.S. Application Data continuation of application No. 15/765,514, filed as application No. PCT/US2016/055791 on Oct. 6, 2016, now Pat. No. 10,828,771.

(60) Provisional application No. 62/278,487, filed on Jan. 14, 2016, provisional application No. 62/237,987, filed on Oct. 6, 2015.

(51) Int. Cl.
  B23B 39/14 (2006.01)
  B25J 18/04 (2006.01)

(58) Field of Classification Search
  CPC ......... B25J 18/025; B25J 18/02; B23B 39/14; B25B 13/481; B25B 23/0028; F16H 25/2025; F16H 25/2454; F16H 2025/2071; Y10T 74/18696; Y10T 74/18704
  See application file for complete search history.

(56) References Cited

U.S. PATENT DOCUMENTS

| | | | | |
|---|---|---|---|---|
| 6,162,171 | A | * | 12/2000 | Ng .................. A61B 1/0055 600/101 |
| 2009/0030562 | A1 | * | 1/2009 | Jacobsen ............. B08B 9/045 701/2 |
| 2010/0111624 | A1 | * | 5/2010 | Seibold ............ B23B 51/0473 408/239 R |

FOREIGN PATENT DOCUMENTS

| | | |
|---|---|---|
| JP | 2014-153499 | 8/2014 |
| WO | WO2009/038212 | 3/2009 |

OTHER PUBLICATIONS

English translation of Office Action for JP 2022-078496, dated Aug. 26, 2022.

* cited by examiner

SNAKE-LIKE ROBOT

CROSS-REFERENCE TO RELATED APPLICATION

The present application claims priority from U.S. Provisional Patent Application 62/237,987, filed on Oct. 6, 2015, and U.S. Provisional Patent Application Ser. No. 62/278,487, filed on Jan. 14, 2016, which are both incorporated herein by reference in their entireties.

BACKGROUND OF THE INVENTION

When a new house is built, all necessary electrical, plumbing, etc. are run prior to closing up the walls. This is fittingly referred to as new work electrical. The unrestricted access to the wall makes the installation of these systems a trivial exercise for the seasoned vocational worker. Likewise, once the drywall or plaster has been hung making changes within the walls becomes exponentially more difficult. Routes must be planned to minimize the number of access holes cut in the wall face. A sense of how homes are put together becomes a pre-requisite to tactfully complete a project in a minimally invasive manner. This art is known as old work electrical.

It would be beneficial to develop a drilling device that can bore holes through structural members as well as to run flexible conduits through the structural members without having to cut holes in the walls to do so.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, the present invention provides a snake-like robot comprising a first link having a first distal end, a first proximal end, and a first longitudinal axis extending between the first distal end and the first proximal end. A second link has a second proximal end, a second distal end operatively coupled to the first proximal end, and a second longitudinal axis extending between the second proximal end and the second distal end. Rotation of the first link relative to the second link alternatively performs the following effects: elongation of the robot; pivoting of the first longitudinal axis relative to the second longitudinal axis; and rotation of the first longitudinal axis relative to the second longitudinal axis.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
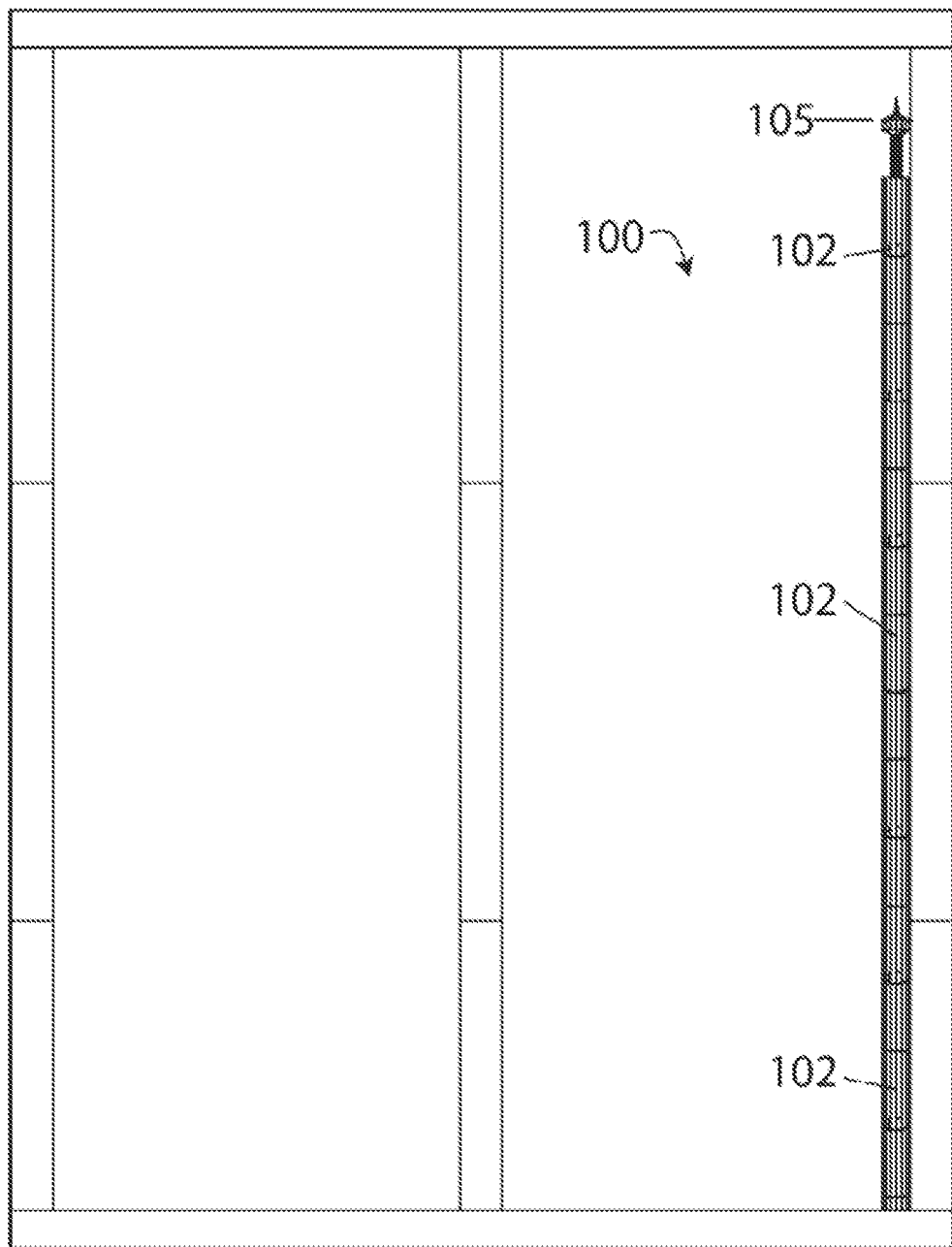
FIG. 1 shows a snakelike robot according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "distal" means an end of the inventive device farther from a user and the term "proximal" means an end of the inventive device closer to the user.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to the Figures, a snakelike robot 100 ("robot 100") according to an exemplary embodiment of the present invention is shown. Robot 100 can be used to tunnel through otherwise inaccessible locations, such as, interior walls of buildings, building debris, cave-ins of tunnels or mine shafts, or other such inaccessible locations. Further, robot 100 can be used in aerospace, outer space, and other applications where an axially extending and axially traversing robot may be required. Robot 100 can be fitted with end effectors, such as, for example, drill bits, cameras, sensors, a fluid supply lines such as oxygen, or other types of fittings, as will be discussed in more detail herein. Robot 100 is constructed from a plurality of linked segments that can operate independently of each other as well as cooperatively with adjacent segments in order to rotate and translate robot 100.

Alternatively, robot 100 can be used outside of a confined space and can be used to travel across a surface, stand up vertically, or even operate in the absence of gravity, assuming that at least one point of robot 100 is anchored to a reference point (i.e. a spacecraft or space station).

Figure 1A:
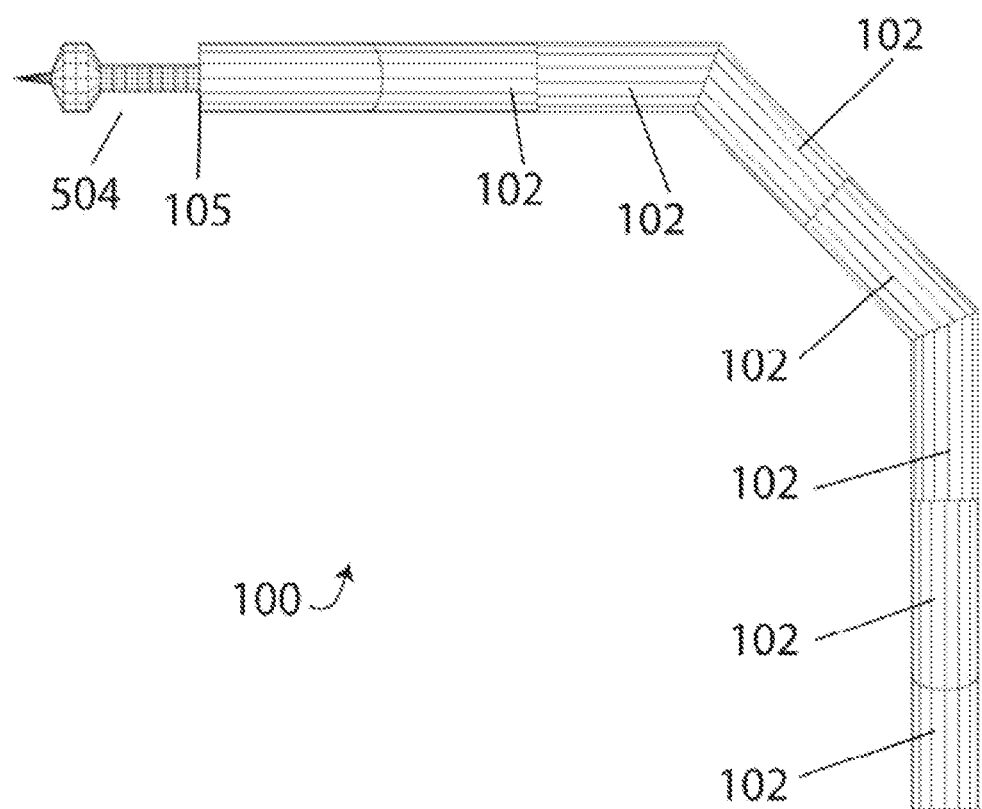
FIG. 1A shows the robot in FIG. 1 with several of the links making up robot 100 turned at an angle relative to adjacent links.

FIGS. 1 and 1A show an exemplary embodiment of robot 100. While 7 connected links 102 are used in an exemplary embodiment of robot 100 are shown in FIG. 1A, those skilled in the art will recognize that robot 100 can include more or less than 7 links. An exemplary drill head 105 can be attached to a proximal end of robot 100 such that robot 100 can be used to drill holes in solid material, such that robot 100 can advance itself through such holes.

FIGS. 2 and 2A-2C shows a cross-sectional view of link 102. Link 102 includes a longitudinal axis 103, extending between a distal end 104 and a proximal end 106. Link 100 also includes an outer housing 108 that is shown in more detail in FIG. 3. Outer housing 108 includes a distal end 110 that extends generally orthogonal to longitudinal axis 103 of link 102 and a proximal end 112 that extends at an oblique angle θ relative to longitudinal axis 103. In an exemplary embodiment, θ is about 22.5°, although those skilled in the art will recognize that θ can be other values as well, as long as a whole number multiple of the value of θ equals 90°, generated by the equation 360°/n, where n is a whole number. A plate 113 covers proximal end 112 of outer housing 108. FIG. 1A shows links 102 having a value of θ of about 22.5°, such that adjacent links 102 can form an angle of about 45°, resulting in a multiple of such links 102 being able to turn robot 100 90°.

A series of internal threads 114 extend from distal end 110, toward proximal end 112. In an exemplary embodiment, internal threads 114 form a single helix. A plurality of longitudinal slots 115 extends a length of outer housing 108. Slot 115 forms a track along which nonrotating elements within link 102 translate longitudinally during operation of link 102 with respect to adjacent links 102.

Figure 2:
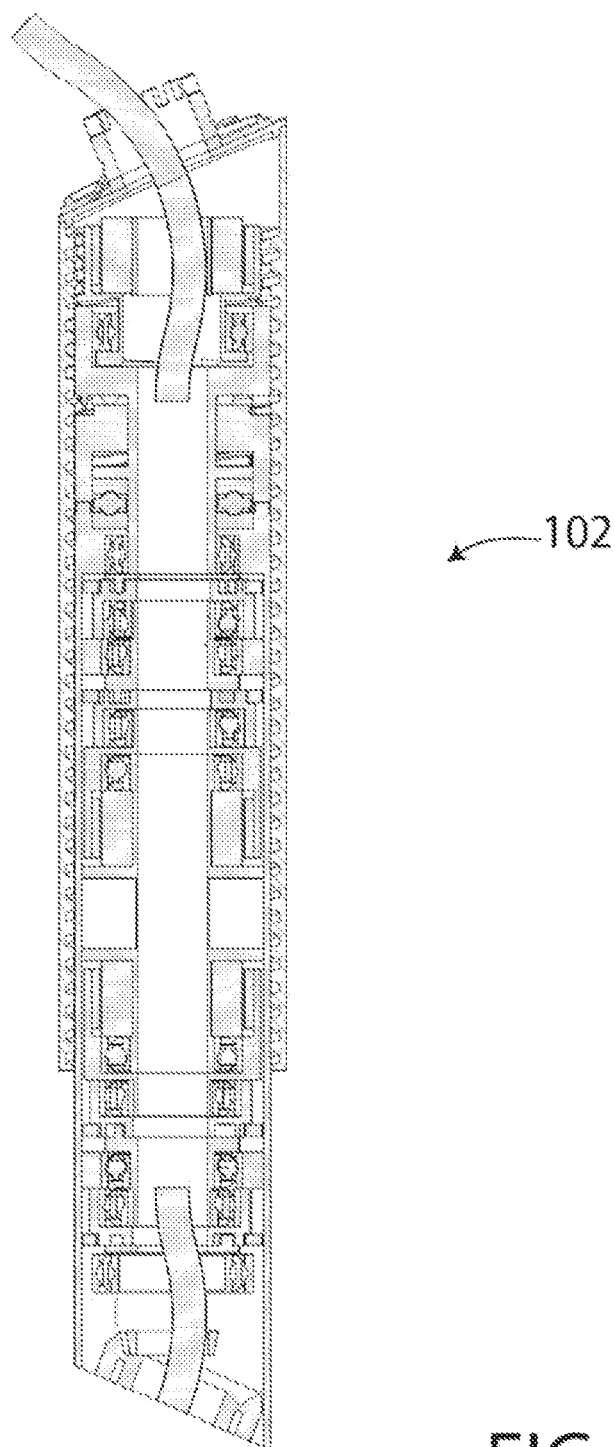
FIG. 2 shows a cross-sectional view of a link in the robot shown in FIG. 1.
Figure 2C:
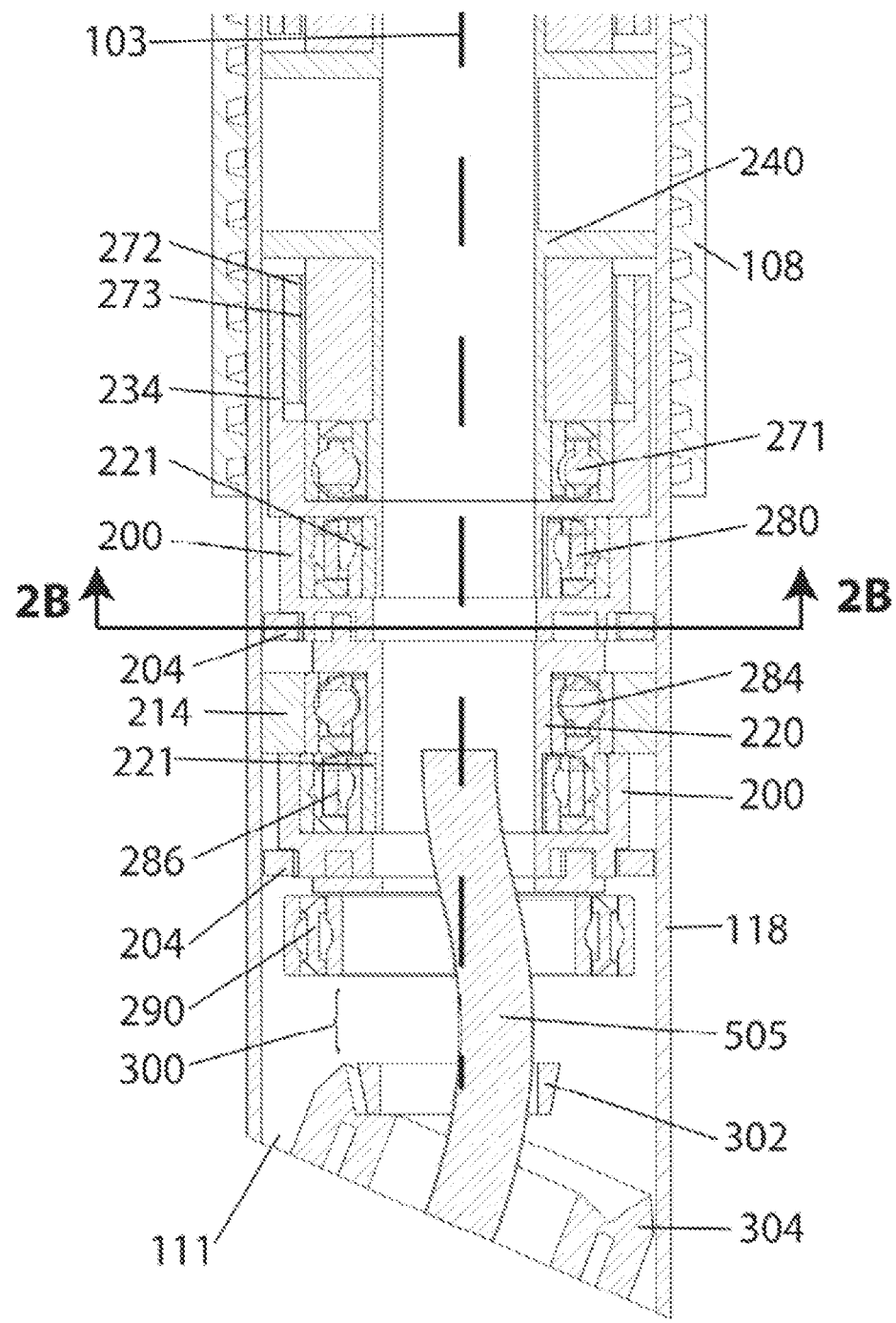
FIG. 2C shows an enlarged view of a distal end of the link shown in FIG. 2.
Figure 3:
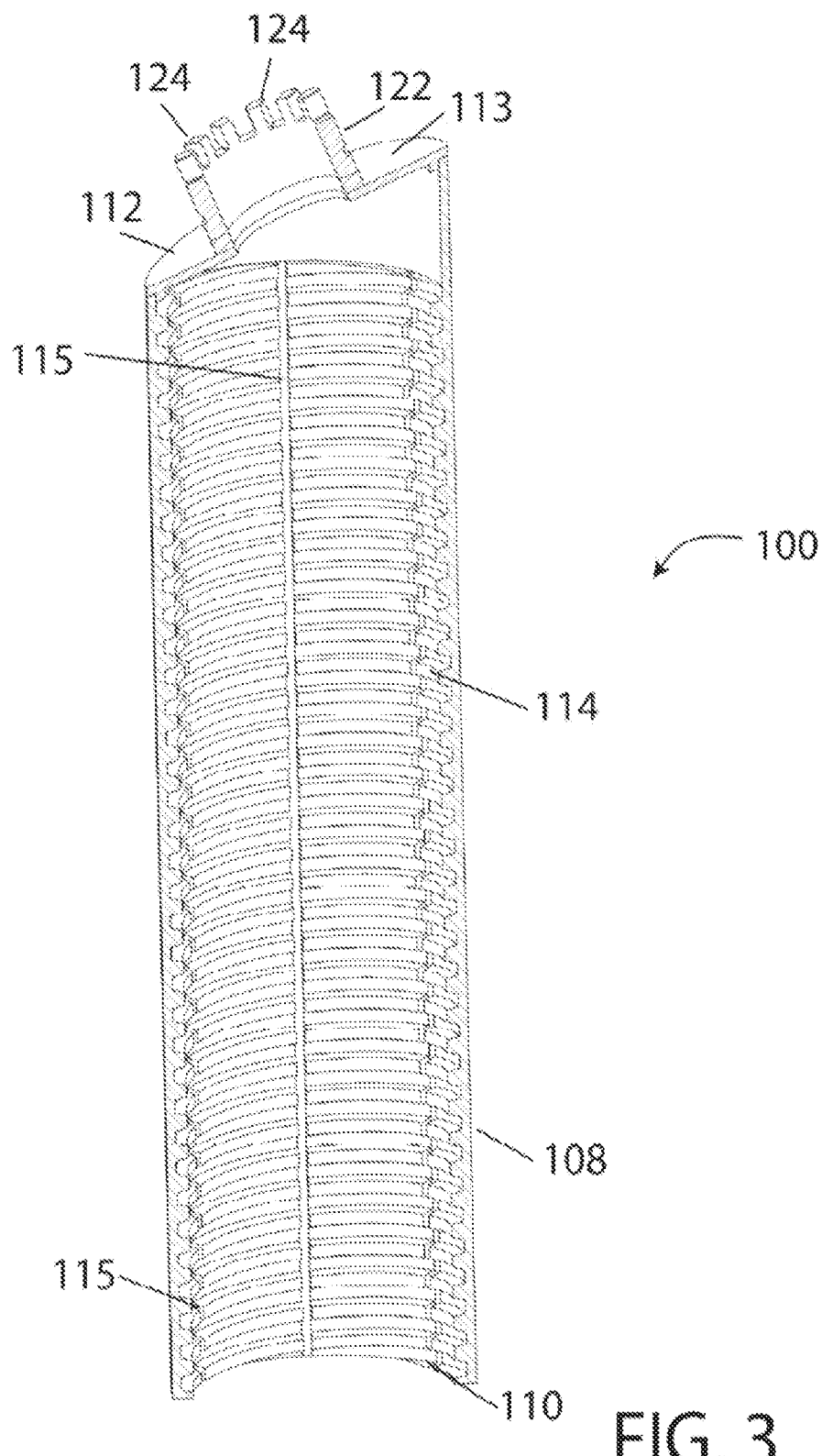
FIG. 3 shows a perspective view, in section, of an outer housing used with the link shown in FIG. 2.
Figure 7A:
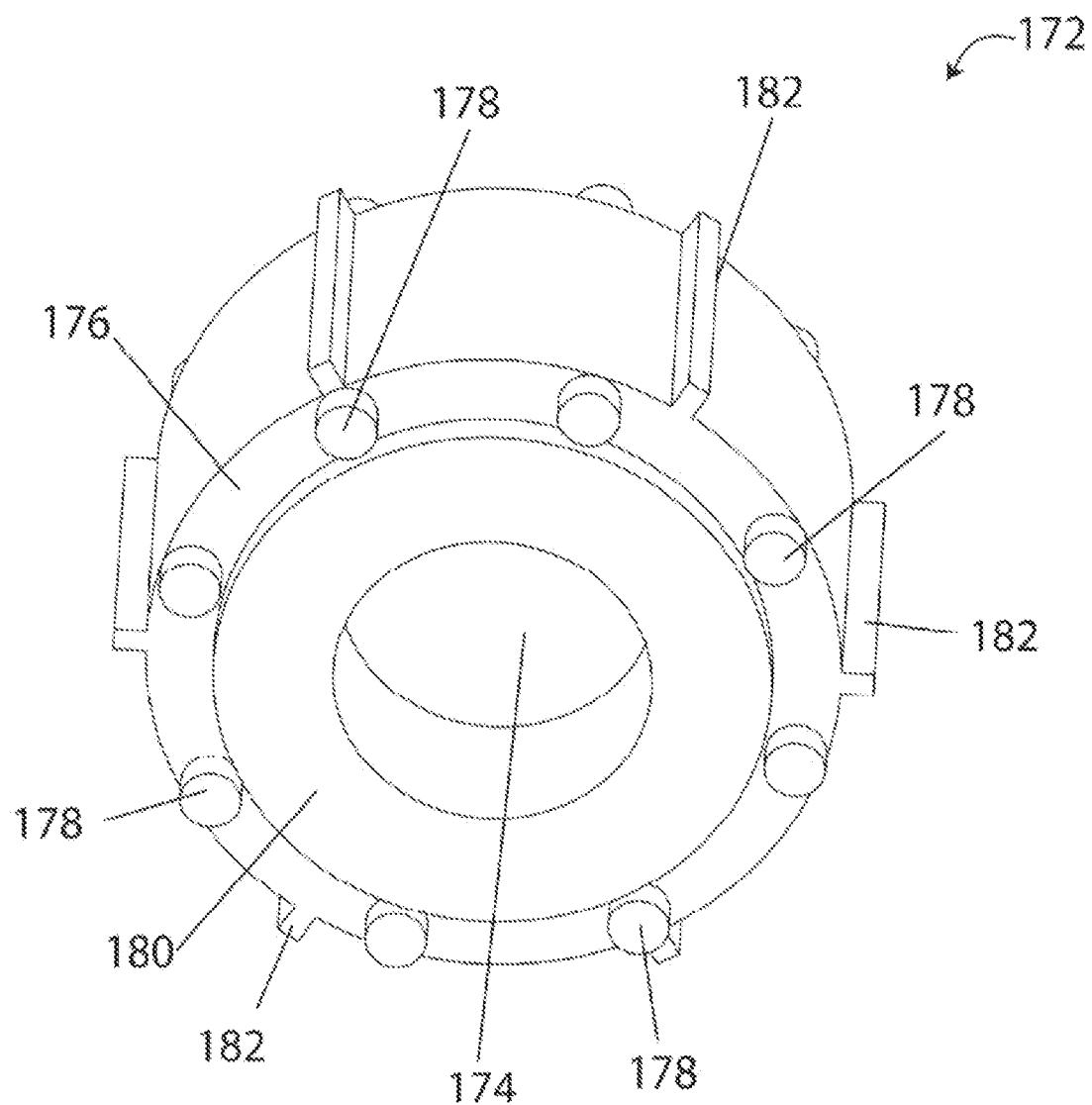
FIG. 7A is a perspective proximal end view of a spacer used with the link shown in FIG. 2.
Figure 7B:
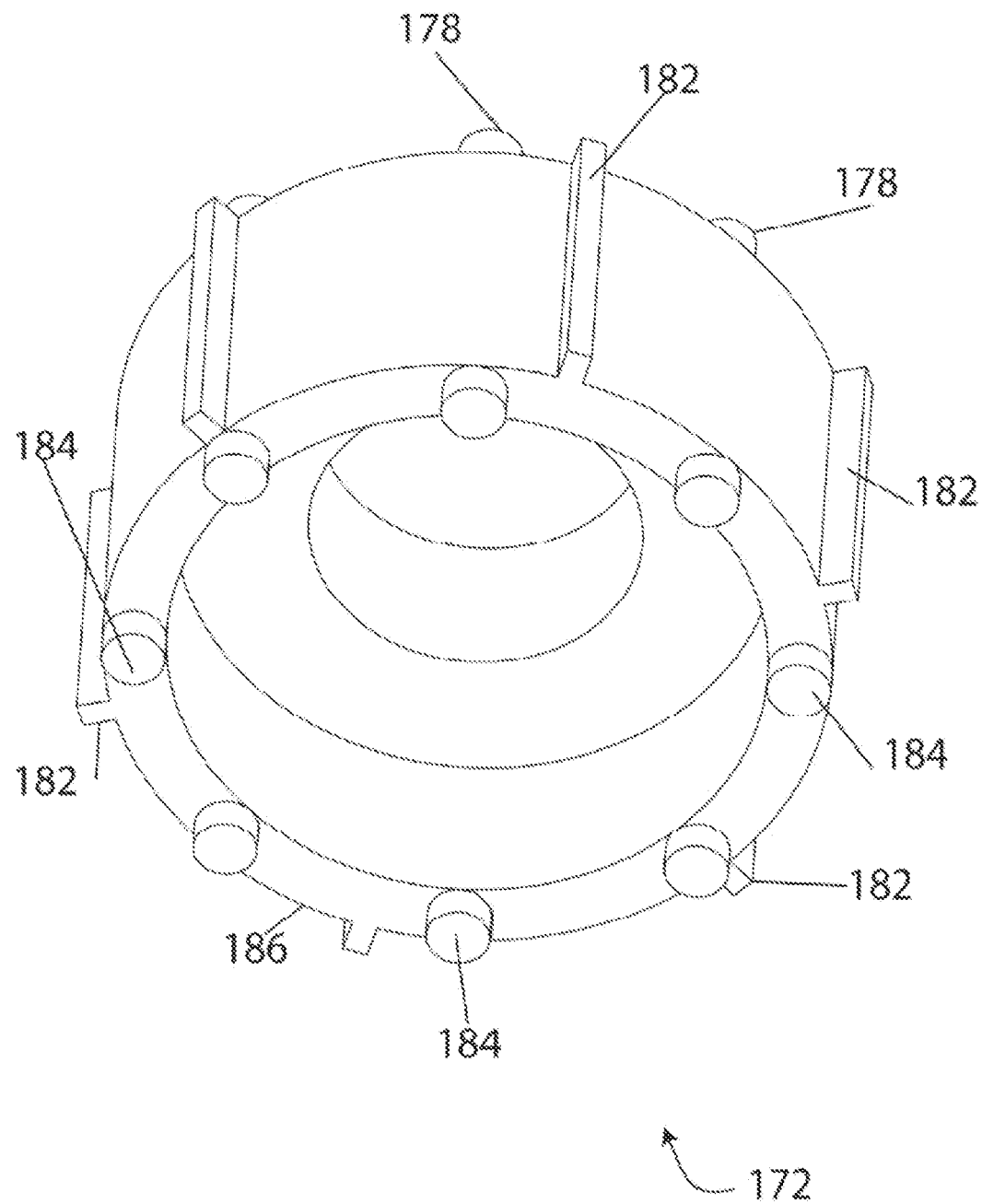
FIG. 7B is a perspective distal end view of the spacer shown in FIG. 7A.
Figure 7C:
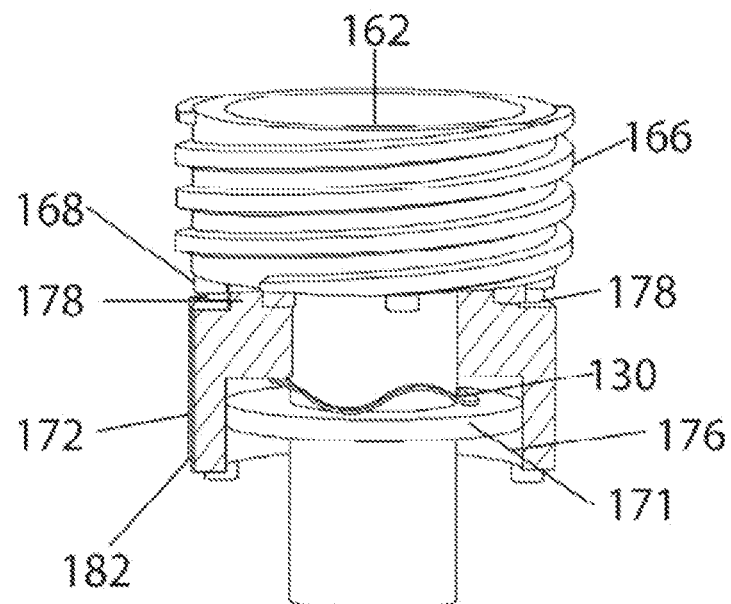
FIG. 7C is a side elevational view of the nut layout bearing support post and spacer assembled together in the link shown in FIG. 2.
Figure 7D:
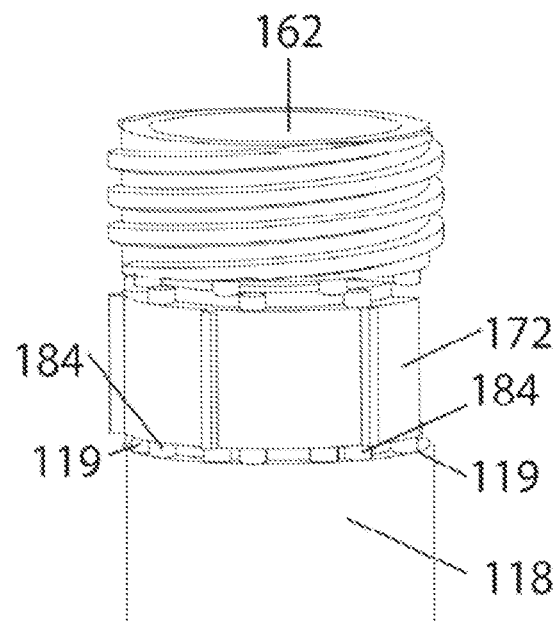
FIG. 7D is a side elevational view of the spacer shown in FIG. 7A aligned with the inner housing of the link shown in FIG. 2.

Referring to FIG. 2, an inner cylinder 118 includes external threads 120 that provides threaded engagement with internal threads 114, such that rotation of outer housing 108 relative to inner cylinder 118 elongates or contracts link 102, depending upon the direction of rotation, resulting in longitudinal translation of the proximal end of robot 100. In an exemplary embodiment, inner cylinder 118 is constructed from stainless steel 321 and has a wall thickness of about 0.03 inches. Referring to FIG. 2C, an end plate 111 is attached to the distal end of inner cylinder 118. Referring to FIG. 7D, a plurality of projections 119 extend proximally from proximal end of inner cylinder 118.

Figure 3A:
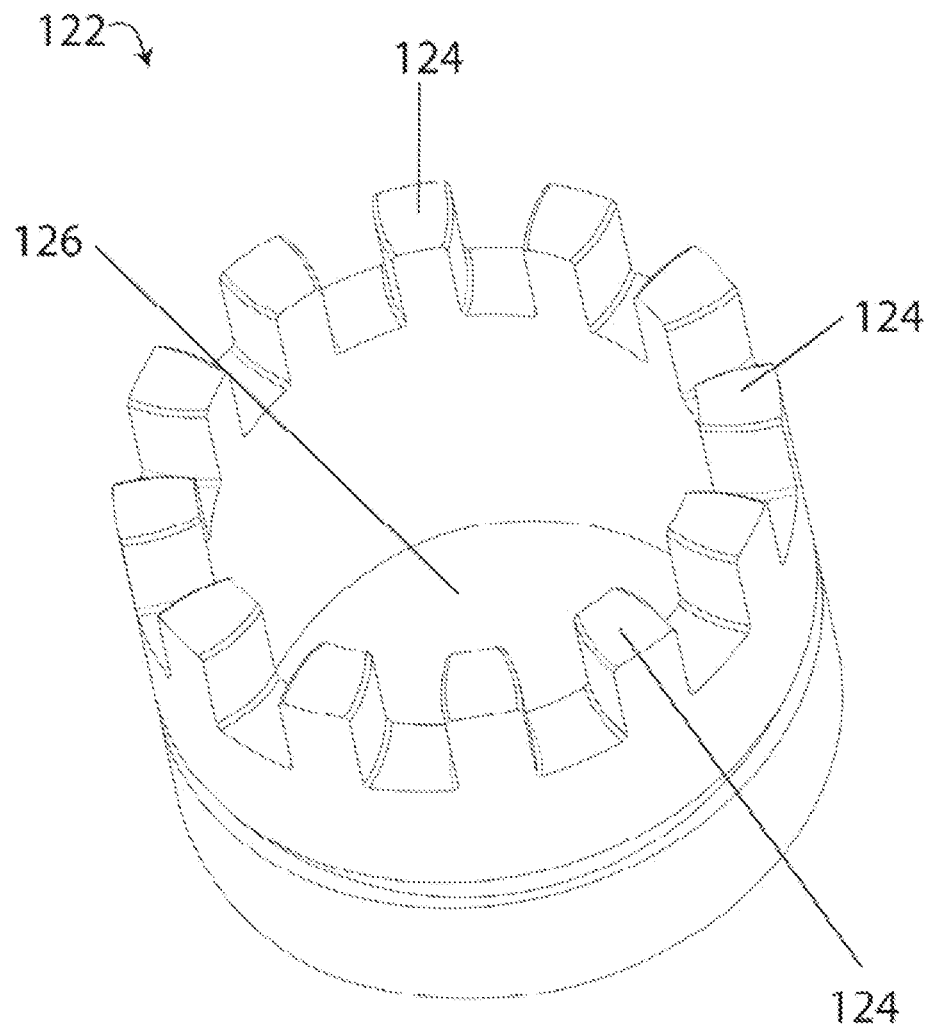
FIG. 3A shows a perspective view of a male curved connector used with the link shown in FIG. 2.
Figure 3B:
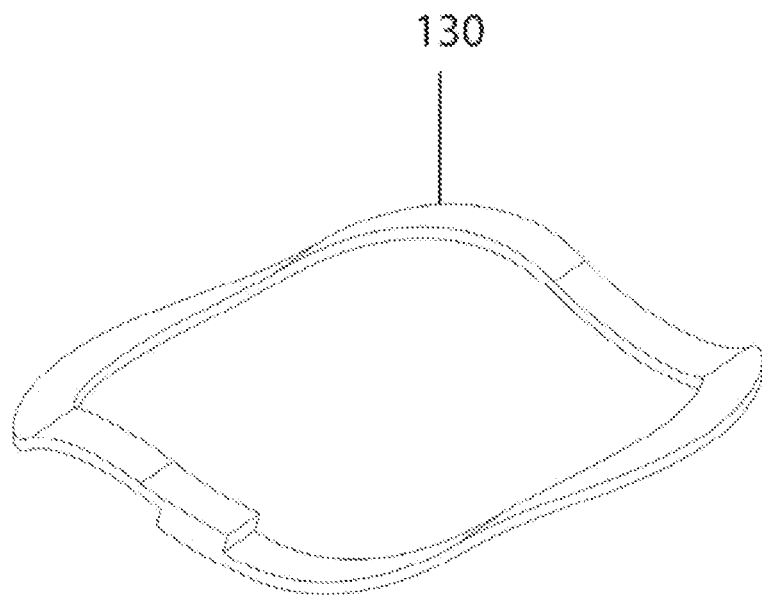
FIG. 3B shows a perspective view, in section of the proximal end of the link shown in FIG. 2.
Figure 15:
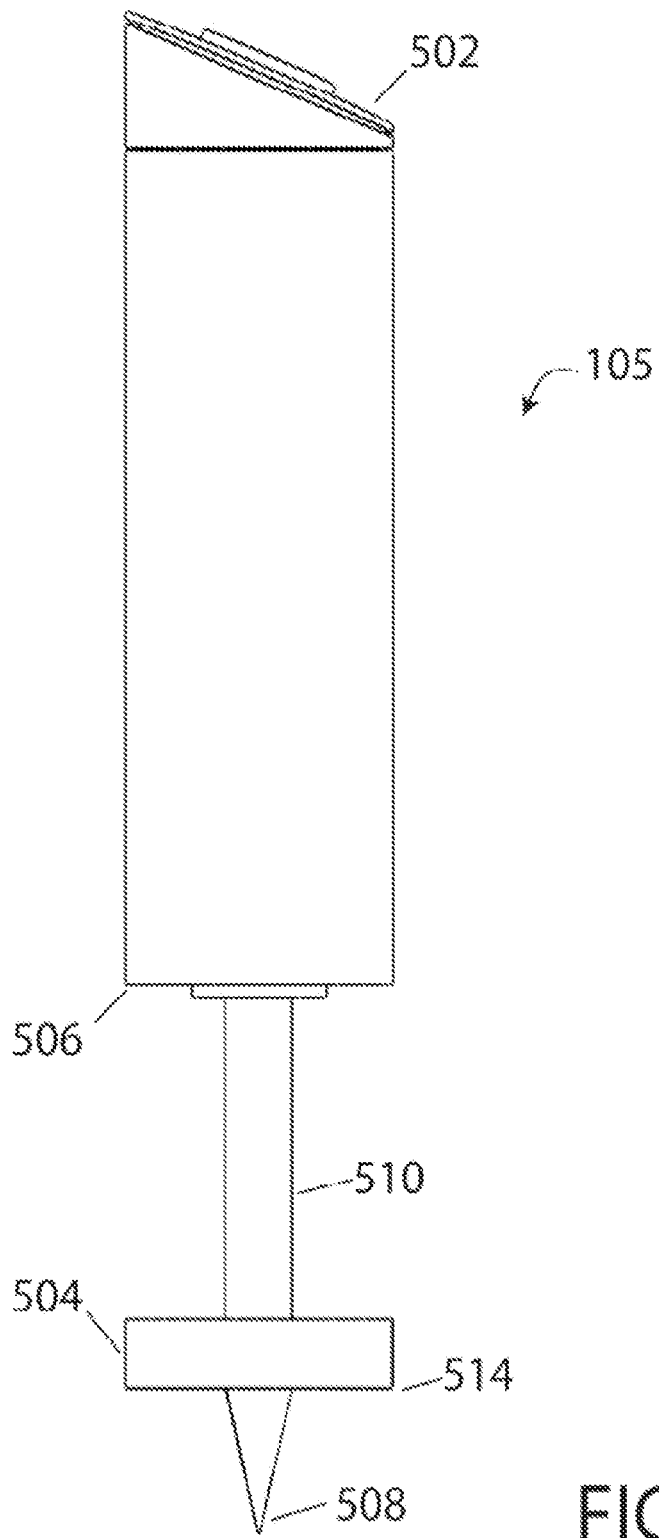
FIG. 15 is a side elevational view of a drill head used with the robot shown FIG. 1.

Robot 100 will now be described with respect to its individual components, generally extending from left to right as shown in FIG. 2. A male curvic pin 122, shown in detail in FIG. 3A, extends proximally from plate 113. Male curvic pin 122 includes a plurality of radially spaced teeth 124 that engage a female curvic pin 128 located at distal end 110 of an adjacent link 102. An axial through-passage 126 extends through the length of curvic pin 122 and allows for the passage of material, such as, for example, flexible driveshaft 505 for a drill 504 (shown in FIG. 15), as well as any other material, such as, for example, tubing for the transmission of fluids (e.g. gases, liquids, viscous material, etc.), electrical cabling, and other elongated material through the length of link 102. Additionally, a wave spring 130, shown in detail in FIG. 3B, extends around male curvic pin 122, proximally of plate 113. Wave spring 130 biases link 102 away from its adjacent link 102. While a wave spring is used to provide the biasing feature, those skilled in the art will recognize that other types of biasing members can be used.

Figure 3C:
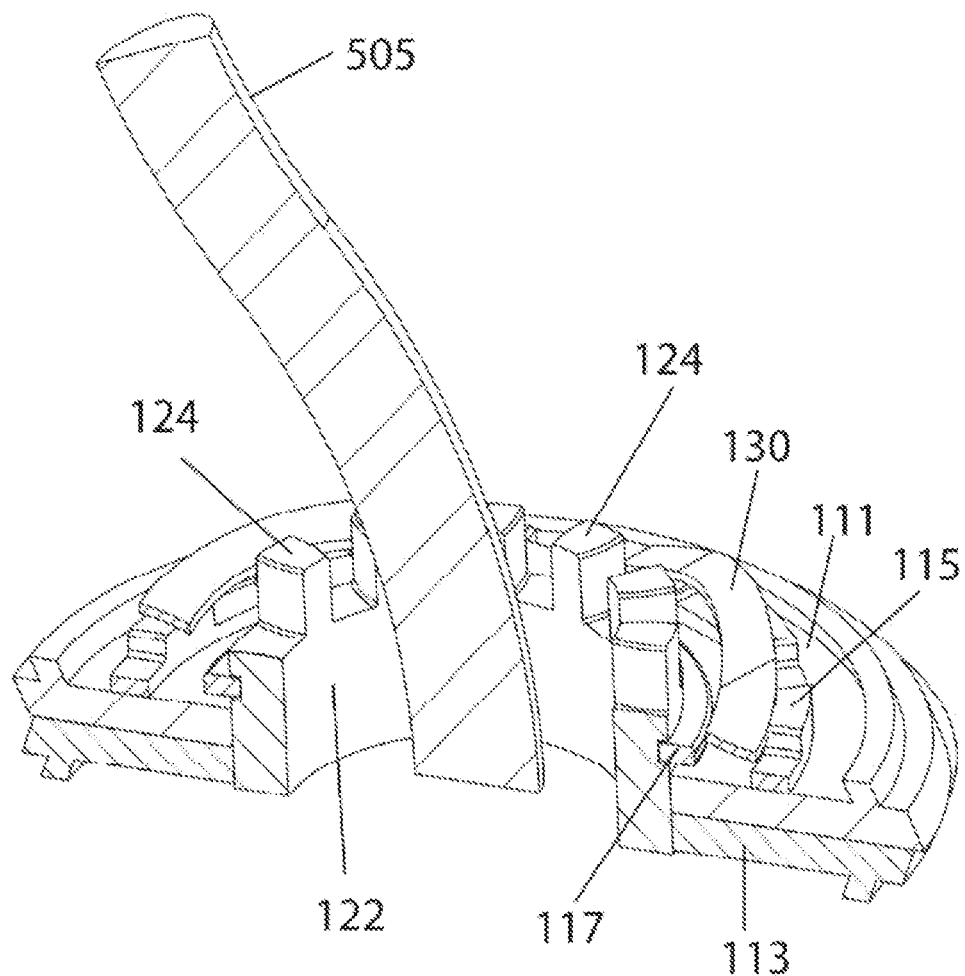
FIG. 3C shows an enlarged sectional view of a connection between adjacent links

FIG. 3C shows plate 113 integrated with pin 122. Plate 113 includes a plurality of beveled teeth 115 extending around perimeter thereof. A retaining ring 117 secures pin 122 with respect to plate 111 of adjacent link 102. Wave spring 130 is located between retaining ring 117 and beveled teeth 115. Wave spring 130 biases bevel gear 306 away from pin 122 (See FIG. 14A).

Figure 2A:
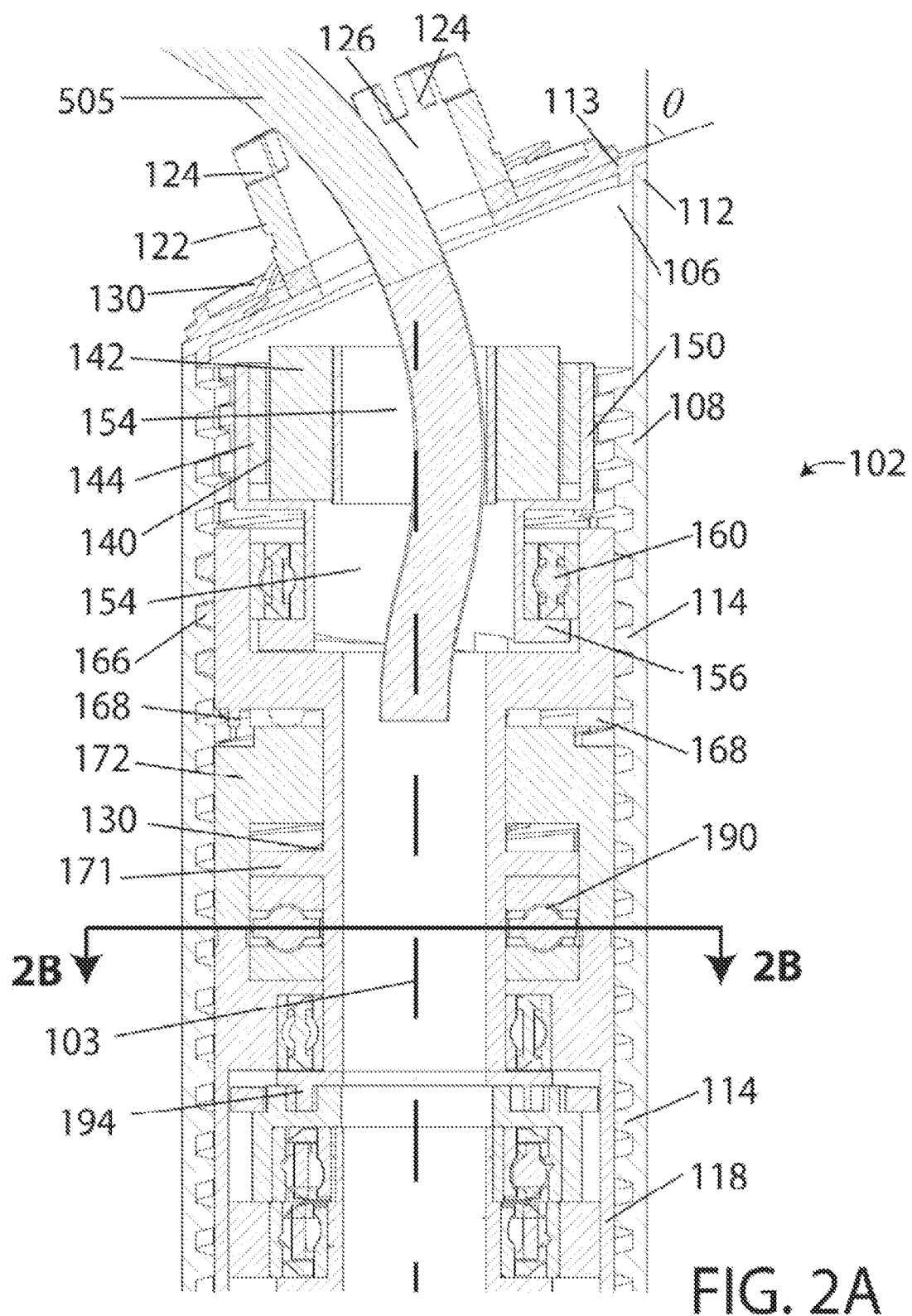
FIG. 2A shows an enlarged view of a proximal end of the link shown in FIG. 2.
Figure 4:
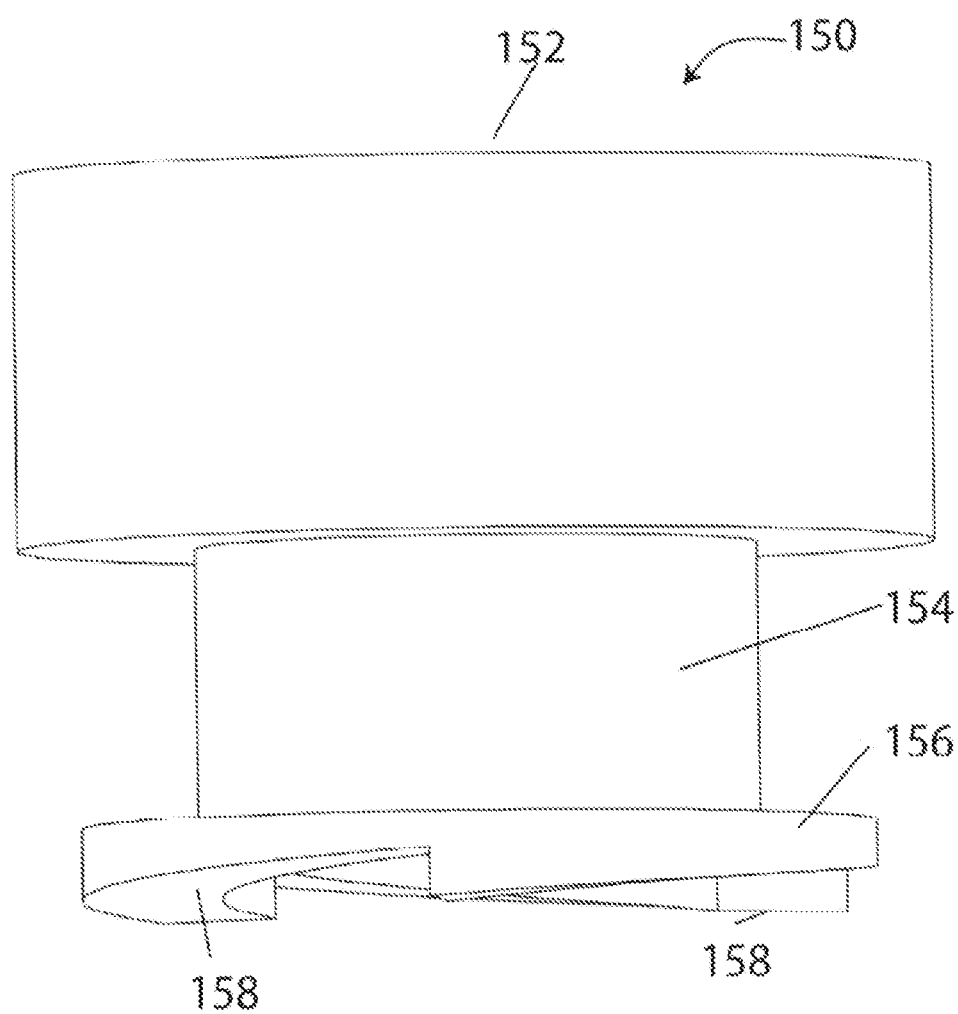
FIG. 4 shows a side elevational view of a helix ball adjuster used with the link shown in FIG. 2.

FIG. 2A shows a first motor 140 mounted within a helix ball adjuster 150, which is shown in detail in FIG. 4. First motor 140 includes a stator 142 surrounded by a rotor 144. Rotor 144 is fixedly engaged with a proximal passage 152 in ball adjuster 150, such that, when motor 140 is operated, rotor 144 also rotates ball adjuster 150. Ball adjuster 150 also includes an intermediate passage 154, having a narrower outer diameter than proximal passage 152. Proximal passage 152 and intermediate passage 154 extend axially therethrough, allowing for the passage of driveshaft 505. Stator 140 is rotolinearly fixed relative to inner cylinder 118.

A first ball bearing assembly 160 (shown in FIG. 2A) is fixed on the outer perimeter of intermediate passage 154. A distal end 156 of ball adjuster 150 includes a plurality of ramps 158 that extend distally away from ball adjuster 150. In an exemplary embodiment, three ramps 158 are used, although those skilled in the art will recognize that more or less than three ramps 158 can be used.

Figure 5:
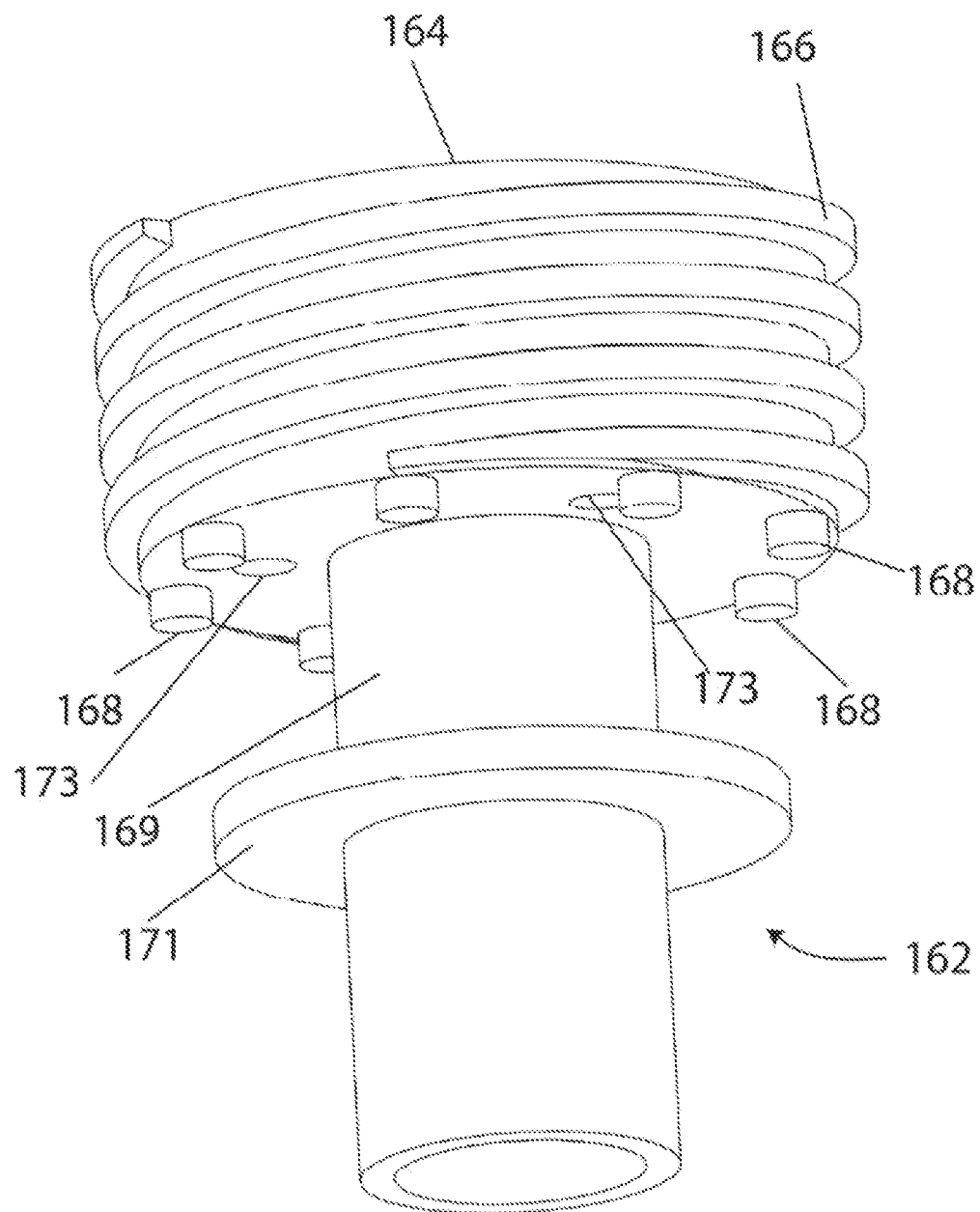
FIG. 5 shows a perspective view of a nut layout bearing support post used with the link shown in FIG. 2.

A nut layout bearing support post 162, shown in detail in FIG. 5, includes a proximal passage 164 into which the outer race of first ball bearing assembly 160 is inserted. An outer perimeter of proximal passage 164 includes a threaded surface 166 that is threadably engaged with internal threads 114 of outer housing 108. A plurality of pins 168 extend from distal surface of proximal passage 164. A distal end 169 of post 162 includes a generally annular disc 171 extending outwardly therefrom. Distal end 169 of post 162 also includes a plurality of channels 173, spaced radially about longitudinal axis 103.

Figure 6:
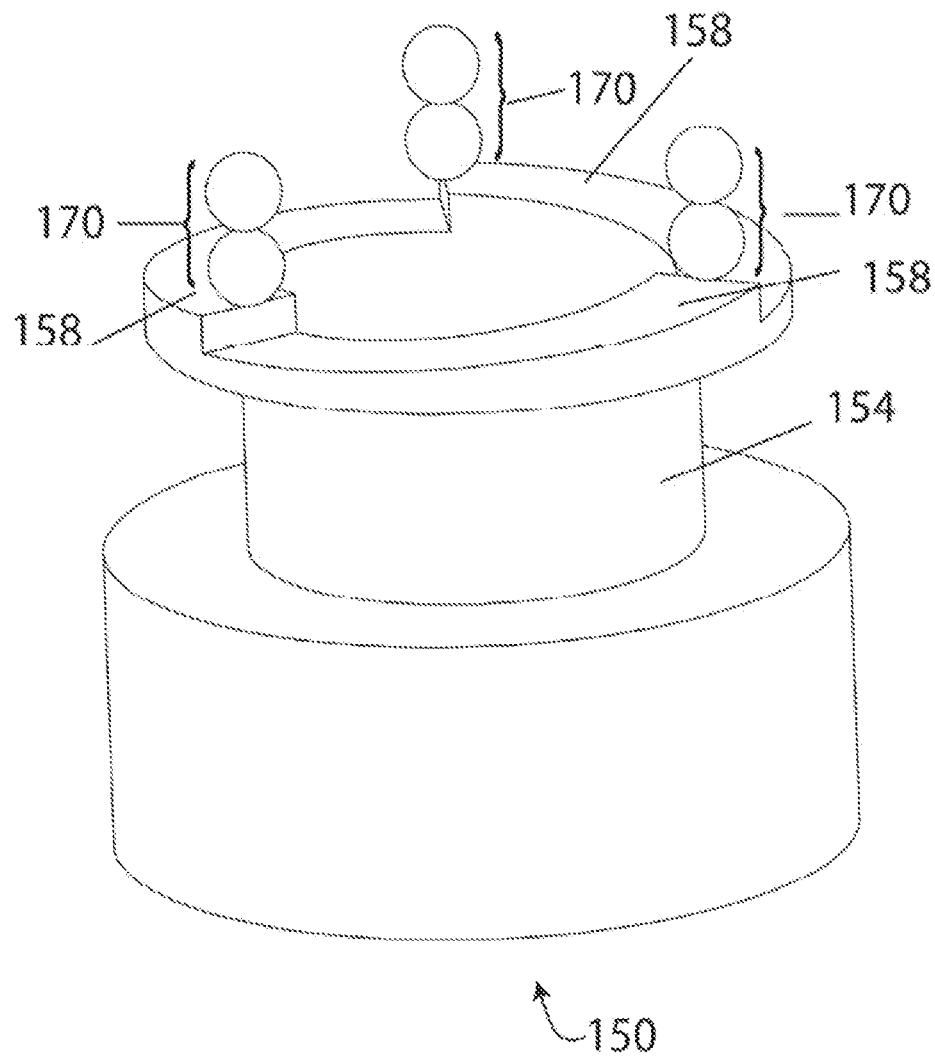
FIG. 6 shows a perspective view of the distal end of the nut layout bearing support post shown in FIG. 5.
Figure 6A:
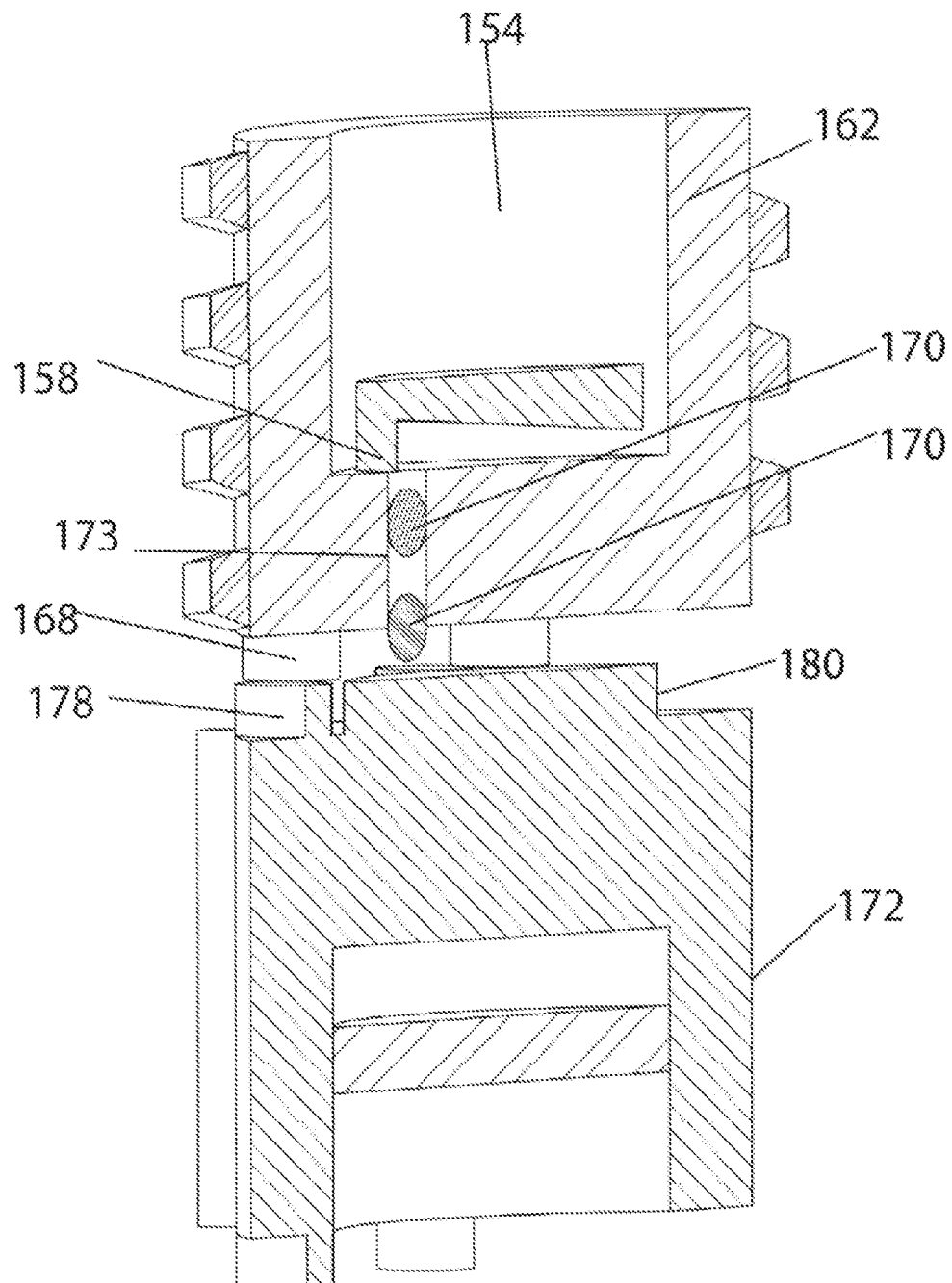
FIG. 6A shows a sectional view of the ball adjuster and spacer in the link shown in FIG. 2.

As shown in FIGS. 6 and 6A, a pair of balls 170 is provided in channels 173 for each ramp 158. A spacer 172 is shown in FIGS. 7A and 7B. Spacer 172 is a generally annular ring having a passageway 174 extending axially therethrough. A proximal end 176 of spacer 172 includes a plurality of projections 178 spaced around an outer periphery thereof. An annular plate 180 extends outwardly from proximal and 176 within the perimeter defined by projections 178. Proximal end 176 of spacer 172 fits over distal end 169 of post 162, between disc 171 and pins 168.

Referring back FIG. 6A, ball 170 rides on annular plate 180, and, as ramp 158 rotates and translates balls 170 longitudinally, post 162 is longitudinally displaced from spacer 172, such that pins 168 are longitudinally displaced from projections 178.

A plurality of tabs 182 extend around the outer periphery of spacer 172. Tabs 182 slidably engage in longitudinal slots 115 in outer housing 108. A plurality of pins 184 extend outwardly from distal end 186 of spacer 172. Pins 184 engage with projections 119 on inner cylinder 118. Referring back to FIG. 2A and to FIG. 7C, a second wave spring 130 is located between disc 171 and proximal end 176 of spacer 172 such that spring 113 biases spacer 172 proximally from disc 171. A second ball bearing assembly 190 is located on post 162, distal of and adjacent to disc 171, such that inner cylinder 118 is free to rotate independently of post 162.

The pressure from wave spring 130 against tab 182 on post 162 wants to engage pins 168 with projections 178. However, because ramp 158 is pushing balls 170, balls 170 keep pins 168 and projections 178 apart (and teeth 184 engaged below with pins 119 on inner cylinder 118). Rotating ramp 158 allows spring 130 to push against spacer 172, which in turn pushes balls 170 axially in channel 173 along ramp 158. This feature allows for post 162 to rotate relative to spacer 172 and inner cylinder 118 while continuing to restrict its longitudinal motion.

Figure 8:
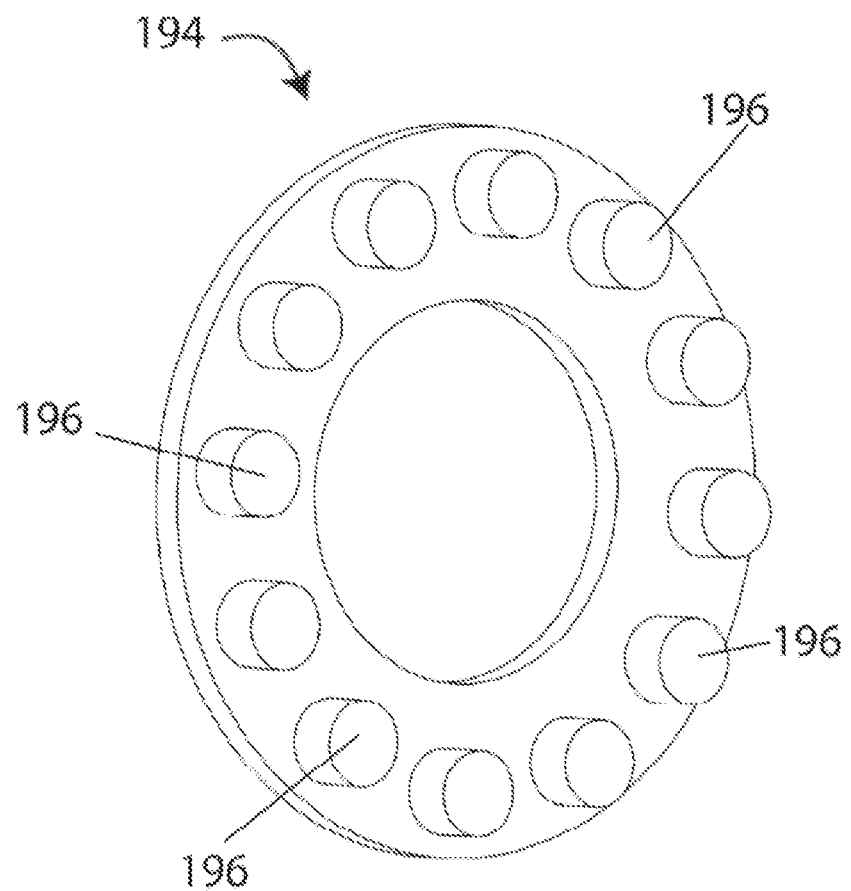
FIG. 8 is a perspective view of an output disc used with the link shown in FIG. 2.
Figure 9:
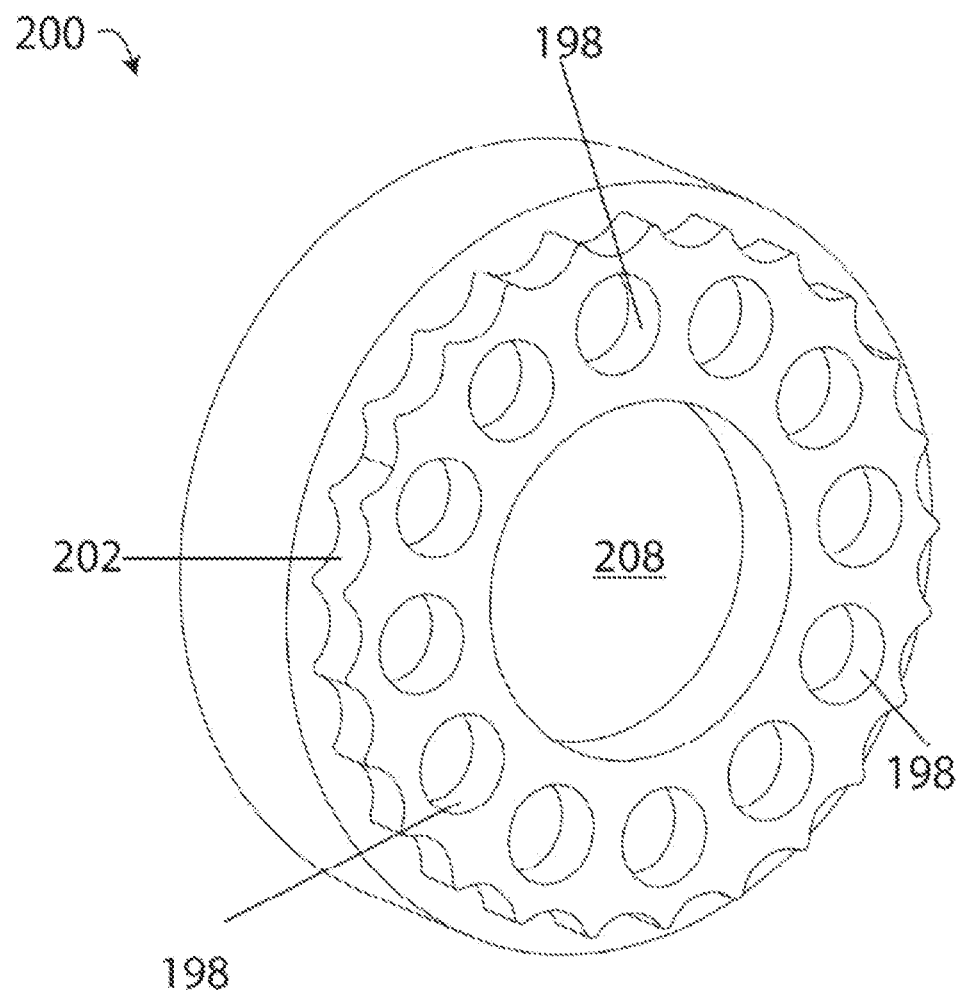
FIG. 9 is a perspective view of a cycloid rotor used with the link shown in FIG. 2.

A third ball bearing assembly 192 extends distally of second ball bearing assembly 190 and supports rotation of inner cylinder 118 axially about distal end 169 of post 162. An output disc 194, shown in more detail in FIG. 8 is a generally annular disk with a plurality of projections 196 extending distally therefrom. Each projection 196 fits into a corresponding opening 198 in a cycloid rotor 200, shown in detail in FIG. 9. Cycloid rotor 200 is a generally annular sleeve having a distal gear 202 extending outwardly therefrom. In an exemplary embodiment, gear 202 has about 25 involute teeth. Additionally, openings 198 have a diameter slightly larger than those of projections 196 such that cycloid rotor 200 can rotate eccentrically with respect to output disc 194.

Figure 10:
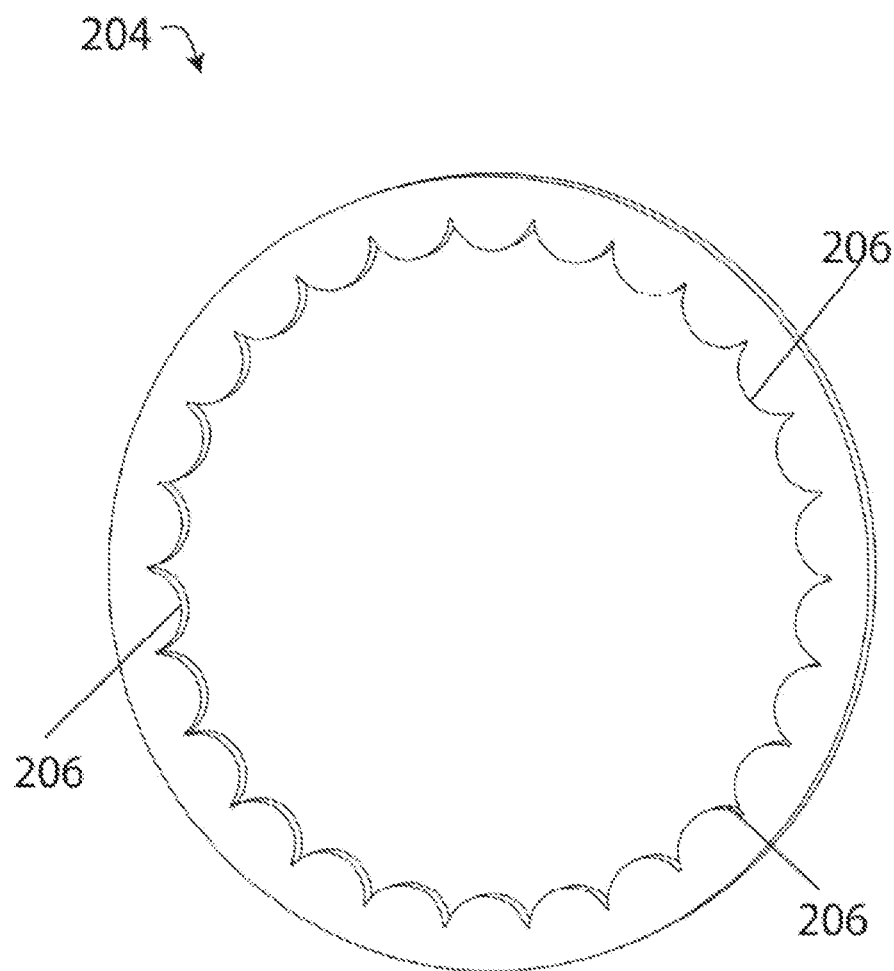
FIG. 10 is a front elevational view of a cycloid housing used with the link shown in FIG. 2.

A cycloid housing 204 is shown in detail in FIG. 10. Cycloid housing 204 extends peripherally outwardly of gear 202 within inner cylinder 118 and has a plurality of volutes 206, more than the number of involute teeth on gear 202. In an exemplary embodiment, cycloid housing 204 includes 26 volutes 206.

A fourth ball bearing assembly 210 is mounted within the inner periphery 208 of cycloid rotor 200, distal of distal gear 202. A fifth ball bearing assembly 212 is located distally of fourth ball bearing assembly 210 and is supported against the interior of inner cylinder 118 by an annular spacer 214.

Figure 11:
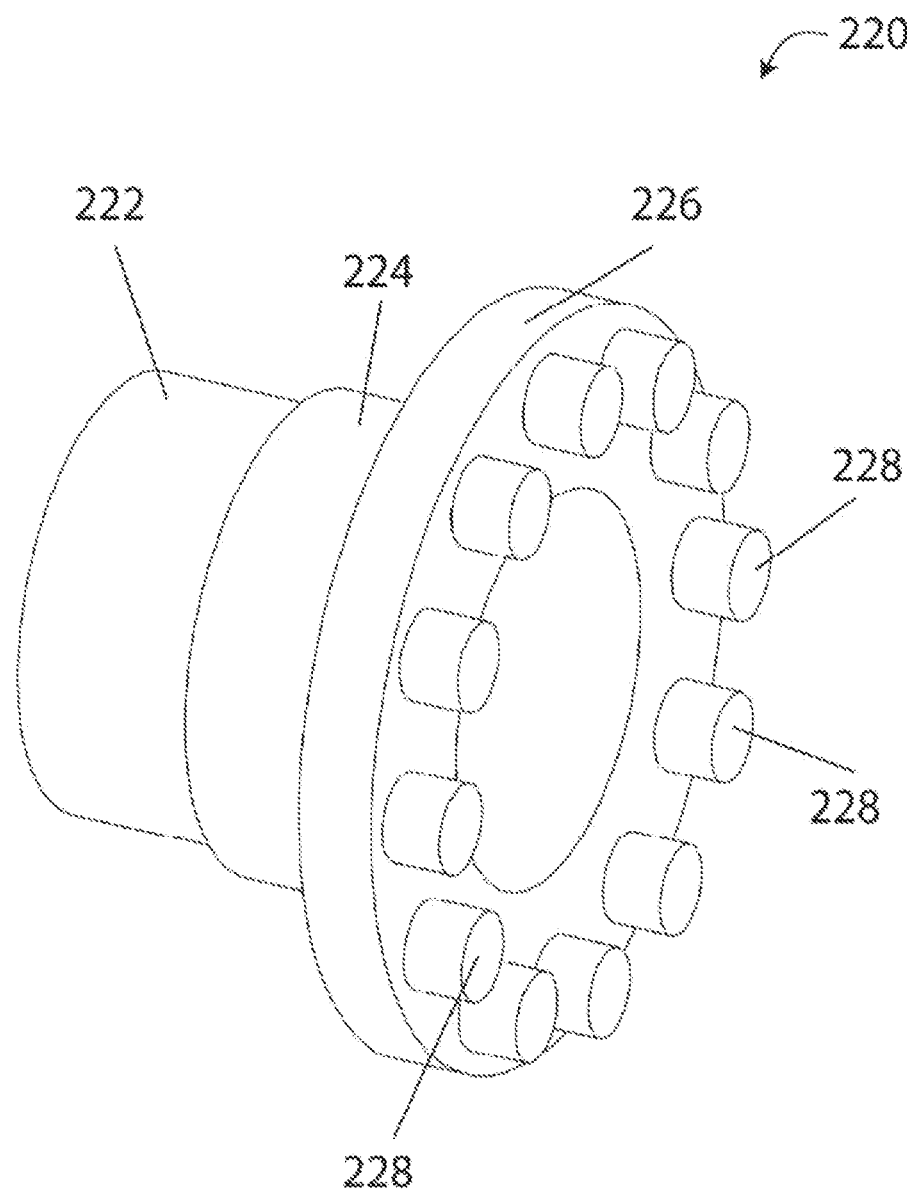
FIG. 11 is a perspective view of an output disc used with the link shown in FIG. 2.

An output disc with sleeve 220 is shown in detail in FIG. 11. Disc 220 has a distal sleeve 222 that supports fourth ball bearing assembly 210 and an intermediate sleeve 224 that supports this ball bearing assembly 212. Disc 220 also includes a distal face 226 with a plurality of projections 228 extending distally thereof. In an exemplary embodiment, projections, 228 are the same number and size as projections 196 on output disc 194.

Figure 11A:
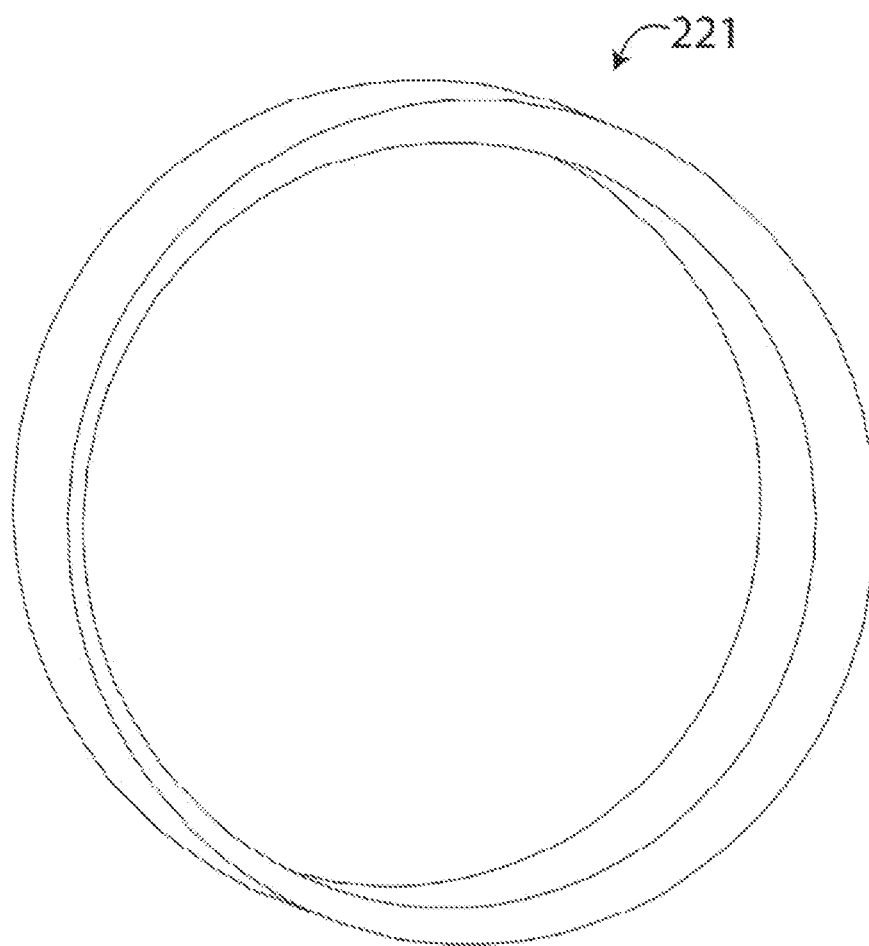
FIG. 11A is a perspective view of a cam used with the link shown in FIG. 2.

A cam 221, shown in more detail in FIG. 11A, is used to counterbalance the eccentric rotation of cycloid rotor 200. Cam 221 slides over distal sleeve 222 and supports fourth ball bearing assembly 210.

Figure 2B:
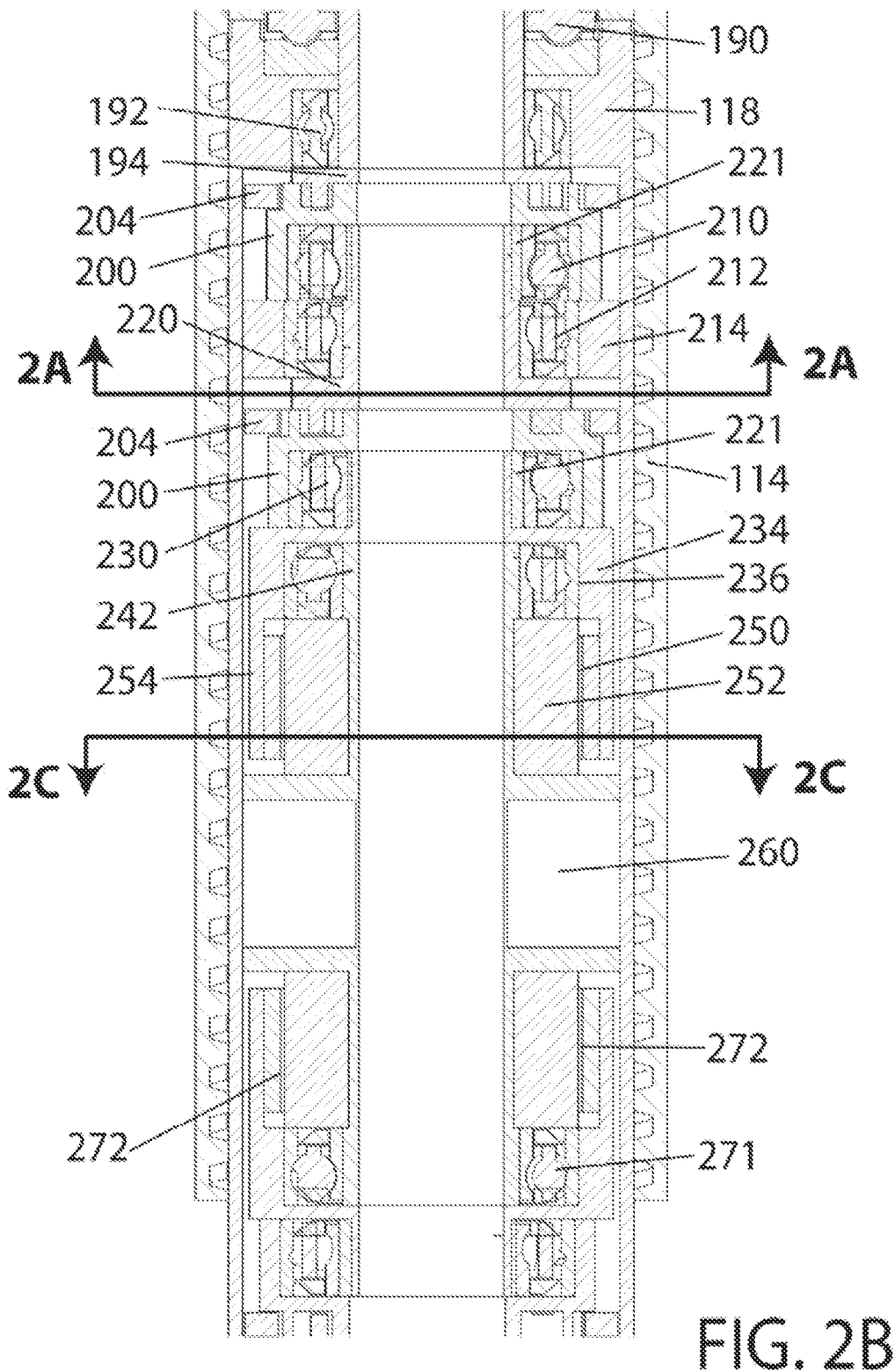
FIG. 2B shows an enlarged view of an intermediate end of the link shown in FIG. 2.
Figure 11B:
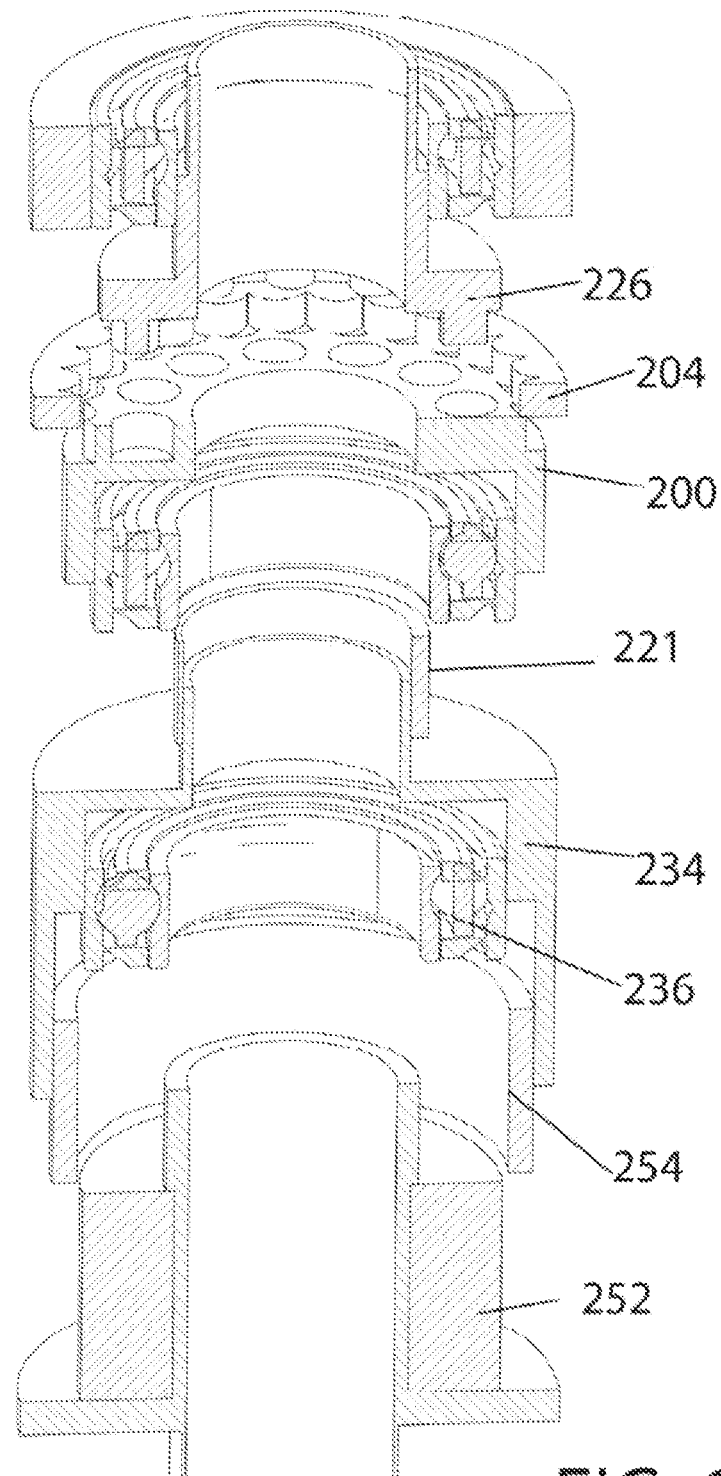
FIG. 11B is an exploded perspective view of a cycloid assembly used with the link shown in FIG. 2.

Disc 220 interacts with a second set of cycloid rotor 200 and cycloid housing 204 as shown in FIG. 2B. A sixth ball bearing assembly 230 is mounted within the inner periphery 208 of the second cycloid rotor 200. In an exemplary embodiment, a combination of first and second cycloid assemblies provide a reduction ratio of about 625:1. An exploded view of the cycloid drive as described above is shown FIG. 11B.

Figure 12:
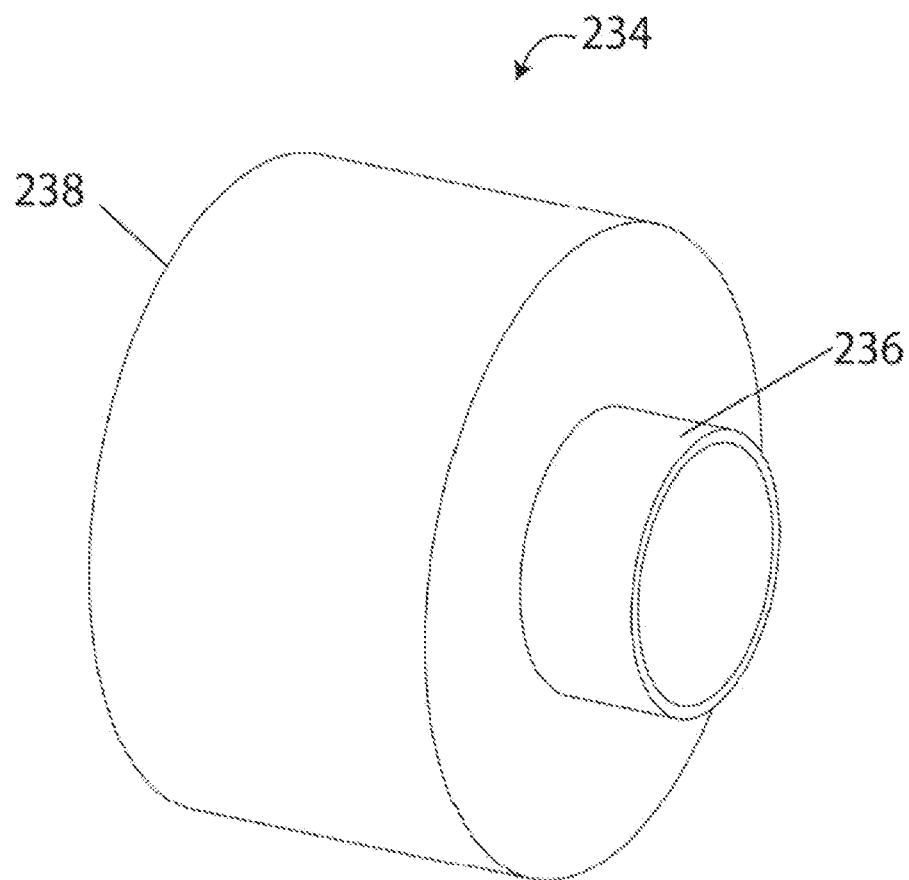
FIG. 12 is a perspective view of a rotor support use with the link shown in FIG. 2.

Referring in detail to FIG. 12, a first rotor support sleeve 234 supports sixth ball bearing assembly 230, and houses a seventh ball bearing assembly 236 located distally of sixth ball bearing assembly 230. Rotor sleeve support 234 includes a proximal sleeve 236 on which sixth ball bearing assembly 230 is supported and a housing 238 that extends distally of sleeve 236.

Figure 13:
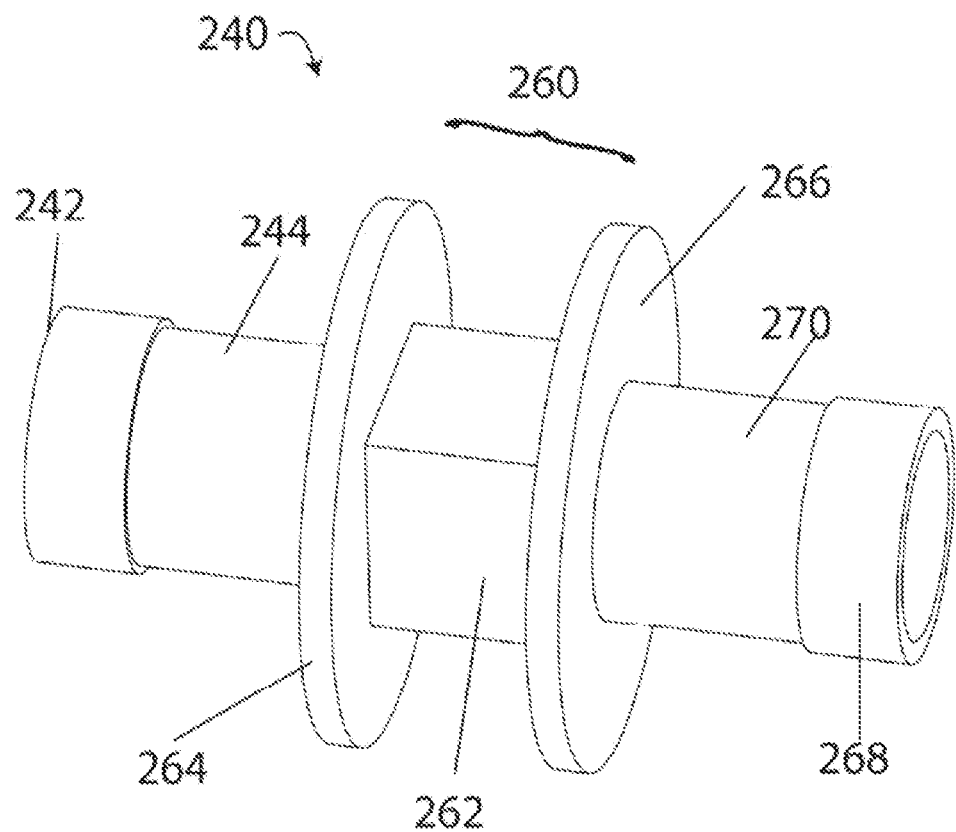
FIG. 13 is a perspective view of a stator support used with the link shown in FIG. 2.

Referring in detail to FIG. 13, a stator support 240 includes a distal lip 242 that supports seventh ball bearing assembly 236 and a sleeve 244 that supports a second motor 250. Second motor 250 includes a stator 252 that is supported by sleeve 254 and a rotor 256 that is engaged with proximal sleeve 236 on rotor sleeve support 234 such that, when second motor 250 rotates, rotor sleeve support 234 rotates as well.

Stator support 240 includes an intermediate portion 260 that includes a spool 262 bounded by a proximal lip 264 and a distal lip 266. The proximal lip 264 and distal lip 266 are fixed to inner cylinder 118. Although not shown in FIG. 2B, electronic drivers can be located within intermediate portion 260 for controlling the motors and any other electrical/electronic elements located in link 102. Stator support 240 also includes a proximal lip 268 that supports an eighth ball bearing assembly 271 and a sleeve 270 that supports a third motor 272 (shown in FIGS. 2B and 2C). A second rotor support sleeve 234, identical to first rotor support sleeve 234, but rotated 180° such that sleeve 236 extends distally of housing 238 is provided such that housing 238 engages rotor 273 of third motor 272, as well as eighth ball bearing assembly 271. Additionally, a ninth ball bearing assembly 280 is located on the exterior of sleeve 236. A third cycloid rotor 200 is attached to ninth ball bearing assembly 280. Rotor 200 is aligned such that gear 202 extends distally of inner periphery 208, with ninth ball bearing assembly 280 inserted within inner periphery 208 and a third cycloid 220 extending distally of rotor 200.

Tenth and eleventh ball bearing assemblies 284, 286, respectively are mounted on sleeves 224, 222 of third cycloid 220, respectively, with a spacer 214 supporting tenth ball bearing assembly 284 against the interior of inner cylinder 118. Eleventh ball bearing assembly 286 is fixed to a fourth cycloid rotor 200, which, in turn is engaged with a fourth cycloid 220 such that, in an exemplary embodiment, combination of third and fourth cycloid assemblies provides a reduction ratio of about 625:1.

A twelfth ball bearing assembly 290 extends distally of fourth cycloid assembly, and is engaged with a mechanical drive 300 that is used to longitudinally translate a bevel gear 302 along longitudinal axis 103 at distal end 111 of link 102. An exemplary mechanical drive 300 is shown in FIGS. 14A-14F.

A hollow shaft 310 is fixedly connected to output disc 220, through bearing 290. As seen in FIGS. 14B-14E, shaft 310 includes a generally T-shaped slot 312. A disk 314 is located at a distal end of shaft 310. A wave spring 130 is located distally of disk 314. An output shaft 320 disposed within shaft 310. Output shaft 320 includes a projection 322 that extends into slot 312. Projection 322 is sized to allow projection 322 to move around within slot 312. While a single combination of slot 312 and projection 322 is shown, those skilled in the art will recognize that additional combinations can be provided around shaft 310.

A distal end of shaft 320 also includes a disk 324 such that spring 130 is wedged between disk 314 and disk 324, biasing disk 324 away from disk 314. Disk 324 is connected to bevel gear 302. Bevel gear 302 is operatively engaged with internal bevel gear 304. Internal bevel gear 304 includes a plurality of distal teeth 308, located within an outer housing 306. Additionally, a distal and outer housing 306 includes another plurality of teeth 316. Teeth 308 are longer than teeth 316 such that teeth 308 are always engaged with teeth 124 on pin 122, which is fixed relative to the angle face 115 of the previous link 102.

Figure 14:
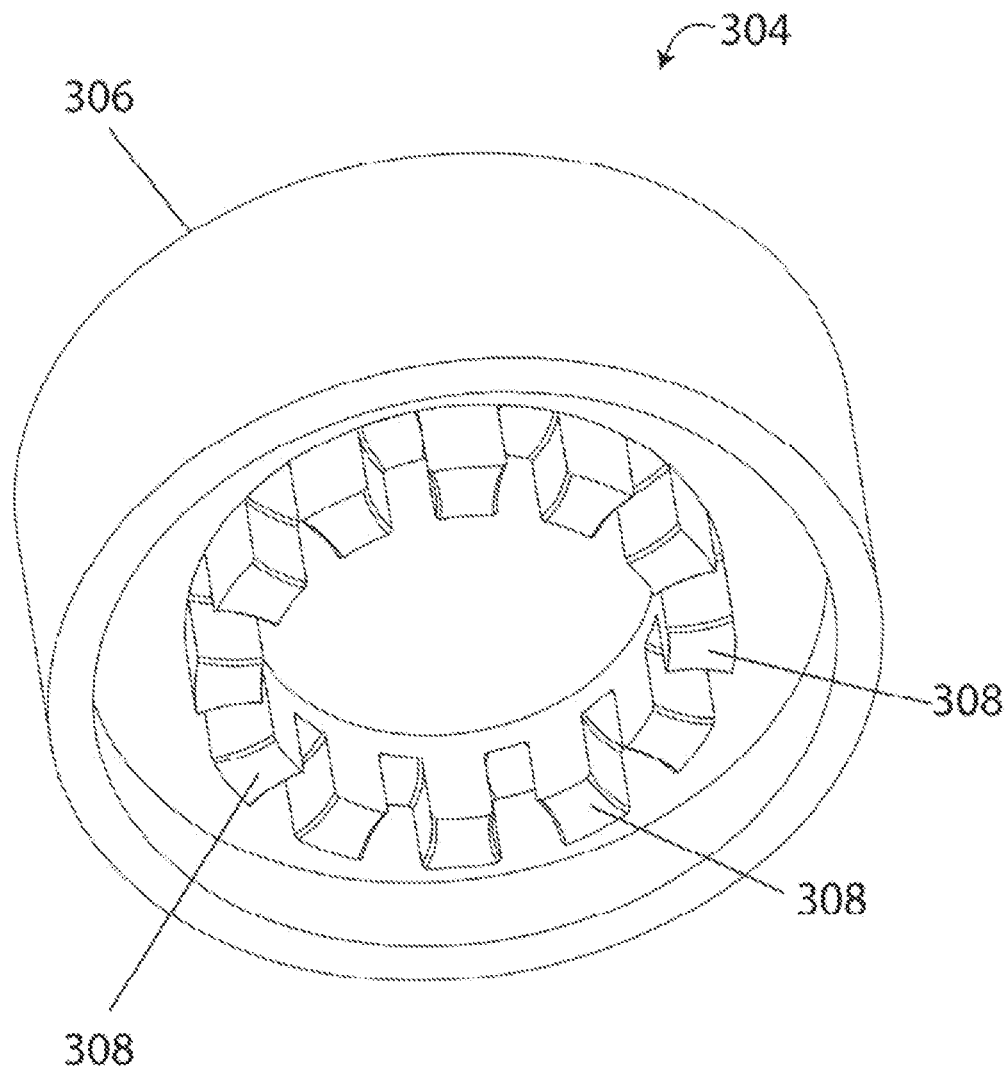
FIG. 14 is a perspective view of a female curvic pin used with the link shown in FIG. 2.
Figure 14A:
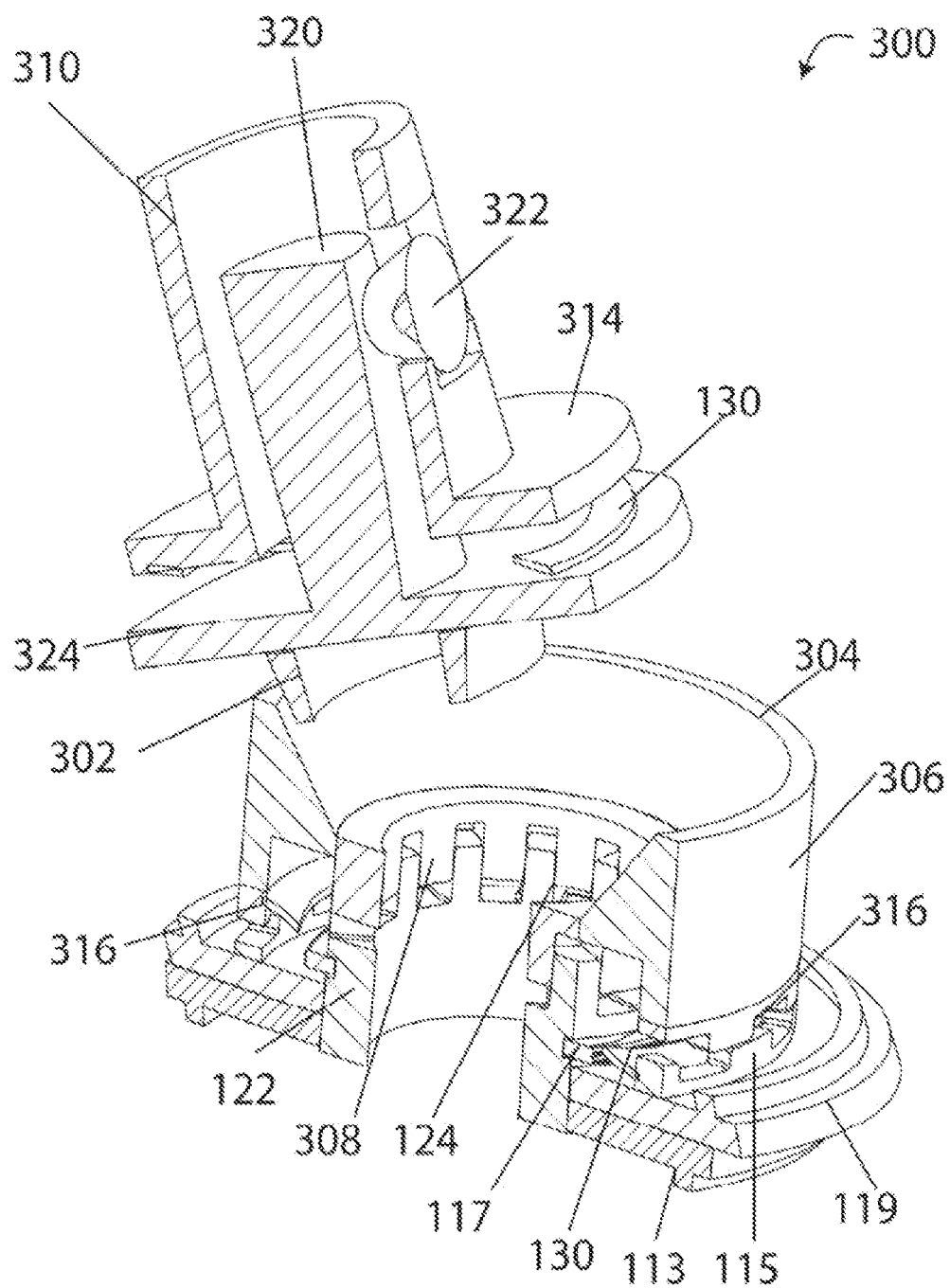
FIG. 14A is a perspective view, in section, of a connection between a link shown in FIG. 2 and an adjacent link.
Figure 14B:
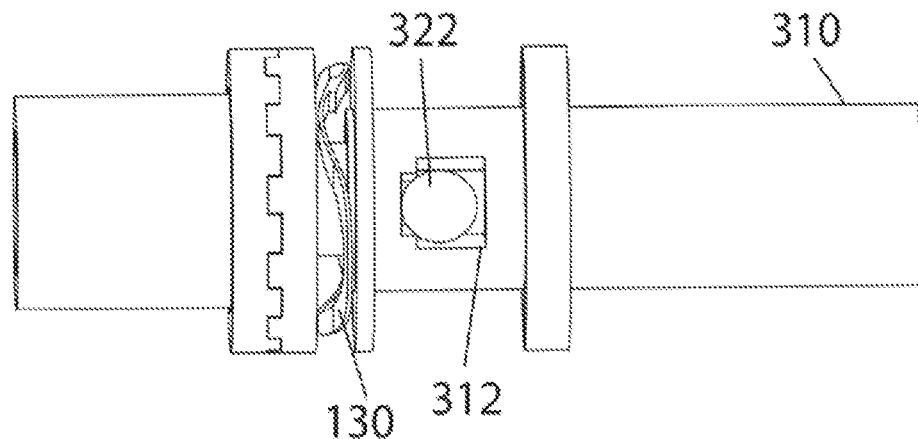
FIG. 14B is a top plan view of the connection shown in FIG. 14A, with the first link interconnected with the second link.
Figure 14C:
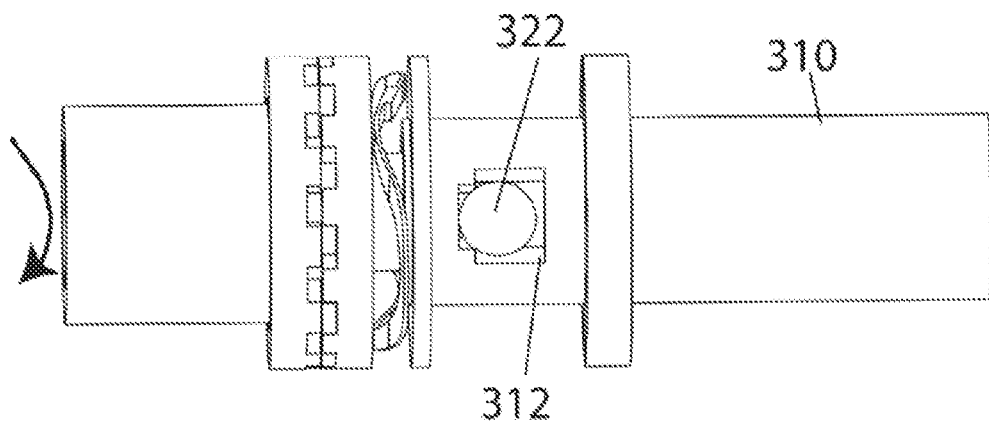
FIG. 14C is a top plan view of the connection shown in FIG. 14B, with the first link moving out of connection with the second link.

As bevel gear 302 is translated distally, bevel gear 302 engages internal bevel gear 304, shown in detail in FIG. 14. Internal bevel gear 304 includes a proximal end 306 that engages with bevel gear 302 and a plurality of interior teeth 308 that engage with teeth 124 on male curvic pin 122 of an adjacent link 102.

Instead of mechanical drive 300, an alternative mechanical drive 1000, such as the drive disclosed in U.S. Provisional Patent Application Ser. No. 62/278,487, filed on Jan. 14, 2016 by the present inventor, and which is incorporated herein by reference in its entirety, can be used. Drive 1000 is shown in FIGS. 14G-14R.

Figure 14D:
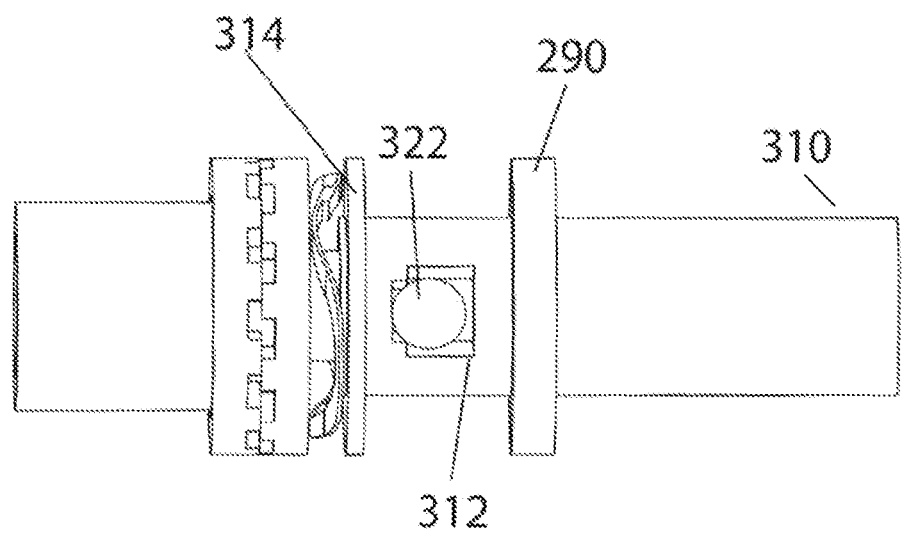
FIG. 14D is a top plan view of the connection shown in FIG. 14C, with the first link moving back into connection with the second link.
Figure 14E:
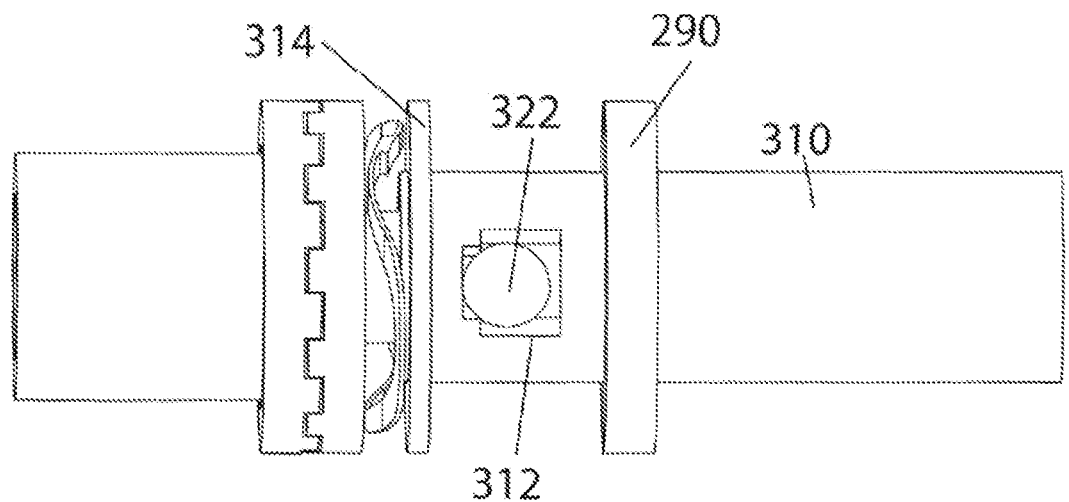
FIG. 14E is a top plan view of the connection shown in FIG. 14D, with the first link moved back into connection with the second link.
Figure 14F:
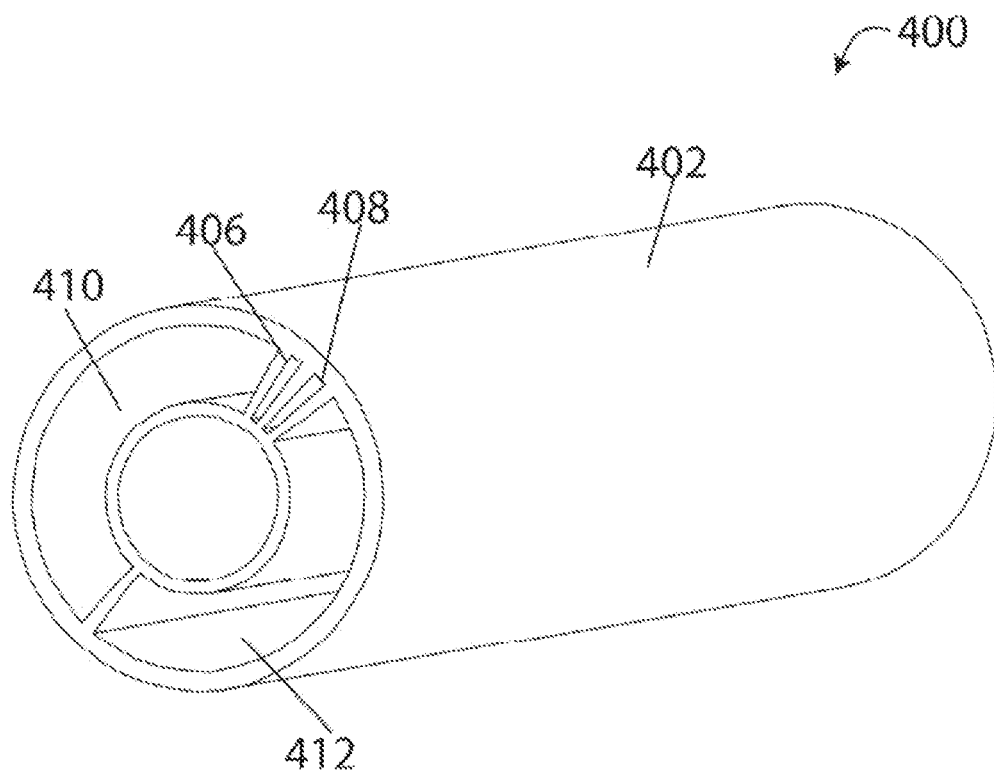
FIG. 14F is a perspective view of a wire core use with the link shown in FIG. 2.
Figure 14G:
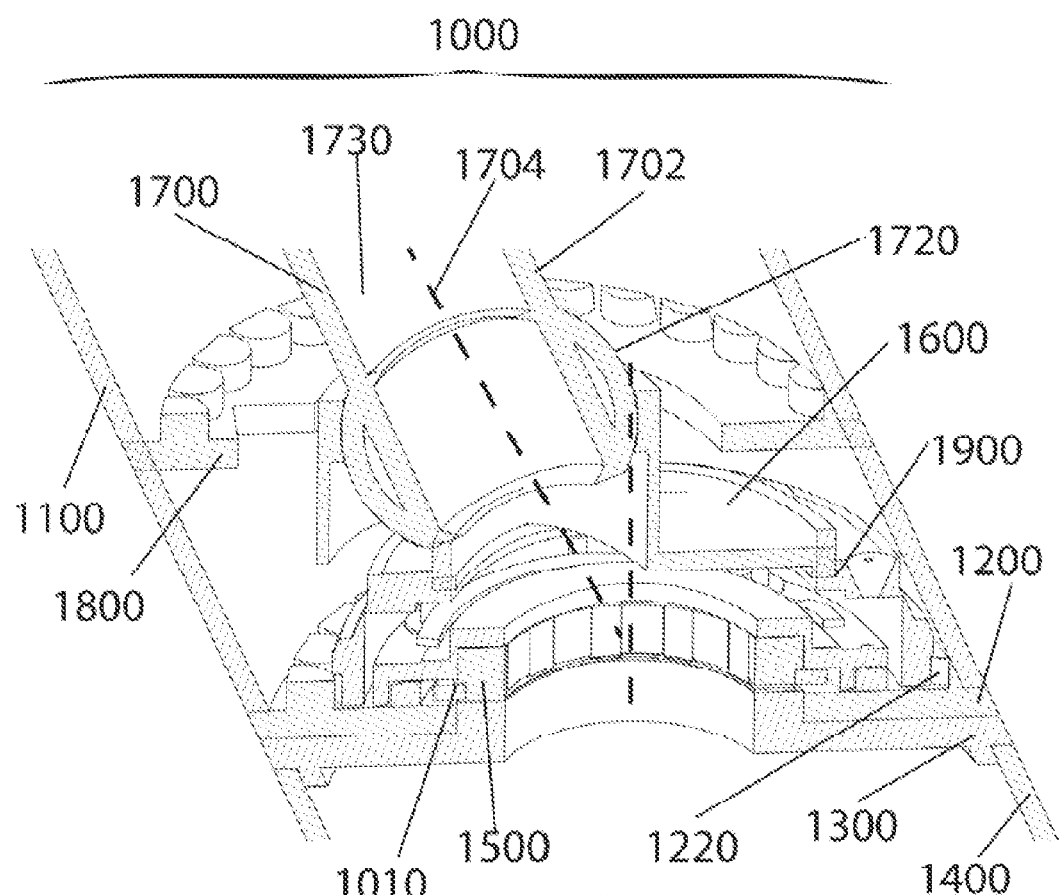
FIG. 14G shows a cross-sectional view of a link using an alternative embodiment of a mechanical drive with details of individual components of gear and rotation system.

FIG. 14G shows a cross sectional view of a 3-dimensional cycloid drive with integrated locking mechanism applied to actuating proximal link 102 relative to an adjacent link 102 about the plane of end plate 111. Again, while in the current embodiment the aforementioned gear train and locking system have been applied to robotic joint actuation, those skilled in the art will recognize that the inventive drive may also be employed in any situation in which it is necessary to transmit power from one plane to another. Furthermore, in the exemplary embodiment, the intersection of the axes about which rotation is occurring does not necessarily need to intersect at a point within the mechanism. While a solution to be described herein has been devised and implemented to correct this, the trivial case where the two axes intersect at the point of action may also be implemented using this design.

FIG. 14G also shows the constituent parts of the inventive 3-dimensional cycloid drive with integrated locking mechanism, which include an input shaft having an eccentric body mounted on a distal end thereof. An input cam is operably coupled to the eccentric body. A speed reducer is operatively coupled to the input cam. An output is operably coupled to the speed reducer.

Figure 14H:
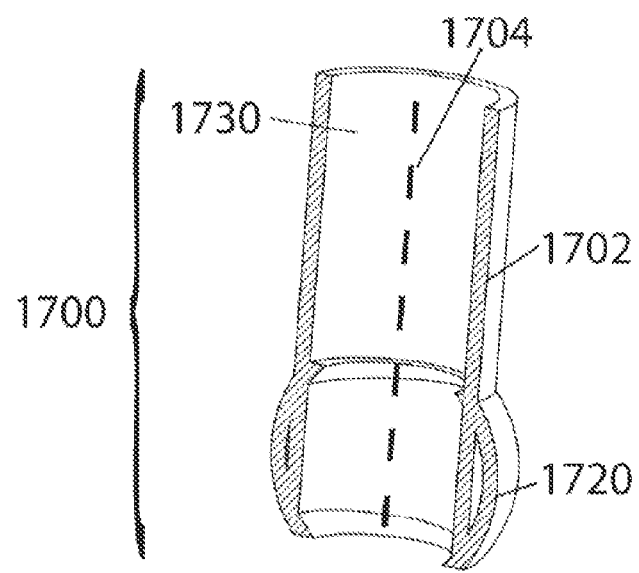
FIG. 14H shows a cross section view of the input to the drive train from a rotational power source.

Specifically, an input shaft 1700 has a distal end 1702 with an eccentric sphere 1720 (shown in detail in FIG. 14H). Sphere 1720 drives an eccentric input cam 1600 that is inserted inside and interacts with a cycloid rotor 1900. Pins 1560 on curvic output disk 1500 (shown in detail in FIGS. 14P and 14Q) interact with a cycloid rotor 1900 while also selectively engaging teeth 1240 on proximal face 1200 (shown in detail in FIGS. 14M and 14N and distal pin face 1300. A keyed disk 1800 in link 1100 is used to maintain alignment of eccentric input 1600 within link 1100.

FIG. 14H shows primary parts of input shaft 1700. Shaft 1700 includes a longitudinal axis 1704 extending centrally therethrough. Shaft 1710 receives rotational power from a proximal source (not shown), which can be an electric motor, a hand-operated crank, or other suitable mechanism for providing rotational power. A hollow cavity 1730 is maintained throughout the length of shaft 700. Cavity 1730 allows for the passage therethrough of other elements such as, for example electrical, gas (oxygen or other gas), or fluid cables (not shown). Additionally, remaining elements of robot 1000 that will be described below also have generally centralized passages therethrough to allow for the passage of cables, conduits, or other material as described immediately above.

Figure 14I:
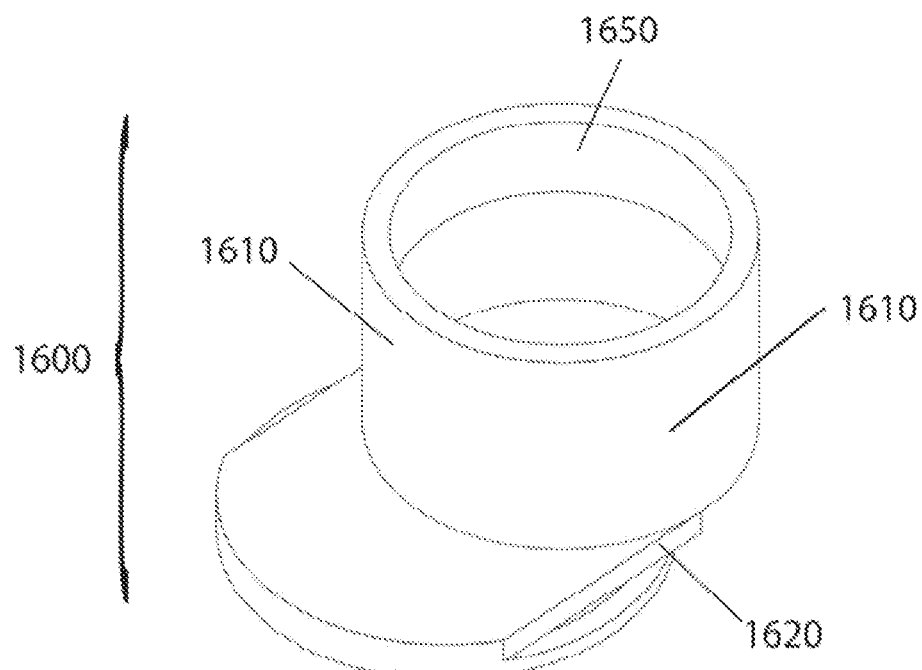
FIG. 14I shows a perspective view of an eccentric input mechanism.
Figure 14J:
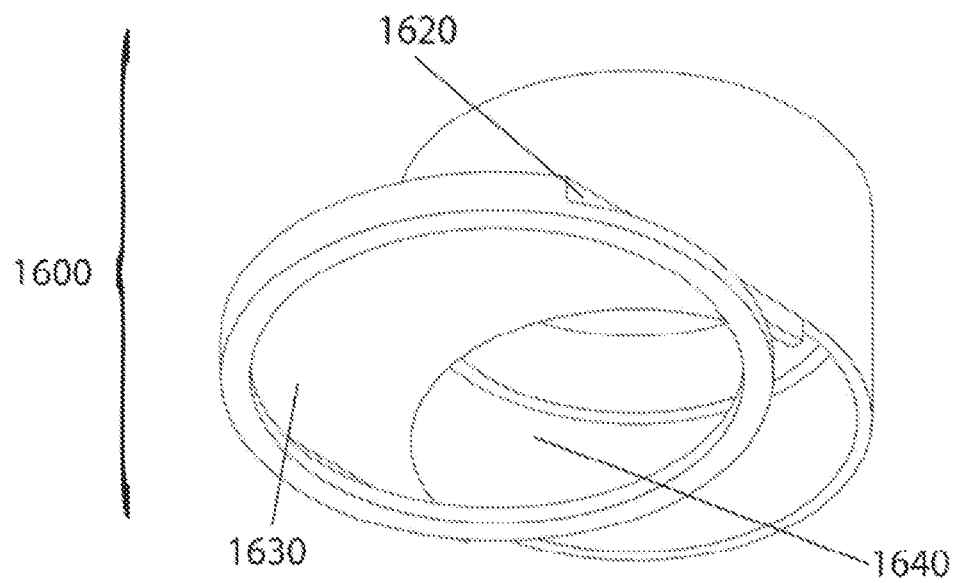
FIG. 14J shows an upward view of the eccentric input mechanism shown in FIG. 14I.

FIGS. 14I and 14J show eccentric input disk 1600. Input disk 1600 includes a tubular receiver 1650 that is concentrically located within a housing 1610. Receiver 1650 is sized to allow eccentric sphere 1720 to be inserted into and to rotate concentrically therein. A cycloid rotor output 1630 is eccentrically mounted to housing 1610. A hollow cavity 1640 is provided within rotor output 1630 such that hollow cavity 1640 provides communication to receiver 1650, as shown in FIG. 14J. Rotor output 1630 includes a linear edge portion 1620 that is sized to travel within key slot 1820 (shown in FIG. 14R) preventing rotation of eccentric input disk 1600 yet allowing for planar translation thereof. In arrangements where axes intersect directly, spherical receiver 1650 may be concentric with rotor output 1630. Further, while linear edge portion 1620 is shown in FIG. 14I as being located at the bottom of housing 1610, those skilled in the art will recognize that linear edge portion 1620 can be lasted anywhere along the length (height) of housing 1620. For example, in the embodiment of robot 1000 shown in FIG. 14G, linear edge portion 1620 can be co-planar with the plane of disk 1800 such that linear edge portion 1620 is able to oscillate within key slot 1820.

Figure 14K:
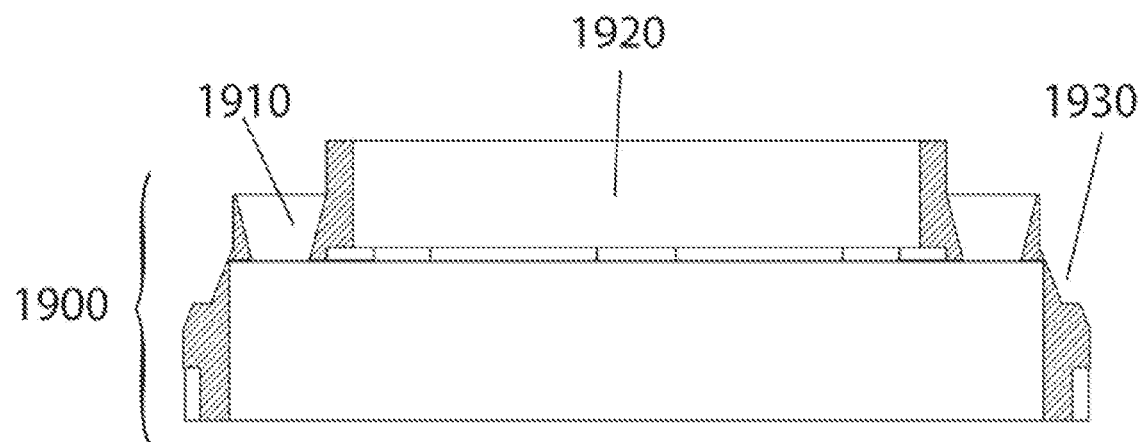
FIG. 14K shows a cross sectional view of a cycloid rotor with lifters.
Figure 14L:
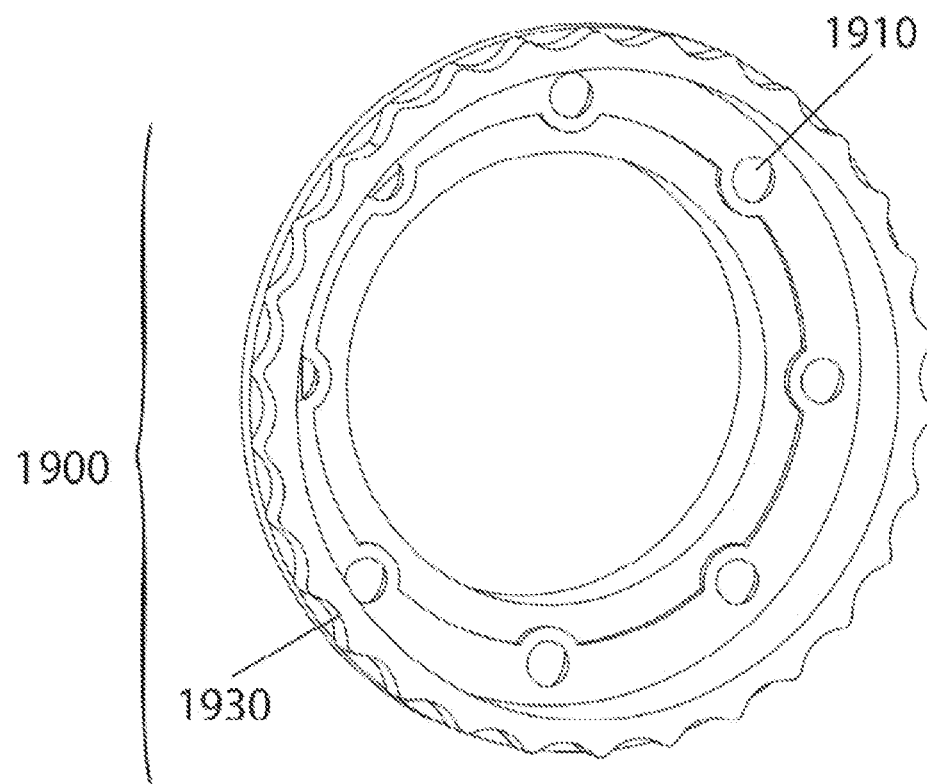
FIG. 14L shows a bottom view of the cycloid rotor shown in FIG. 14K.

FIGS. 14K and 14L illustrate the cycloid rotor 1900. Cycloid rotor 1900 includes an eccentric input receiver 1920 that remains concentric with rotor output 1630. Output pin holes 1910 allow for transmission of power to pins 1560. In the exemplary embodiment shown where the inventive drive is also capable of self-locking and unlocking, the walls of holes 1910 are tapered such that tangential loading results in an upward force on pins 1560. For more general uses, holes 1910 may remain cylindrical. Those having skill in the art will recognize that while a tapered wall modification has been shown, other methods exist to accomplish the same motion. Cycloidal profile 1930 is machined into the periphery of the cycloid rotor 1900 such that cycloidal profile 1930 may interface with housing profile 1220.

Figure 14M:
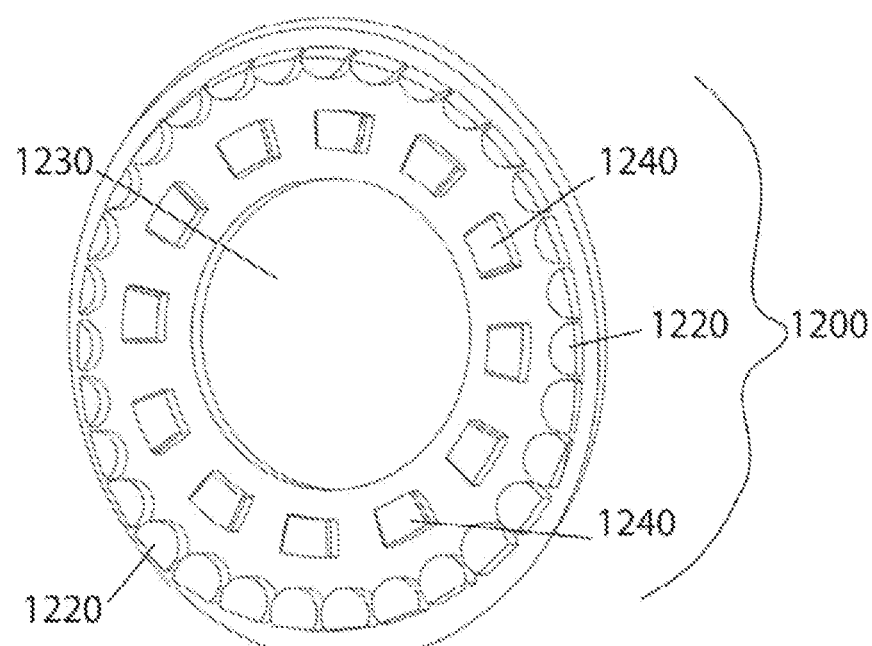
FIG. 14M shows a top view of a proximal base plate with curvic and cycloidal teeth.
Figure 14N:
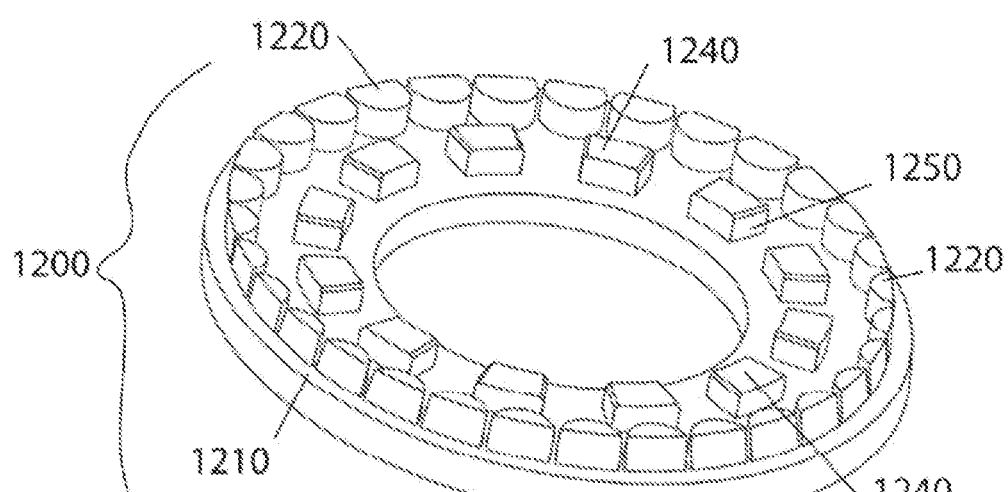
FIG. 14N shows a perspective view of the base plate from FIG. 14M.

FIGS. 14M and 14N show the proximal face 1200. A groove 1210 is cut at an angle such that groove 1210 interlocks with body 1100, thereby preventing relative rotation between body 1100 and proximal face 1200. Cycloid housing teeth 1220, spaced about an outer periphery of proximal face 1200, are cut into face 1200 to interact with rotor 1900, as shown in FIG. 14G. Curvic teeth 1240 extend outwardly from the face concentric to hollow opening 1230. The teeth 1240 have optional chamfered edge modification 1250 to facilitate smoother operation of mechanism. Optionally, in an alternative embodiment, cycloid housing 1220 may be made a part without face and additional curvic teeth.

Figure 14O:
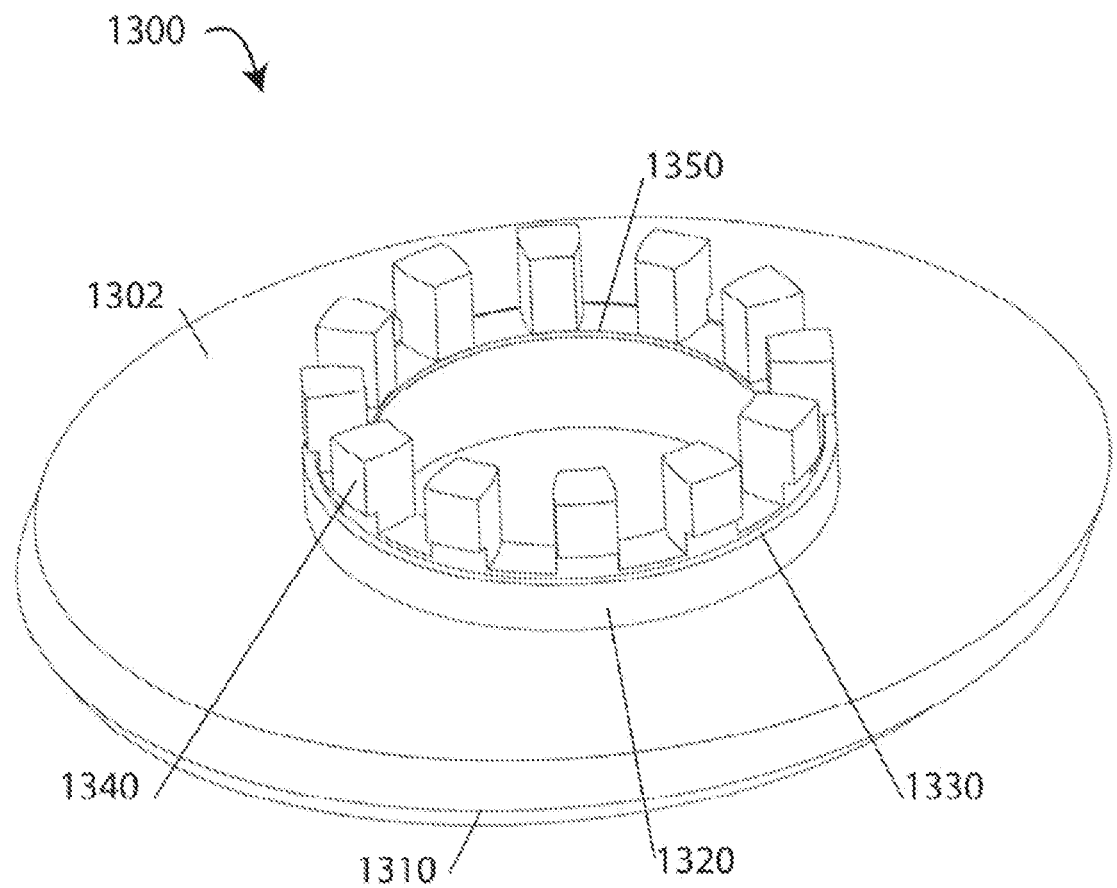
FIG. 14O is a perspective view of a distal top plate with pin containing curvic teeth.

FIG. 14O shows distal face 1300 with pin 1320 and curvic teeth 1340. A groove 1310 is machined into periphery to engage with link 1400 and prevent relative rotation. Pin 1320 protrudes from face 1302 and remains concentric with hollow opening 1230 on proximal face 1200. Groove 1330 and corresponding curvic tooth modification allow for a retaining ring 1390, shown in FIG. 14P, to be inserted to prevent proximal face 1200 and distal face 1300 from separating from each other. Curvic teeth 1340 are cut into pin 1320. Cavity 1350 is machined in center of pin 1320.

Figure 14P:
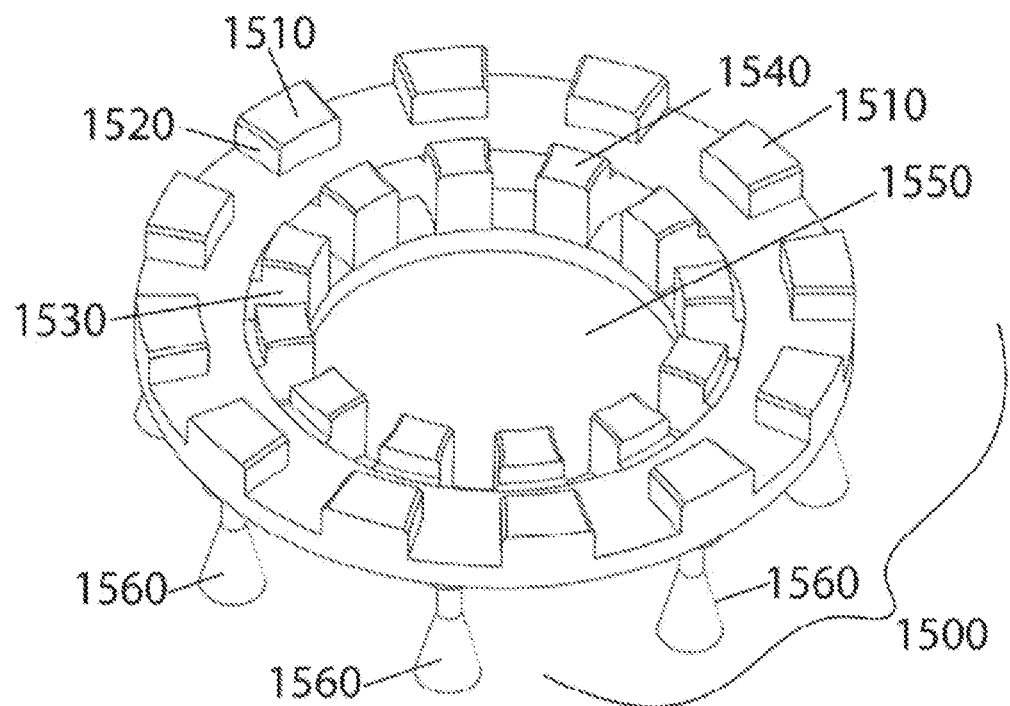
FIG. 14P is a bottom perspective view of an output disc with two curvic teeth sets and pins for lifting mechanism.
Figure 14Q:
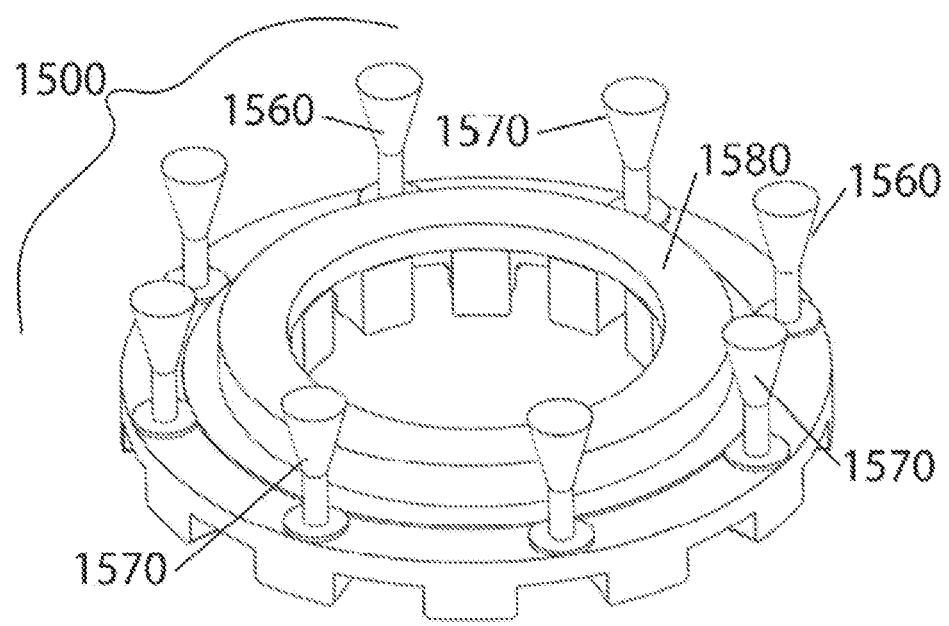
FIG. 14Q is a top perspective view of output disk in FIG. 14P.

FIGS. 14P and 14Q show output disk 1500 with curvic lockout teeth. In this embodiment which allows for the gear train to also self-lock and unlock motion, inner teeth 1540 and outer teeth 1510, both sets of which are curvic in this exemplary embodiment, are added on an opposing side of disk 1500 from pins 1560. An alternative embodiment without the need for unlocking pins 1560 may remain cylindrical in profile. In this embodiment with unlocking features, conical tips 1570 have been applied to the free end of each unlocking pin 1560 to interact with corresponding modification 1910 on cycloid rotor 1900. Those trained in the art will again recognize that other modifications are possible so long as such modifications are consistent between rotor 1900 and output disk 1500. Curvic teeth 1510 interface with teeth 1240 on proximal face while teeth 1540 interface with teeth 1340 on face 1300. Teeth 1540 are longer than teeth 1510 such that teeth 1540 may remain engaged while teeth 1510 are disengaged. Chamfered edge modifications 1520 may be applied to improve operation of locking and unlocking of teeth 1510. A groove 1530 may be machined into teeth 1540 to allow for a retaining ring (not shown) to be installed.

FIG. 14Q shows a reverse surface of disk 1500 relative to FIG. 14P. Disk 1500 includes an annular ring 1580 extending outwardly therefrom on which teeth 1540 are mounted.

Figure 14R:
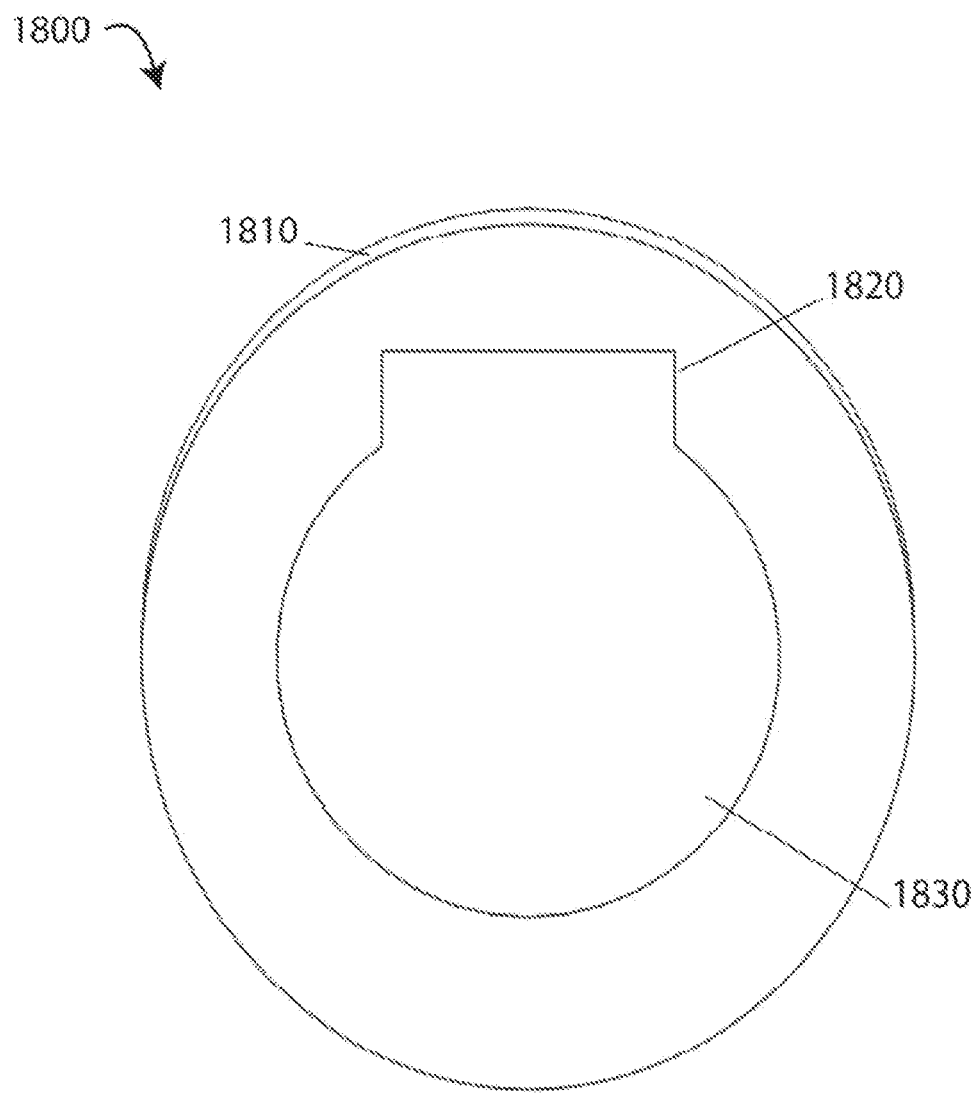
FIG. 14R is a perspective view of a rotation lockout key connected to cycloid rotor in FIG. 14I.

FIG. 14R shows a keyed ring 1800 that is installed for cases of eccentric, non-intersecting shafts, as shown in the exemplary embodiment. Outer ring 1810 fits concentrically within body 1100, as preventing rotation of outer ring 1810. With respect to body 1100. Likewise keyway 1820 prevents rotation of eccentric input disk 1600 while still permitting planar translation thereof.

Motion of proximal link body 1100 relative to distal link 1400 is explained as follows. At rest, all curvic teeth are engaged and relative motion between links is prevented, even under the influence of external loads.

To begin motion (in either direction) input disk with eccentric sphere 1700 begins rotating about its longitudinal axis 1704 concentric to proximal link body 1100. The eccentric rotation of sphere 1720 in the horizontal plane of the eccentric input disk 1600 within the sphere receiver 1650 works as a cam causing eccentric input disk 1600 to translate in the horizontal plane.

Key 1620 travels within keyway 1820, thereby preventing any rotation of input disk 1600 with respect to disk 1800.

The input profile 1920 of cycloid rotor 1900 is concentric with output 1630. This in turn forces rotor profile 1930 to move in eccentric motion relative to cycloid housing profile 1220. In the case of a simple gear train without self-locking this motion would result in the rotation of output disk 1500.

In this exemplary embodiment with self-locking, due to the both sets of curvic teeth 1510 being initially engaged with teeth 1240 on proximal face 1200 and curvic teeth 1540 on output disk 1500 being initially engaged with teeth 1340 on face 1300, neither proximal housing and face 1100 and 1200 nor output disk 1500 are able to rotation. Therefore the eccentric motion of the cycloid rotor 1900, which causes rotor 1900 to rotate, forces conical modification 1910 against the conical modification 1570 of the pins 1560 on the output disk 1500. This force causes the whole output disk 1500 to translate upward while remaining concentric to the pin 1320. Not shown is a spring between the output disk 1500 and cycloid rotor 1900 which resists this motion and stores energy needed to return output disk 1500 to the locked position. The spring can be a wave spring, a helical spring, or other suitable type of spring.

After a prescribed angular displacement of cycloid rotor 1900 has occurred, output disk 1500 has translated upward far enough to disengage the tooth pair of curvic teeth 1510 and teeth 1240 while teeth 1340 and teeth 1540 remain engaged. This prevents relative rotation between the output disk 1500 and pin while allowing body and face 1100 and 1200 to rotation relative to body and face 1300 and link 1400.

Upon unlocking subsequent motion and rotation of the cycloid rotor 1900 results in the rotation of face 1200 and link 1100 about pin 1320 and face 1300. Teeth 1510 ride along 1240 under the pressure of the spring.

Once enough rotation of face 1200 relative to face 1300 has occurred, the teeth 1510 and 1240, having been advanced by one, will line up again. At this point, the spring will force output disk 1500 to translate back down, thereby re-engaging teeth 1510 and 1240 re-locking out rotational motion.

This process may be repeated in either direction until the desired rotation of link 1100 relative to link 1400 has occurred.

Referring back to FIG. 2, an interior of link 102 along longitudinal axis 103 is open, allowing for the passage of material therethrough, as shown in FIGS. 2, 2A, and 2C for example, flexible driveshaft 505 extends through link 102. A proximal end of flexible driveshaft 505 is operatively connected to drill 504. Driveshaft 505 has bend radii throughout such that the minimum bending radius of the shaft is preserved.

Figure 16:
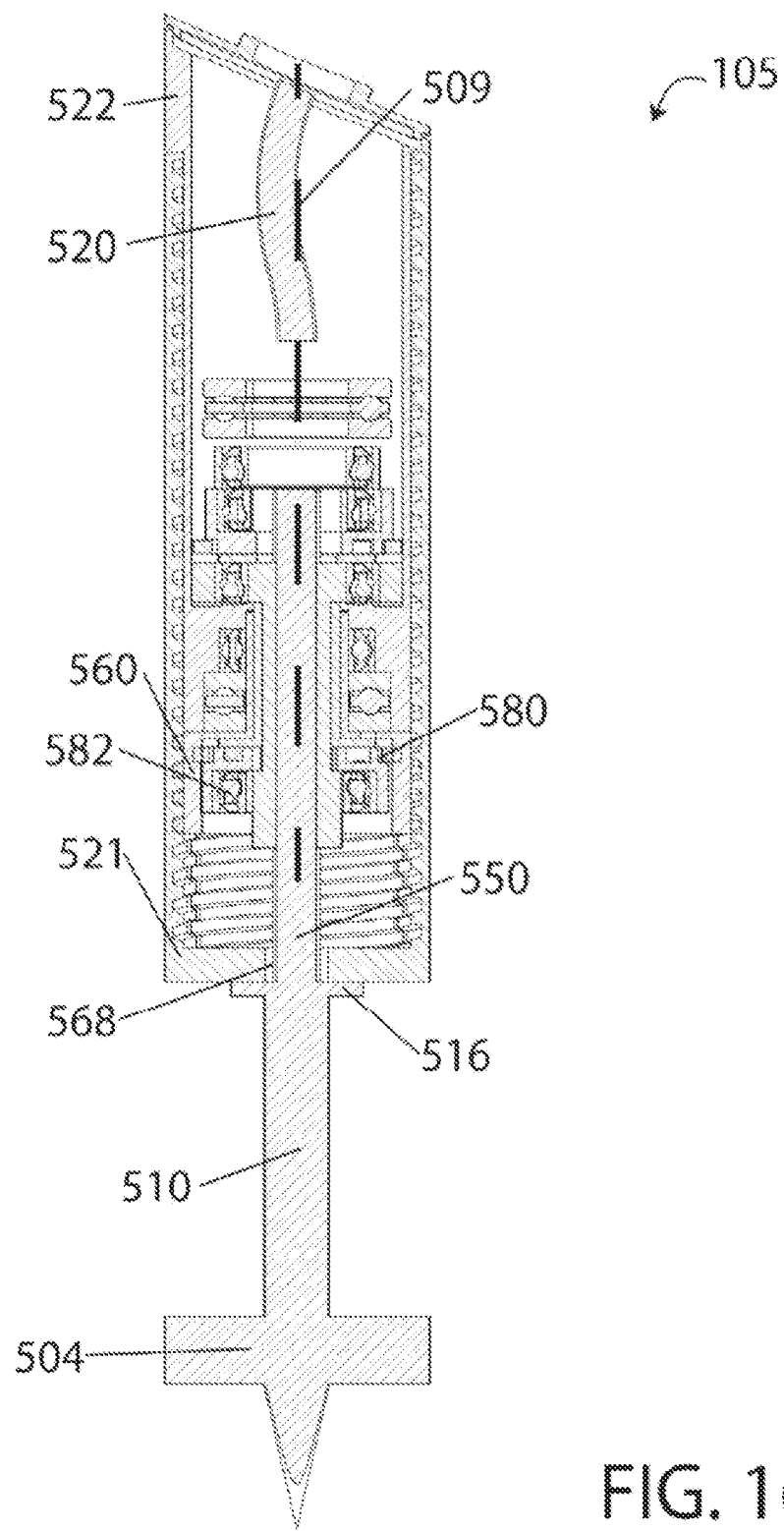
FIG. 16 is a sectional view of the drill head shown in FIG. 15.
Figure 16A:
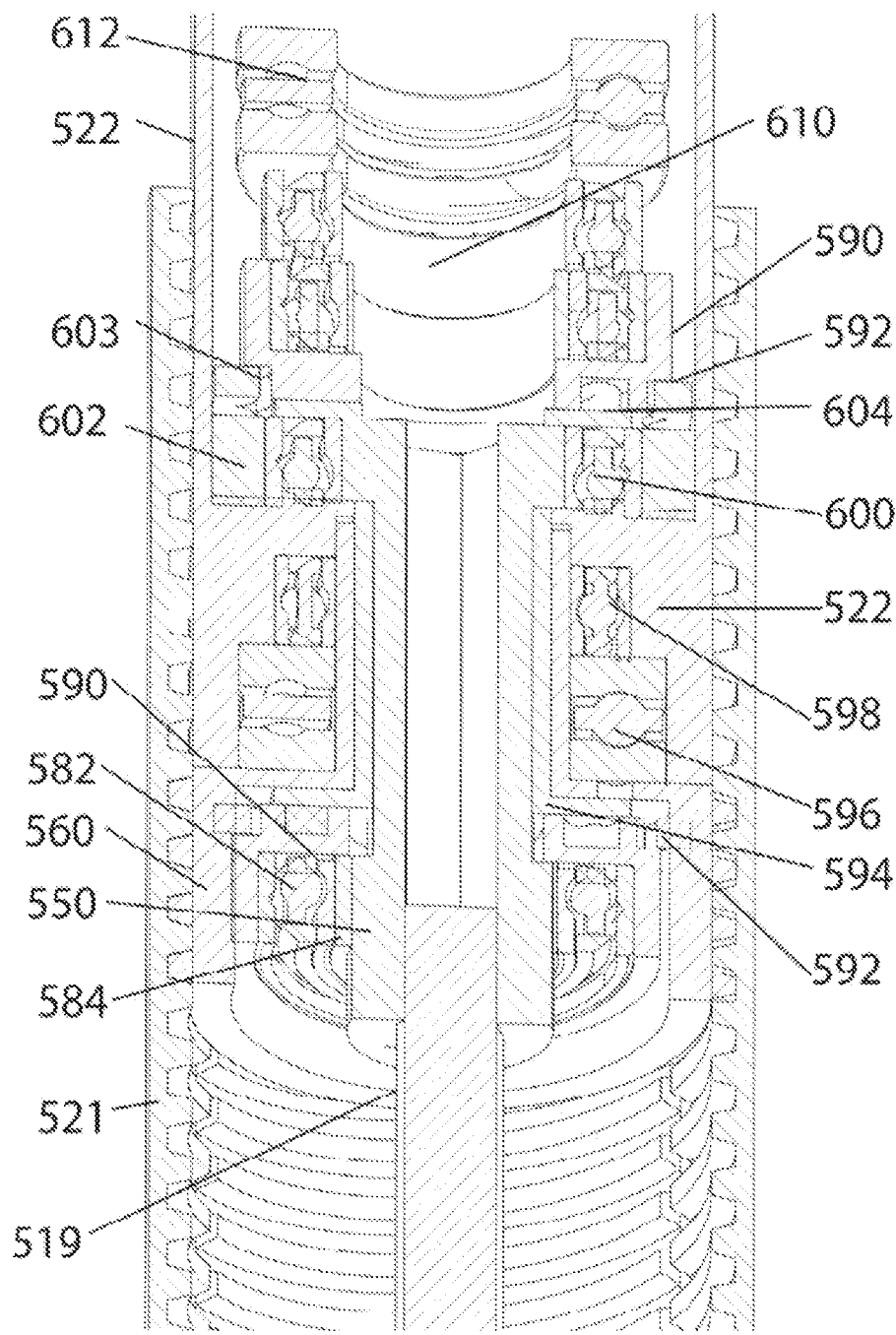
FIG. 16A is an enlarged view of the internal components of the drill head shown in FIG. 16.
Figure 17:
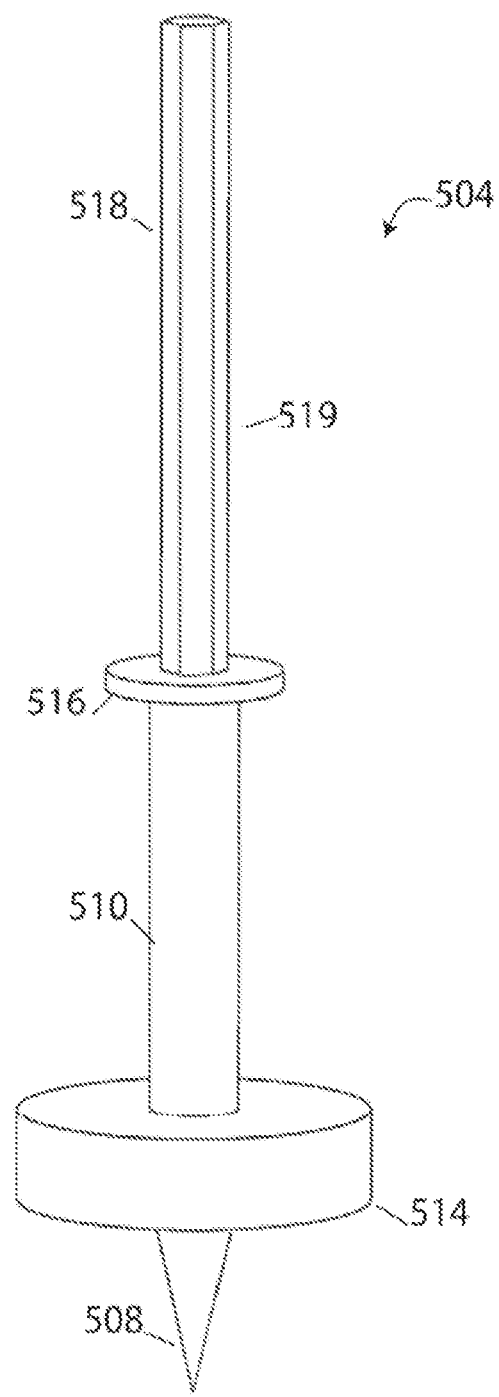
FIG. 17 is an enlarged perspective view of the drill used in the drill head shown in FIG. 16.

The configuration of drill head 105 will now be discussed. Drill head 105 is shown in detail in FIGS. 15-25. A sectional view of drill head 105 is provided in FIG. 16, within a large view of the internals of drill head 105, being provided in FIG. 16A.

Drill head 105 includes a distal end 502 that interconnects with the most proximal link 102 in robot 100. Drill 504 is located at a proximal end 506 of drill head 105. In an exemplary embodiment, drill 504 can include a proximal tip 508, and an elongate shaft 510 extending into drill head 105. A concentric drill 514 for boring large diameter (at least as large as the width of robot 100) holes is located between proximal tip 508 and shaft 510. As shown in the cross-sectional view of drill head 105 in FIG. 16, shaft 510 can include a collar 516 located against proximal and 506 of drill head 105. As shown in detail in FIG. 17, distal end 518 of drill 504 includes a hexagonal shaft hexagonal shaft 519 that allows for clamping of drill 504 and subsequent rotation by driveshaft 520 (shown in FIG. 16).

Similar to link 102 described above, drill head 105 includes an outer housing 521 and a telescoping inner cylinder 522. Drill head 105 includes several parts included in link 102, so references to element numbers in link 102 will be used herein, along with the appropriate Figure numbers.

Figure 18:
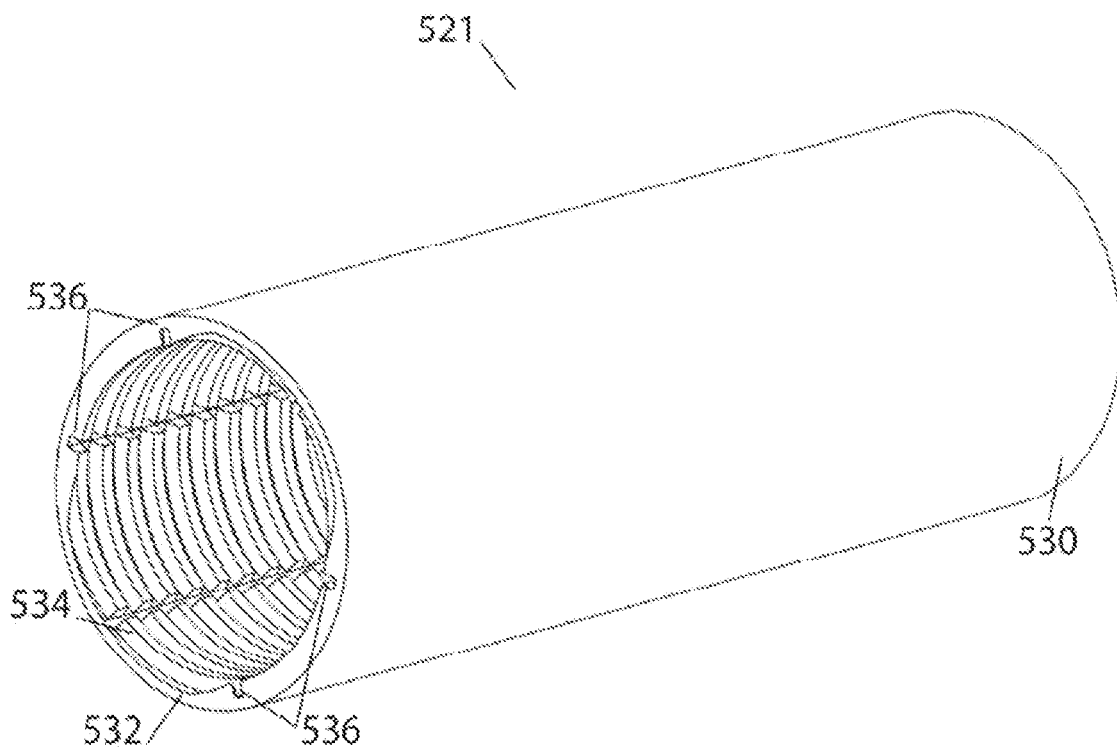
FIG. 18 is a perspective view of the outer housing of the drill head shown in FIG. 16.

Outer housing 521 is shown in detail in FIG. 18. Outer housing 321 includes a distal end 530 that extends generally orthogonal to longitudinal axis 509 (shown in FIG. 16) of drill head 105 and a proximal end 532. A series of internal threads 534 extend from distal end 530, toward proximal end 532. In an exemplary embodiment, internal threads 534 form a single helix. A plurality of longitudinal slots 536 extends a length of outer housing 521. Slots 536 form a track along which nonrotating elements within drill head 105 translate longitudinally during operation of drill head 105 with respect to its immediately proximal link 102.

Figure 19:
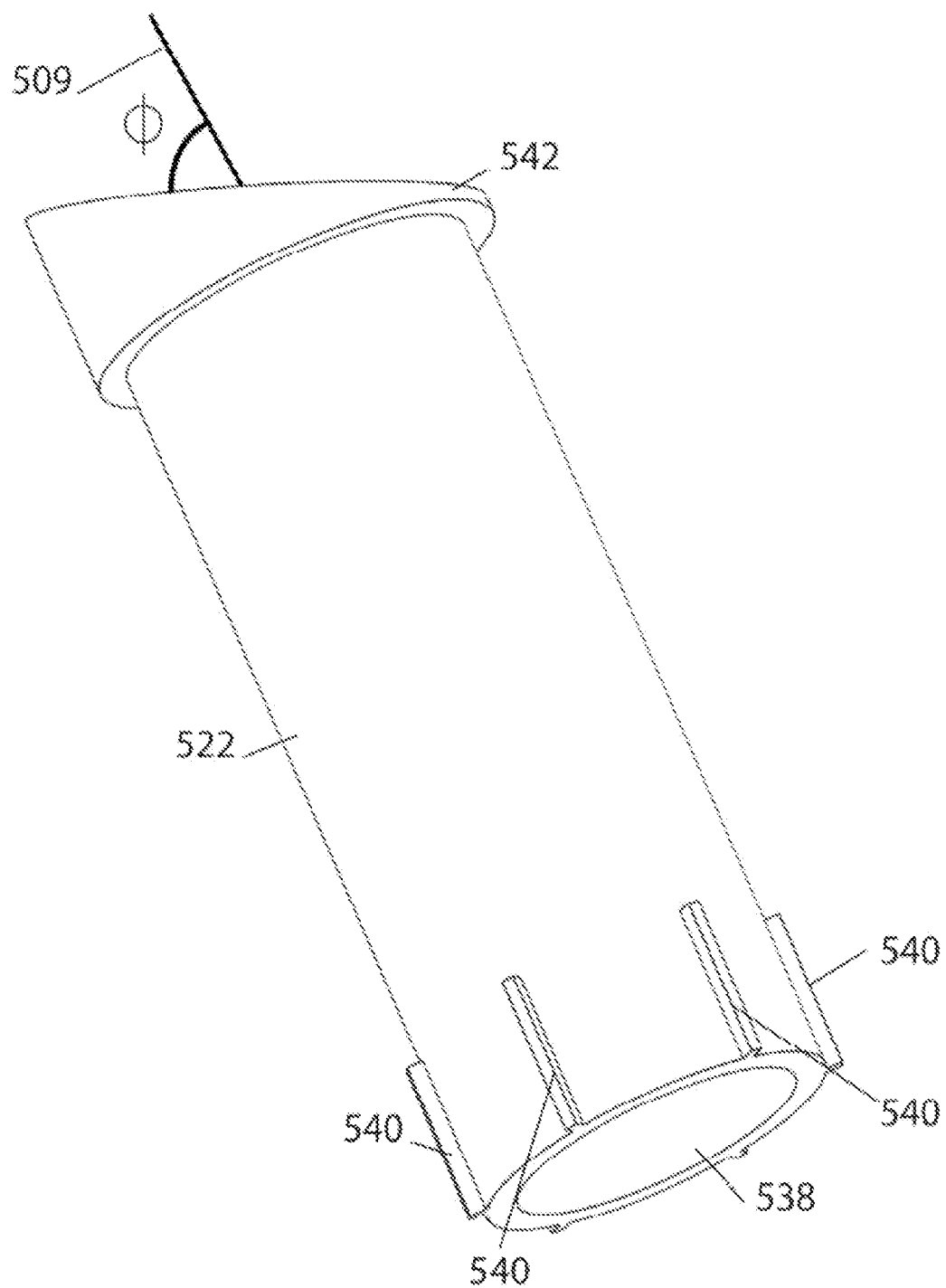
FIG. 19 is a perspective view of the inner sleeve of the drill head shown in FIG. 16.
Figure 19A:
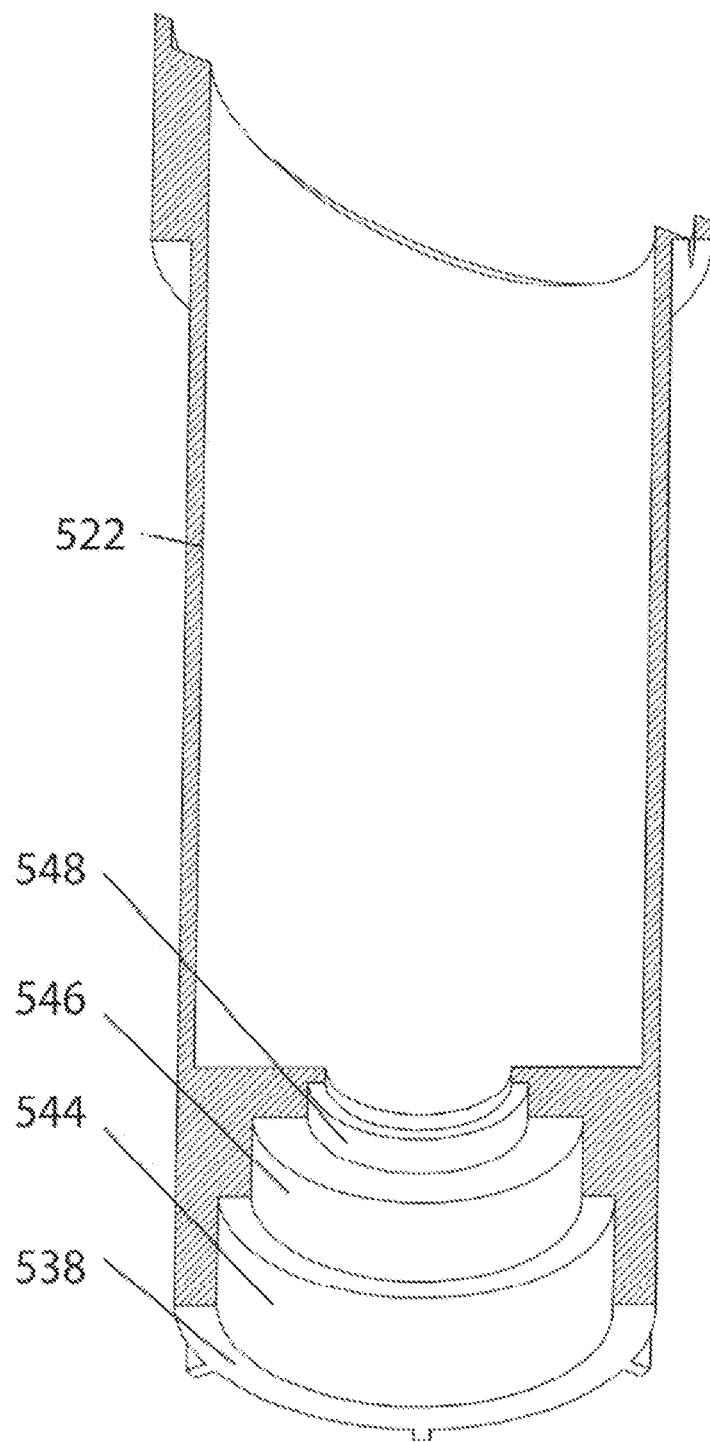
FIG. 19A is a sectional view of the interior of the proximal end of the inner cylinder of the link shown in FIG. 2.

Inner cylinder 522 is shown in detail in FIG. 19. Inner cylinder 522 includes longitudinally extending tangs 540 that extend radially outwardly from a proximal end 538 of cylinder 522. Tangs 540 extend into and slide longitudinally along slots 536 in outer housing 521, resulting in longitudinal extension/contraction of drill head 105. An interior of proximal end 538 of inner cylinder 522 is shown in FIG. 19A. Proximal end 538 includes a series of ever decreasing coaxial cylindrical passages 544, 546, 548 into which components of drill head 105 are mounted. These components will be discussed in detail below.

A distal end 542 of cylinder 522 includes an angled face that extends at an angle φ with respect to longitudinal axis 509. In an exemplary embodiment, φ is about 22.5°, although those skilled in the art will recognize that φ can be other values as well, as long as a whole number multiple of the value of φ equals 90°.

Figure 20:
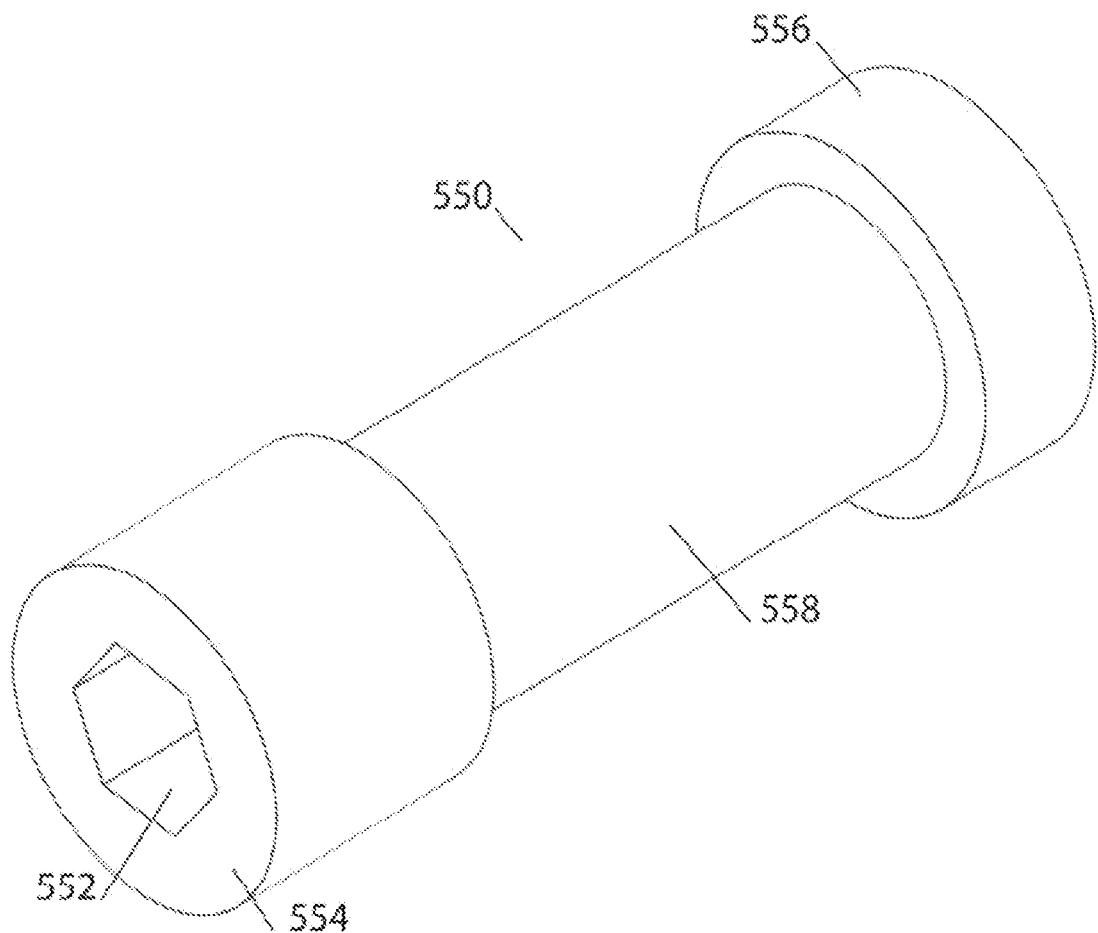
FIG. 20 is a perspective view of the output drive to the drill head shown in FIG. 16.

A drill head output drive 550 is shown in detail in FIG. 20. Output drive 550 includes a generally hexagonal passage 552 sized to engage hexagonal shaft 519 on drill 504. Output drive 550 includes a proximal end 554, a distal end 556, and a narrower elongate cylinder 558 extending between proximal end 554 and distal end 556.

Figure 21:
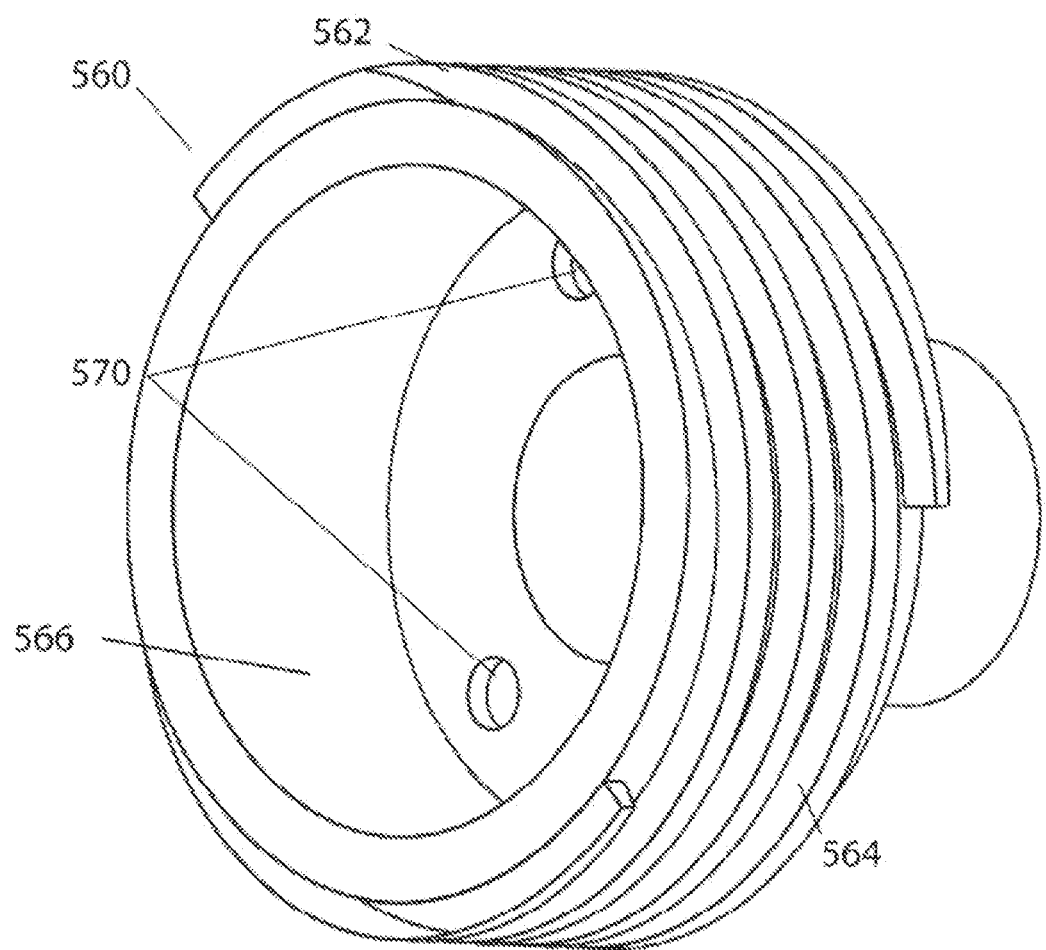
FIG. 21 is a proximal perspective view of a nut for the drill head shown in FIG. 16.
Figure 21A:
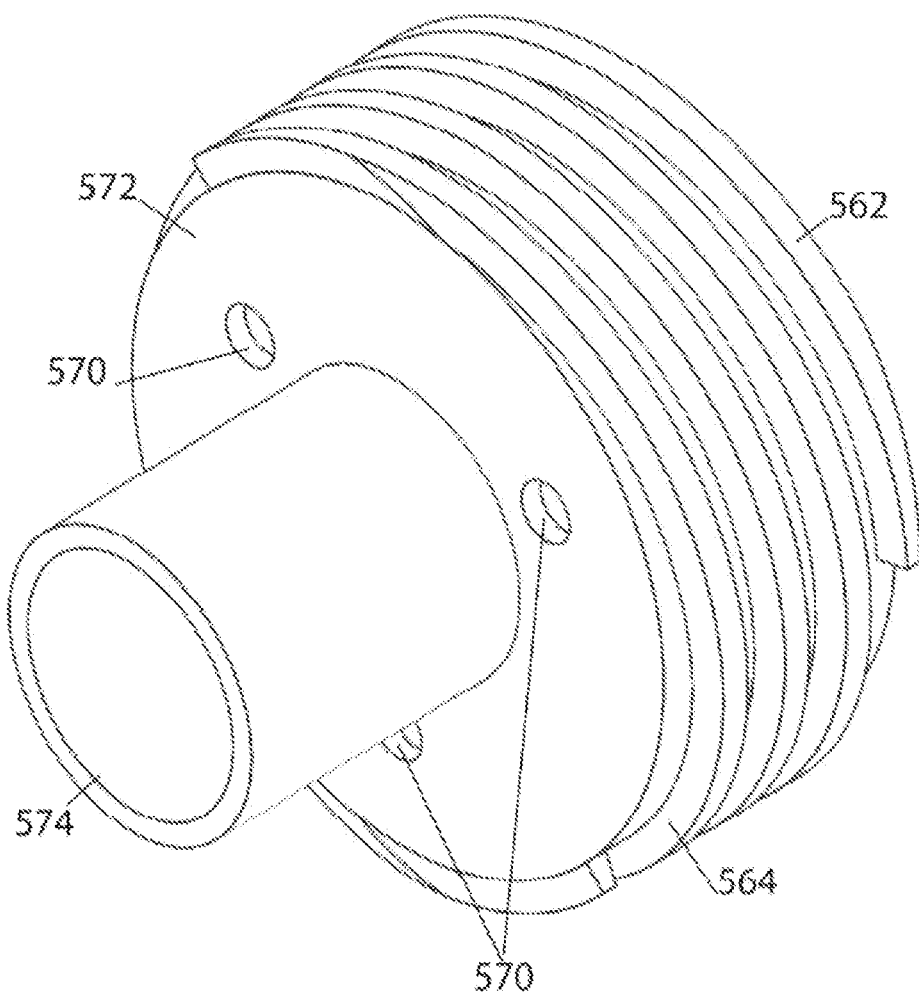
FIG. 21A is a distal perspective view of the nut shown in FIG. 21.

A drill head nut 560 is shown in detail in FIGS. 21 and 21A. Nut 560 includes a threaded proximal end 562 having threads 564 sized to engage threads 534 in outer housing 521. Nut 560 also includes an internal passage 566 sized to accommodate proximal end 554 of output drive 550, along with a first bearing assembly 568 located between proximal and 554 of output drive 550 and proximal end 562 of nut 560.

Three radial spaced passages 570 extend through a distal wall 572 of nut 560. A distally extending sleeve 574 extends outwardly from distal wall 372.

Figure 22:
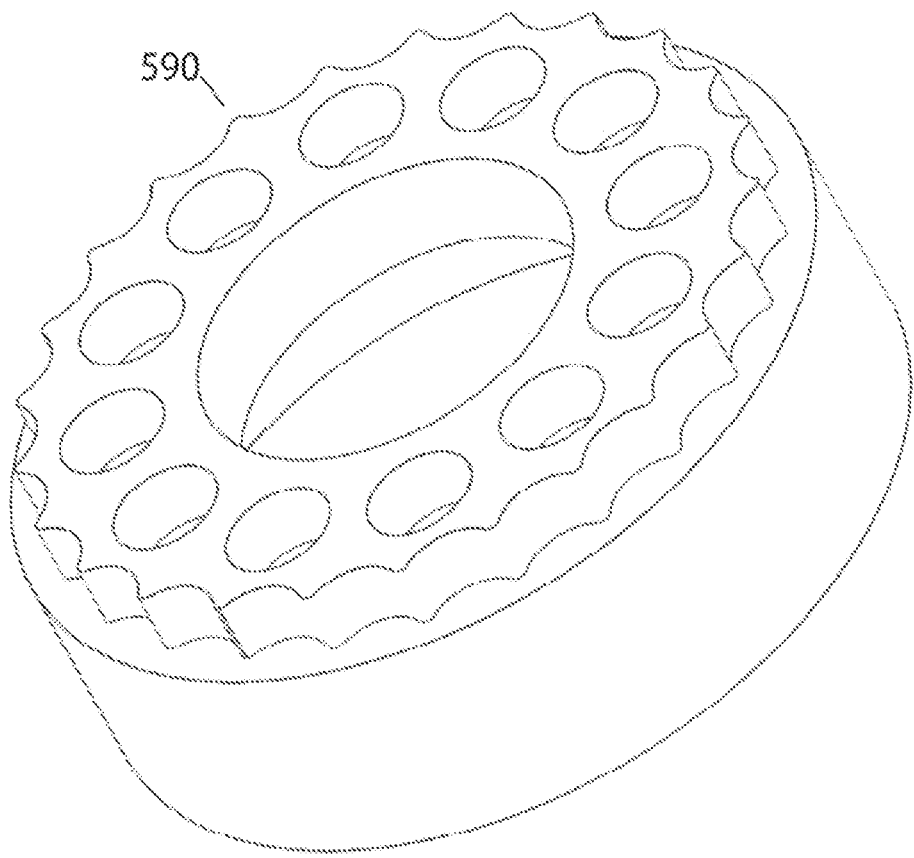
FIG. 22 is a perspective view of a cycloid rotor used in the drill head shown in FIG. 16.
Figure 23:
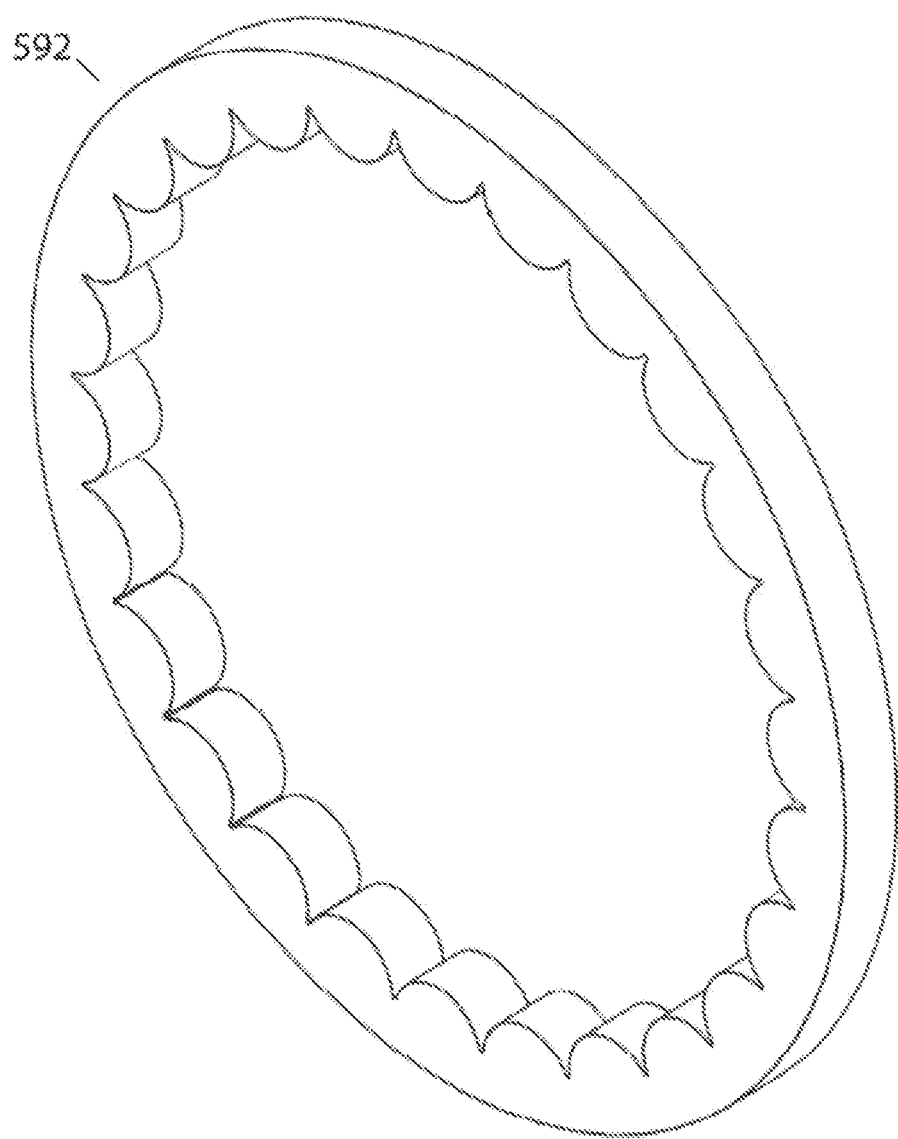
FIG. 23 is a perspective view of a cycloid housing used in the drill head shown in FIG. 16.
Figure 24:
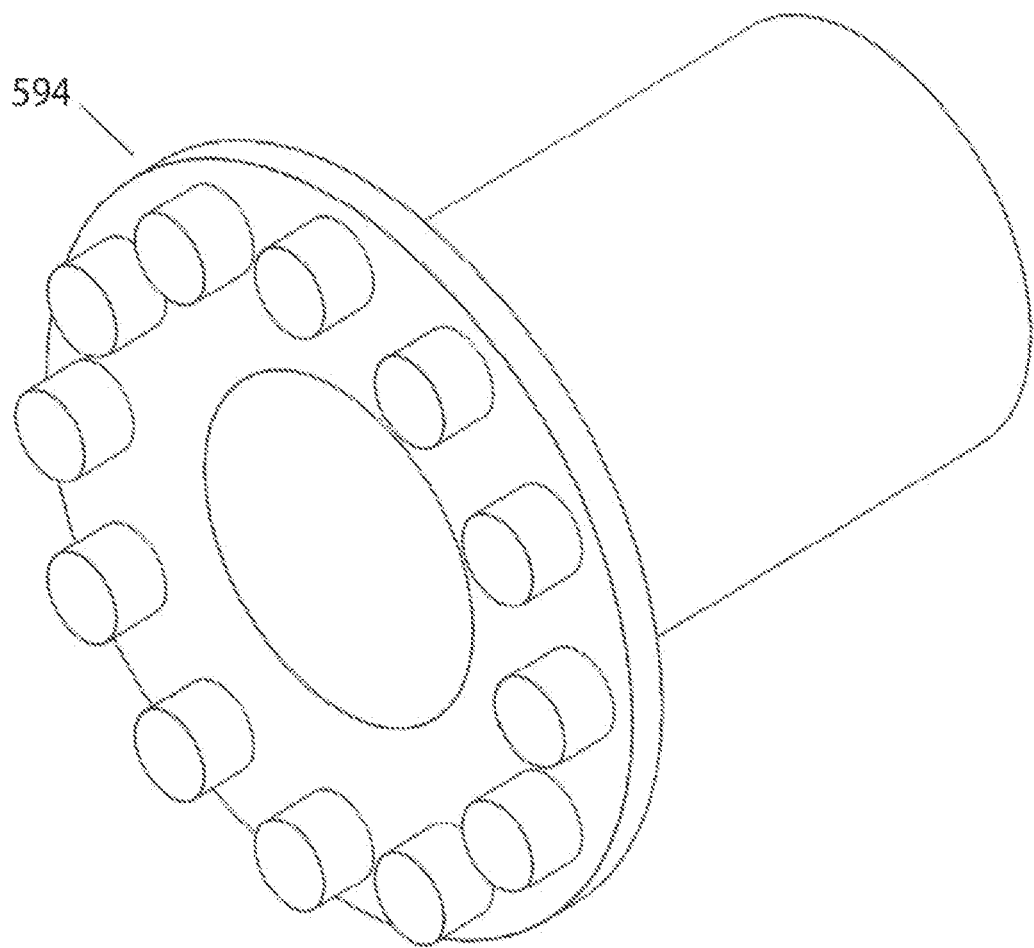
FIG. 24 is a perspective view of an output disc drill head hub used in the drill head.

A first drill head cycloid 580, similar to the cycloids described above with respect to link 102, includes a bearing assembly 582 similar to bearing assembly 200, mounted on a cam 584, similar to cam 221. Cam 221 is mounted on proximal end 554 of output drive 550. A cycloid rotor 590, shown in detail in FIG. 22, is inserted within internal passage 566 in nut 560 and retains bearing assembly 582. A cycloid housing 592, shown in detail in FIG. 23, and an output disk drill head disk drill head hub 594, shown in FIG. 24, completes first drill head cycloid 580.

A second bearing assembly 596 is mounted on distally ending sleeve 574 of nut 560 and is inserted into cylindrical passage 544 of inner cylinder 522. A third bearing assembly 598 is mounted distally of second bearing assembly 596 and is also mounted on distally extending sleeve 574 of nut 576 and is inserted into cylindrical passage 546 of inner cylinder 522.

A fourth bearing assembly 600 is mounted distally of cylindrical passage 548 and is mounted on distal end 556 of output drive 550. A spacer 602 spaces fourth bearing assembly 600 from inner cylinder 522.

Figure 25:
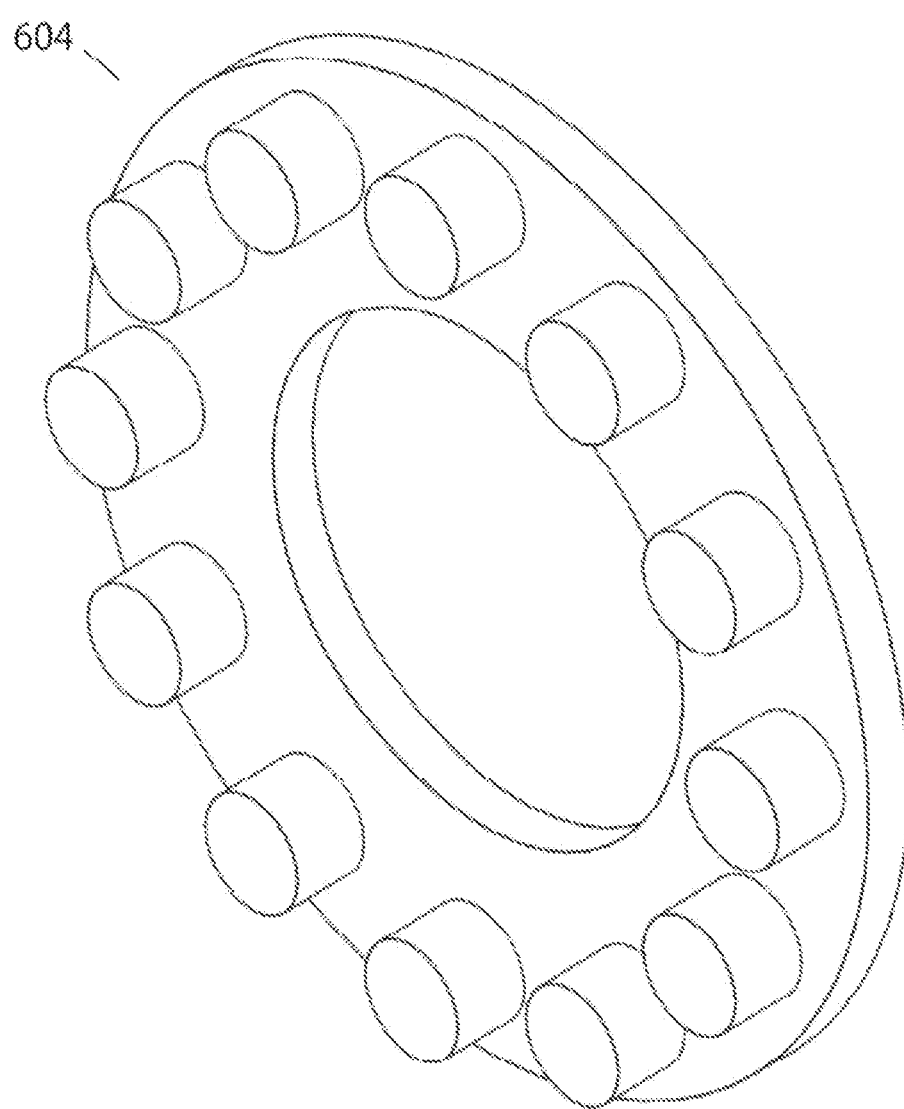
FIG. 25 is an output disk used in the drill head shown in FIG. 16.

A second drill head cycloid 603, similar to first drill head cycloid 580, includes an output disk 604, shown in detail in FIG. 25, a cycloid housing 592, and a cycloid rotor 590. A fifth bearing assembly 606 is mounted in the distal end of cycloid rotor 590. A sixth bearing assembly 610 is mounted distally of fifth bearing assembly 606, and a seventh (thrust) bearing assembly 612 is mounted distally of sixth bearing assembly 610.

In exemplary embodiment, the motors described above for use with robot 100 are generally high-speed, low torque motors that operate between about five and about 40,000 RPM, generating upwards of about 10 milliNewton-meters of torque. The motors operate at 2 Amps, 24 V DC. In an exemplary embodiment, a wire core 400, shown in detail in FIG. 14F, includes a generally annular body 402 having two communication conductors 404, 406 and two electrical power conductors 408, 410 such as, for the motors.

Slip rings (not shown) can be provided at either end of each link 102 in order to provide a wireless electrical connection between adjacent links 102 in order to provide electrical power to the motors in each of links 102, as well as to drill assembly 105. In an exemplary embodiment, five-conductor slip rings can be used. Additionally, encoders (not shown) or other known angular position measurement devices can be provided at various locations in each of links 102 in order to determine relative positions of the elements of each link as well as relative positions of adjacent links 102. Additionally sensors (not shown) can also be provided to measure the length of link 102 and external forces applied and between adjacent links 102.

In an exemplary embodiment, shown in FIG. 1, proximal end of robot 100 is equipped with a drill assembly 105 that enables robot 100 to drill through solid matter, such as, for example, wood, concrete, or other matter, and to enable robot 100 to self propel through the matter. Proximal end of robot 100 can also include a video camera (not shown) so that an operator can see what robot 100 encounters in the area of drill 504, as well as a light (not shown) that provides light for the video camera.

Figure 26:
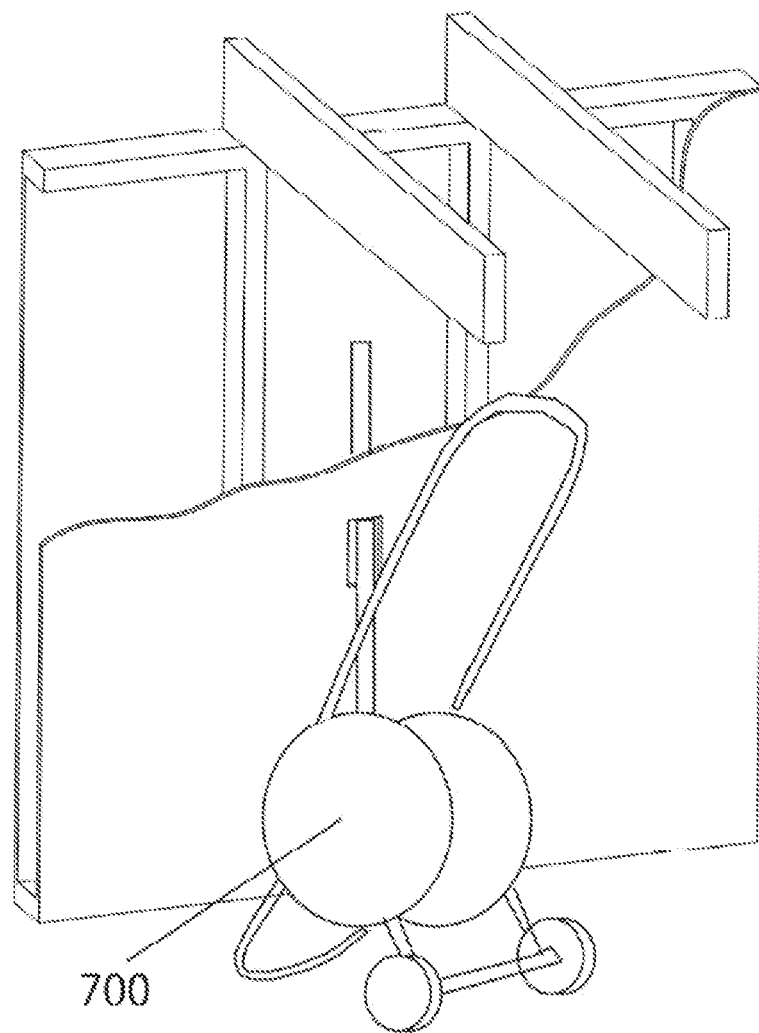
FIG. 26 is a perspective view of the robot shown FIG. 1 being unwound from a spool for use in drilling a hole.

Robot 100 can be stored on a spool 700, as shown in FIG. 26. To use robot 100, robot 100 can be at least partially unwound from spool 700, with drill 105 placed against an obstruction at a location to be drilled and turned on so that drill 105 begins to drill through the obstruction. Spool 700 includes a motor (not shown) that provides the rotational energy to drive shaft 505. Also, a tensioner (not shown) keeps the requisite tension and controls the usable length of drive shaft 505.

Once robot 100 is sufficiently past the obstruction, robot 100 will be able to self propel and to drill past subsequent obstructions.

The operation of robot 100 will now be described. Each link 102 is capable of 3 discrete motions: rotating about the pin 122 of the previous link 102, extension of link 102 (longitudinal translation of outer housing 108 with respect to inner cylinder 118), and rotation of pin 122 in each link 102.

Each of these motions will be explained as follows. At rest, the rotational joints of adjacent links 102 are locked such that without any external energy input from the motors within links 102, links 102 will stay stationary with respect to each other.

To rotate the pin 122 on link 102, the following steps occur. Initially projections 178 on spacer 172 are engaged with teeth on the link's body (118). Wave spring 130 (shown in FIG. 7C) is currently compressed and exerts a force that is trying to separate the teeth and move spacer 172 upward. Downward pressure is applied via ramp 158 and balls 170 that are attached to the helix ball adjuster 154 to keep the system in place. Tabs 182 located on spacer 172 travel in slots/keyways 115 in outer housing 108. Tabs 182 prevent rotational motion between outer housing 108 and spacer 172 since tabs 182 are attached to the spacer 172, which again is currently locked to inner cylinder 118. Pin 122 is attached to plate 113 at the end of outer housing 108.

To allow outer housing 108 and attached pin 122 to rotate relative to inner cylinder 118, the following actions occur in this exemplary configuration. First, motor stator 142, concentric with helix ball adjuster 154, is rotationally and translationally fixed relative to inner cylinder 118. Energizing first motor 140 causes rotor 144, which is rotationally and translationally locked to helix ball adjuster 154, to rotate. This in turns rotates helix ball adjuster 154 relative to inner cylinder 118. This rotation causes ramps 158 on bottom of ball adjuster 154 to rotate relative to balls 170, which are constrained within passage 173. This in turn allows the balls 170 to translate longitudinally relative to nut 162 but not rotate. The rotation of the ramps 158 allows balls 170 to translate longitudinally, being pushed by spacer 172 which is pressured by spring 130. When spacer 172 moves up, spacer 172 simultaneously disengages projections 119 on inner cylinder 118 while engaging teeth 168 on nut 162. At this point, teeth 168 and 178 are fully engaged, causing nut 162 and spacer 172 to rotate together. Since keys 182 are engaged in slots 115 on outer housing 108, this circumvents the screw action and simply causes outer housing 108 to rotate with nut 162 and spacer 172 relative to inner cylinder 118. Since pin 122 and angle plate 113 are also attached to the housing 110, this action results in a rotation of pin 122 relative to inner cylinder 118.

To provide the torque necessary to rotate the outside housing 110 relative to the body 118 the following motions occur. Motor 250 drives the two-stage cycloidal reducer 200-240, which takes high speed from motor 250 and reduces the speed while increasing torque. Output disk 194, which is attached to nut thread assembly 162, rotates nut 162, rotating the spacer 172, causing the rotation because tabs 182 are engaged in slots 115 in outer housing 108.

When the desired angular rotation of the outer housing 108 relative to the inner cylinder 118 has been achieved, the opposite of the process detailed above occurs. Motor stator 142 inputs a torque on rotor 144, which rotates helix adjuster 154 and ramps 158, pressing the balls 170 down against annular plate 180 on the spacer 172. This action disengages pins 168 and projections 178 from each other, while engaging teeth 118 and 184 and compressing spring 130. This action has then locked out rotation between spacer 172 and inner cylinder 118 while permitting nut 162 to rotate relative to spacer 172 and inner cylinder 118 once again, returning link 102 to the initial state described above.

To extend/contract a link 102, the following steps occur. This motion that the spacer's teeth 184 are engaged with the teeth on body 118. The motor 250 rotates the gear train (as described above), which causes nut 162 to rotate relative to outer housing 108 which is rotationally fixed relative to the body 118 via tabs 182 on the spacer 172. This relative rotation engages threads 114 on outer housing and threads 166 on nut 162, causing outer housing 108 to extend relative to inner cylinder 118. Reversing the input direction/torque of motor 250 will cause the outer housing 108 to contract towards inner cylinder 118. During the extension and contraction processes, keys 182 on the spacer 172 slide within slots 115 on outer housing 108 preventing outer housing 108 from rotating relative to inner cylinder 118.

To rotate link 102 relative to pin 122 of an adjacent link 102, the following steps occur in this exemplary embodiment. The output disc 220 from cycloid drive rotates input shaft 310. Teeth 316 on bevel gear 304 are engaged as shown FIG. 14B. Since output shaft 320 is unable to rotate because teeth 316 are engaged, rotation of shaft 310 relative to output shaft 320 builds energy in spring 130 and causes pin 322 attached to shaft 310 and bevel gear 304 to translate laterally. This in turn pulls bevel gear 302 away from bevel gear 304. Spring 130 subsequently pushes bevel gear 304 away from plate 113. Note that in FIG. 14C, the teeth 124 on male pin 122 remain engaged with the inner teeth 308 on bevel gear 304.

Once pin 122 has pulled gears 302 and 304 far enough apart that the outer curvic teeth 115 on plate 113 and teeth 316 are no longer engaged, plate 113 and inner cylinder 118 begin to rotate with gear 302 relative to bevel gear 304, which is rotationally fixed to male pin 126 from the previous link as the longer curvic teeth 124 remain engaged with teeth 308. Separation is prevented by retaining ring 117.

Spring 113 applies a lateral force on bevel gear 302 and in turn bevel gear 304, causing teeth 316 of bevel gear 304 ride along the top of the teeth on plate 113, as shown FIG. 14D.

After rotating far enough such that the teeth 316 on bevel gear 304 and plate 113 line up again, the force from spring 130 causes bevel gear 302 to overcome the spring force from the spring 130 between plate 113 and gear 304. This action results in the closing of the outer curvic teeth on plate 113 and bevel gear 304, thus locking rotation between adjacent links.

The steps recited above can be repeated multiple times to accomplish rotations larger than one curvic tooth spacing.

Additionally this mechanism is designed such that the mechanism works bi-directionally and without the need of any additional actuators besides reversing the rotation of motor 250.

The goal of drill head 105 is to convert the high speed, low torque rotary energy in the flexible drive shaft 520 into low speed, high torque energy to rotate drill 504. Drill head 105 also applies the thrust force necessary to advance drill 504 through the work material.

To conserve space, extension of the drill 504 and outer housing 521 is mechanically coupled to the rotator motion of bit 504. In essence, the faster drill 504 spins, the faster drill 504 will extend form inner cylinder 522. This is similar to the mechanical feed on traditional machining tools. It is also possible to make extension independent of the drill rotation through the use of an additional actuator within drill head 105.

High speed rotary energy enters through the flexible drive shaft 520. Shaft 520 is then attached to the input cam of the cycloid drive (not shown) and is supported by thrust bearing 612 and radial bearing 610. This then moves cycloid rotor 550 within rotor housing 592, reducing its speed and increasing torque to the requisite values for drilling. Output disk 603 spins at the desired speed and is attached to coupler 550.

Coupler 550 serves two primary purposes. The first is to transmit rotary energy to drill 504. A known simple clutch mechanism (not shown) that limits the amount of torque that may be passed from distal end 556 to keyed/broached output 552 to protect drive shaft 510 in the event that drill 504 jams. At proximal end 554 is a second eccentric cam 584. Cam 584 is the input for a second speed reducer. Cam 584 moves eccentric rotor 590 within housing 592. In this configuration, the output disk and pins 594 are roti-linearly anchored to drill body 522. This causes housing 592 to rotate at a slower speed than input piece 554. Housing 592 is attached rigidly to nut 560. The gear train causes nut 560 to turn engaging threads 564 with the internal threads 534 in outer housing 506. Rotation of outer housing 521 relative to inner cylinder 522 is prevented by the keys 540 machined into inner cylinder 522 riding in slots 536. Thus the relative rotation of nut 560 and outer housing 506 causes drill 504 to advance.

Rotary motion to drill 504 is maintained despite positional changes as keys on shaft 518/519 ride within the mating cutout 552 in output drive 550. Should drill 504 become jammed, the clutch mechanism on output drive 550 is positioned such that cam 584 continues to rotate such that drill 504 can be unscrewed and jettisoned regardless of whether drill 504 can turn.

Tip 508 of drill 504 is designed to be long enough that tip 508 can engage prior to teeth 514 cutting when drill 504 is tilted between about 0 degrees and about 45 degrees relative to longitudinal axis 509 for drill head 105. Flange 516 is designed to be supported by bearing assembly 582 within outer housing 506.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method of operating a robot inside a confined space, the method comprising the steps of:
   (a) providing a robot having a plurality of independently operable links that operate to rotate and translate the robot, the links comprising:

(i) a first link having a first distal end, a first proximal end, and a first longitudinal axis extending between the first distal end and the first proximal end; and (ii) a second link having a second proximal end, a second distal end operatively coupled to the first proximal end, and a second longitudinal axis extending between the second proximal end and the second distal end, wherein the robot has an end effector comprising a drill at a distal end thereof;

(b) inserting the robot through a first opening into the space;

(c) advancing the robot through the space by performing at least one of the following operations:
(i) axial elongation of the robot;
(ii) pivoting of the first longitudinal axis relative to the second longitudinal axis; and
(iii) rotation of the first longitudinal axis relative to the second longitudinal axis;

(d) advancing the distal end of the robot to an obstruction; and (e) drilling through the obstruction to form a second opening in the obstruction.

2. The method according to claim 1, further comprising the step of
(f) advancing the distal end of the robot through the second opening.

3. The method according to claim 2, further comprising the step of:
(g) repeating steps (d) through (f).

4. The method according to claim 1, wherein step (c) comprises butting at least one of the first and second links against a support member.

5. The method according to claim 4, wherein the support member comprises a wall stud.

6. The method according to claim 1, wherein each of the first and second links comprises at least one motor and wherein step (c) comprises selectively operating the at least one motor.

7. The method according to claim 1, wherein step (c) further comprises:
(iv) axial contraction of the robot.

8. A method of operating a robot, the method comprising the steps of:
(a) providing a robot having a plurality of independently operable links that operate to rotate and translate the robot, the links comprising:
(i) a first link having a first distal end, a first proximal end, and a first longitudinal axis extending between the first distal end and the first proximal end; and
(ii) a second link having a second proximal end, a second distal end operatively coupled to the first proximal end, and a second longitudinal axis extending between the second proximal end and the second distal end;

(b) anchoring at least one part of the robot to a reference point against a wall stud; and (c) advancing the robot into an enclosed space by performing at least one of the following operations:
(i) axial elongation of the robot;
(ii) pivoting of the first longitudinal axis relative to the second longitudinal axis; and
(iii) rotation of the first longitudinal axis relative to the second longitudinal axis.

9. The method according to claim 8, wherein step (a) further comprises providing an end effector at a distal end of the robot.

10. The method according to claim 9, further comprising the step of:
(d) advancing the end effector to a location; and
(e) operating the end effector at the location.

11. A method of operating a robot, the method comprising the steps of:
(a) providing a robot having a plurality of independently operable links that operate to rotate and translate the robot, the links comprising:
(i) a first link having a first distal end, a first proximal end, and a first longitudinal axis extending between the first distal end and the first proximal end, the first link having a first maneuverability, distinct from the second link; and
(ii) a second link having a second proximal end, a second distal end operatively coupled to the first proximal end, and a second longitudinal axis extending between the second proximal end and the second distal end, the second link having a second maneuverability, distinct from the first link;

(b) inserting the robot into a space;

(c) advancing the robot to an obstruction in the space; and (d) independently maneuvering the first link and the second link past the obstruction.

12. The method according to claim 11, wherein the robot has an end effector at a distal end thereof, and the method further comprises the step of, after step (c), the step of performing a task on the obstruction with the end effector.

13. The method according to claim 12, wherein the end effector is selected from the group consisting of drill bits, sensors, and a fluid supply lines.

14. The method according to claim 11, wherein step (d) comprises bending the first link relative to the second link to maneuver the first link past the obstruction.

15. The method according to claim 14, wherein step (d) further comprises bending the second link relative to the first link to maneuver the second link past the obstruction.

* * * * *